(12) United States Patent
Kaprielian

(10) Patent No.: US 7,809,475 B2
(45) Date of Patent: Oct. 5, 2010

(54) COMPUTER CONTROLLED FERTIGATION SYSTEM AND METHOD

(75) Inventor: Craig L. Kaprielian, Reedley, CA (US)

(73) Assignee: FW Enviro, LLC, Reedley, CA (US)

( * ) Notice: Subject to any disclaimer, the term of this patent is extended or adjusted under 35 U.S.C. 154(b) by 262 days.

(21) Appl. No.: 11/735,126

(22) Filed: Apr. 13, 2007

(65) Prior Publication Data

US 2008/0097653 A1 Apr. 24, 2008

Related U.S. Application Data

(63) Continuation-in-part of application No. 11/017,452, filed on Dec. 20, 2004, and a continuation-in-part of application No. 11/016,796, filed on Dec. 20, 2004, now Pat. No. 7,243,459.

(51) Int. Cl.
| | |
|---|---|
| G05D 7/00 | (2006.01) |
| G05D 11/00 | (2006.01) |
| G05B 11/01 | (2006.01) |
| G05B 11/00 | (2006.01) |
| A01G 25/00 | (2006.01) |
| A01G 27/00 | (2006.01) |
| A01G 29/00 | (2006.01) |
| B05B 12/08 | (2006.01) |
| B05B 17/04 | (2006.01) |
| F16K 17/36 | (2006.01) |
| F16K 31/00 | (2006.01) |

(52) U.S. Cl. .................. 700/284; 700/16; 239/63; 137/78.3; 47/21.1; 47/48.5; 47/79

(58) Field of Classification Search ............... 700/14, 700/16, 284; 239/63; 137/78.2, 78.3; 47/20.1, 47/21.1, 48.5, 79
See application file for complete search history.

(56) References Cited

U.S. PATENT DOCUMENTS

| | | | |
|---|---|---|---|
| 4,040,436 A | 8/1977 | Caldwell | |
| 4,177,604 A | 12/1979 | Friesen | |
| RE31,023 E * | 9/1982 | Hall, III | 405/37 |
| 4,545,396 A * | 10/1985 | Miller et al. | 137/78.3 |
| 5,740,031 A * | 4/1998 | Gagnon | 700/16 |
| 6,079,433 A | 6/2000 | Saarem | |
| 6,701,665 B1 | 3/2004 | Ton et al. | |
| 7,010,396 B2 * | 3/2006 | Ware et al. | 700/284 |
| 7,203,576 B1 * | 4/2007 | Wilson et al. | 700/284 |
| 7,264,177 B2 * | 9/2007 | Buck et al. | 239/63 |
| 2004/0088916 A1 | 5/2004 | Ton et al. | |
| 2005/0081441 A1 * | 4/2005 | Mantovani | 47/67 |
| 2005/0121536 A1 | 6/2005 | Bavel | |
| 2005/0133613 A1 * | 6/2005 | Mayer et al. | 239/63 |
| 2006/0184285 A1 | 8/2006 | Evelyn-Veere | |
| 2006/0254138 A1 | 11/2006 | Bissonnette et al. | |
| 2007/0016334 A1 * | 1/2007 | Smith et al. | 700/284 |

* cited by examiner

*Primary Examiner*—Crystal J Barnes-Bullock
(74) *Attorney, Agent, or Firm*—James F. Hann; Haynes Beffel & Wolfeld LLP

(57) ABSTRACT

A system and a method of computer controlled irrigation and fertigation composed of one or more sensors positioned in order to quantify the amount of water and/or nutrients that a plant is consuming. By controlling the fertigation, the plant or a part thereof, has improved yield and quality.

41 Claims, 9 Drawing Sheets

Graph of Continuous Data from Weighing Scale Over Several Days (vertical scale units in kg)

COMPUTER CONTROLLED FERTIGATION SYSTEM AND METHOD

CROSS-REFERENCE

This application is a continuation-in-part of U.S. patent application Ser. No. 11/017,452 filed on Dec. 20, 2004 and U.S. patent application Ser. No. 11/016,796 filed on Dec. 20, 2004 which are herein each incorporated by reference.

BACKGROUND OF THE INVENTION

The present invention relates to a method of computer controlled irrigation and fertigation based on one or more sensors which measure the total water and/or nutrient consumption by a plant. All publications cited in this application are herein incorporated by reference.

The commercial production of plants and plant material for consumption is plagued with many difficulties associated with natural botanical characteristics and the environment in which the plants are grown. Proper horticultural practices to minimize these difficulties and maximize plant growth and production are necessary to ensure commercially viable production.

Commercial farms have evolved to grow plants in organized rows. The rows help facilitate the planting, feeding, trimming, watering, maintenance and harvesting of the plants or food products grown by the plants. Conventional growing practices often utilize sprinkler and flood-type irrigation techniques and mass spraying of chemicals used to fumigate and fertilize.

Sprinkler and flood irrigation along with mass spraying, besides being wasteful of water and chemical resources, often damage surface soils and both ground water and surface water sources. Irrigating floodwater applied to fields promotes erosion and promotes run-off of fertilizers and pesticides into water sources. In arid environments flood irrigation often leads to soil mineralization associated with the build-up of surface salts. Flood irrigation also creates large swings over time in the amount of moisture in the soil, which stresses the plants.

Agricultural fields, especially those in continuous use, year after year, are usually infested with harmful nematodes that attack the roots of plants. The development of nematode resistant plant varieties and crop rotation has lessened the problem of nematode infestation but only to a limited extent. Prior to planting, a field is typically fumigated with a substance such as methyl bromide in an effort to kill the nematodes, but this also has achieved limited success since the harmful nematodes reside approximately 12 inches below the surface of the soil. The use of methyl bromide is also being severely restricted or banned completely in some regions due to adverse environmental affects associated with its use. Methyl bromide and other fumigants also kill many of the organisms in the soil that are beneficial to plants.

Furthermore, in traditional flood irrigation a significant percentage of water applied to a field is lost either through evaporation to the air or downward migration below the effective root zone of the plants. The downward migration of water also has the negative consequence of carrying fertilizers, pesticides and insecticides into the groundwater. This technique wastes water resources, as does more advanced sprinkler techniques, although to a lesser extent.

Thus traditional irrigation methods are very wasteful of resources that are not focused on plant production and have a harsh impact on the environment.

The foregoing examples of the related art and limitations related therewith are intended to be illustrative and not exclusive. Other limitations of the related art will become apparent to those of skill in the art upon a reading of the specification and a study of the drawings.

SUMMARY OF THE INVENTION

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

It is an aspect of the present invention to provide a method of fertigation where a plant is grown in a container and at least one sensor is used to measure the total water consumption by the plant in the plant container. A central processing unit analyzes the data from at least one sensor in order to determine the amount of water and nutrients to be delivered to the plant. Water and nutrients are then delivered to the plant by an irrigation device at a predetermined rate.

It is an aspect of the present invention to provide a method of fertigation where the plant container is separated from the soil.

It is an aspect of the present invention to provide a method of fertigation where the plant container is separated from the underlying soil by elevating the plant container.

It is an aspect of the present invention to provide a method of fertigation where at least one sensor is used for measuring the total nutrient consumption by a plant in a container.

It is another aspect of the present invention to provide at least one sensor to be used for measuring the total water delivered to the plant.

It is another aspect of the present invention to provide at least one sensor for measuring the amount of excess water from the container.

It is still another aspect of the present invention to provide at least one sensor for measuring the chemical content of the excess water from the container.

It is still another aspect of the present invention to provide at least one sensor to measure the total amount of water that is continuously available to the plant.

It is still another aspect of the present invention to provide at least one sensor to measure the total amount of water delivered to the plant, wherein the sensor is a liquid volume gauge.

It is still another aspect of the present invention to provide at least one sensor under the plant container to measure the total volume of excess water from the container, wherein the sensor is a liquid volume gauge.

It is still another aspect of the present invention to provide a sensor under the plant container to measure the total amount of water available to the plant, wherein the sensor is a scale.

It is still another aspect of the present invention to provide a collection container under the plant container to measure the chemical content of the excess water from the plant container.

It is still another aspect of the present invention to provide at least one sensor for measuring the chemical content of the excess water from the plant container.

It is still another aspect of the present invention to provide a sensor to measure the total amount of water delivered to the plant, a sensor to measure excess water, a sensor to measure the total amount of water available to the plant and at least one sensor for the measurement of chemical concentrations.

It is still another aspect of the present invention that the data from the various sensors is analyzed by a computer fertigation controller.

It is still another aspect of the present invention that the analysis from the computer fertigation controller is used to determine the timing of irrigation events.

It is still another aspect of the present invention that the analysis from the computer fertigation controller determines the amount of water to be applied during an irrigation event.

It is still another aspect of the present invention that the analysis from the computer fertigation controller determines the concentration of nutritional components added to the irrigation water.

It is still another aspect of the present invention to provide an irrigation conduit along with a liquid drip emitter and a means of providing water and/or nutrients through the conduit at a predetermined schedule.

It is still another aspect of the present invention to provide a liquid drip emitter that is on an irrigation line.

It is still another aspect of the present invention to provide a plant or a part thereof that has an average increased nutrient value of greater than 5%.

It is still another aspect of the present invention to provide a plant or a part thereof that has increased yield per acre.

It is still another aspect of the present invention to provide a plant or a part thereof that has improved quality the plant or a part thereof.

It is still another aspect of the present invention that the harvest of a plant or a part thereof is greater than 30% earlier than conventionally grown plants.

It is still another aspect of the present invention to reduce water usage by 10% to 90% or more.

It is still another aspect of the present invention to reduce fertilizer usage by 10% to 80% or more.

It is still another aspect of the present invention to reduce risk of pest, fungal and insect infestations.

It is still another aspect of the present invention to provide a fertigation system comprising a central processing unit with at least one sensor for measuring total water consumption by a plant in a plant container. The system will also have a first communication device to send data from at least one sensor to the central processing unit and at least one mixing tank containing nutrients and water. The fertigation system will also have at least one injector that is in communication with the mixing tank and a second communication device to send instructions from the central processing unit to at least one injector. The fertigation system will also have an irrigation device for delivering water and nutrients to the plant where the central processing unit analyzes the data from at least one sensor and controls fertigation by determining the amount of water and nutrients to be delivered to the plant. The central processing unit will then instruct at least one injector to deliver water and nutrients from at least one mixing tank to the plant through an irrigation device.

It is still another aspect of the present invention to provide a fertigation system where the plant container is separated from the soil.

It is still another aspect of the present invention to provide a fertigation system where the plant container is separated from the soil.

It is still another aspect of the present invention to provide a fertigation system where the plant container is separated from the underlying soil by elevating the plant container.

It is still another aspect of the present invention to provide a fertigation system where at least one sensor is used to measure the amount of water delivered to the plant.

It is still another aspect of the present invention to provide a fertigation system and apparatus where at least one sensor is used to measure the total amount of excess water from the plant container.

It is still another aspect of the present invention to provide a fertigation system where at least one sensor is used to measure the chemical content of the excess water from the plant container.

It is still another aspect of the present invention to provide a fertigation system where at least one sensor is used to measure the total amount of water available to the plant.

It is still another aspect of the present invention to provide a fertigation system where at least one sensor is used to measure the total amount of water delivered to the plant, wherein the sensor is a liquid volume gauge.

It is still another aspect of the present invention to provide a fertigation system where at least one sensor is used to measure the total amount of excess water from the plant container, wherein the sensor is a liquid volume gauge.

It is still another aspect of the present invention to provide a fertigation system where a sensor is used to measure the total amount of water available to the plant, wherein the sensor is a scale.

It is still another aspect of the present invention to provide a fertigation system where at least one collection container is used for the measurement of the chemical content of the excess water from the plant container.

It is still another aspect of the present invention to provide a fertigation system where at least one sensor is used to measure chemical content.

It is still another aspect of the present invention to provide a fertigation system where a sensor is used to measure the total amount of water delivered to the plant, a sensor is used to measure the total amount of excess water from the plant container, a sensor is used to measure the total amount of water available to the plant and at least one sensor is used to measure chemical content.

It is still another aspect of the present invention to provide a fertigation system where data from at least one sensor is analyzed by a central processing unit.

It is still another aspect of the present invention to provide a fertigation system where the analysis from the central processing unit determines the timing of irrigation events.

It is still another aspect of the present invention to provide a fertigation system where the analysis from the central processing unit determines the amount of water to be applied during an irrigation event.

It is still another aspect of the present invention to provide a fertigation system where the analysis from the central processing unit is used in preparing the concentration of each nutritional component.

It is still another aspect of the present invention to provide a fertigation system where the irrigation device is a drip irritation line.

It is still another aspect of the present invention to provide a fertigation system where the plant container is periodically flushed.

It is still another aspect of the present invention to provide a method of fertigation comprising the steps of growing a plant in an elevated berm; providing at least one sensor for measuring the total water consumption by the plant in the elevated berm; analyzing data from said at least one sensor to determine the amount of water and nutrients to be delivered to the plant; and delivering the determined amount of water and nutrients to the plant by an irrigation device at a predetermined schedule.

It is still another aspect of the present invention to provide a method of fertigation further comprising at least one sensor from the group consisting of a soil moisture sensor, a stem diameter sensor, a fruit diameter sensor, a leaf temperature sensor, a relative-rate sap sensor, an infrared sensor, a near-infrared sensor and a stem auxanometer.

It is still another aspect of the present invention to provide a method of fertigation wherein data from at least one sensor is analyzed by a central processing unit.

It is still another aspect of the present invention to provide a method of fertigation wherein the analysis from said central processing unit determines the timing of irrigation events.

It is still another aspect of the present invention to provide a method of fertigation wherein the analysis from said central processing unit determines the amount of water to be applied during an irrigation event.

It is still another aspect of the present invention to provide a method of fertigation wherein the analysis from said central processing unit is used in preparing the concentration of each nutritional component.

It is still another aspect of the present invention to provide a method of fertigation wherein said irrigation device is a drip irritation line.

It is still another aspect of the present invention to provide a fertigation system comprising a central processing unit; at least one sensor for measuring total water consumption by a plant in a elevated berm; a first communication device to send data from said at least one sensor to the central processing unit; at least one mixing tank containing nutrients and water; at least one injector; a second communication device to send instructions from the central processing unit to said at least one injector; an irrigation device for delivering water and nutrients to the plant; wherein the central processing unit analyzes the data from said at least one sensor and controls fertigation by determining the amount of water and nutrients to be delivered to the plant and instructing said at least one injector to deliver water and nutrients from said at least one mixing tank to the plant through the irrigation device.

It is still another aspect of the present invention to provide a fertigation system further comprising at least one additional sensor from the group consisting of a soil moisture sensor, a stem diameter sensor, a fruit diameter sensor, a leaf temperature sensor, a relative-rate sap sensor, an infrared sensor, a near-infrared sensor and a stem auxanometer.

It is still another aspect of the present invention to provide a fertigation system wherein data from at least one sensor is analyzed by said central processing unit.

It is still another aspect of the present invention to provide a fertigation system wherein the analysis from said central processing unit determines the timing of irrigation events.

It is still another aspect of the present invention to provide a fertigation system wherein the analysis from said central processing unit determines the amount of water to be applied during an irrigation event.

It is still another aspect of the present invention to provide a fertigation system wherein the analysis from said central processing unit is used in preparing the concentration of each nutritional component.

It is still another aspect of the present invention to provide a fertigation system wherein said irrigation device is a drip irritation line.

In addition to the exemplary aspects and embodiments described above, further aspects and embodiments will become apparent by study of the following descriptions.

DEFINITIONS

In the description and tables which follow, a number of terms are used. In order to provide a clear and consistent understanding of the specification and claims, including the scope to be given such terms, the following definitions are provided:

Chemical content: means macro or micro fertilizer components such as nitrogen, phosphorus, potassium, iron, magnesium, zinc, pH and electroconductivity.

Computer fertigation controller: means the part of the computer control system that is dedicated to accepting data inputs from sensors and manual imports and then performs one or more necessary calculations to determine the starting times and durations for each irrigation event and the associated injection rates for the nutrition components added to the water.

Conventional growing methods: means current practices of plants grown in soil in the field and watered with flood, drip or sprinkler irrigation. This usually involves longer irrigation events than the current invention. Application of fertilizer is generally applied at set times throughout the growing season, rather than with each irrigation event. Comparatively, conventional growing techniques are much less intensive than the methods of the current invention, in which minimal amounts of fertilizer and other nutritional components are mixed with water so that plants are also fed each time they are watered.

Fertigation: means the watering of plants to aid in plant growth where nutrients are added to the water to improve plant growth.

Increased nutritional value: means vitamin and/or mineral content as much as 800% of United States Department of Agriculture standards.

Irrigation event: means on a specific day, at a specific time and for a specific duration, irrigation water is delivered to a plant, a plant part thereof and/or a container by way of an irrigation line.

Nutrient values: means vitamin and/or mineral content of a plant or a part thereof as reported by the United States Department of Agriculture.

Nutritional components: mean any vitamins, minerals and organic components that are needed to support plant metabolism.

Plant or a part thereof: means a whole plant, plant cells, plant protoplasts, plant cell tissue cultures from which plants can be regenerated, plant calli, plant clumps, and plant cells as well as embryos, pollen, ovules, flowers, leaves, roots, root tips, stem, trunk, bark, fruit, seed, nut, anthers, pistils, and the like.

Total water available to the plant: means the mass of the water remaining in the plant container and measured by taking the weight of the plant, soil and plant container on a scale and zeroing out the scale prior to the next irrigation event. Therefore only the mass of the water and not the mass of the plant, soil and container are measured.

Total water consumption: means the difference between the amount of water delivered to a plant container and the amount of water that drains out from the bottom of the container during and after an irrigation event and before the next irrigation event.

Total water delivered: means the volume of water in milliliters that is applied to a plant from a drip emitter during any single irrigation event.

BRIEF DESCRIPTION OF THE DRAWINGS

Exemplary embodiments are illustrated in referenced Figures of the drawings. It is intended that the embodiments and Figures disclosed herein are to be considered illustrative rather than limiting.

DETAILED DESCRIPTION OF THE INVENTION

Figure 1:
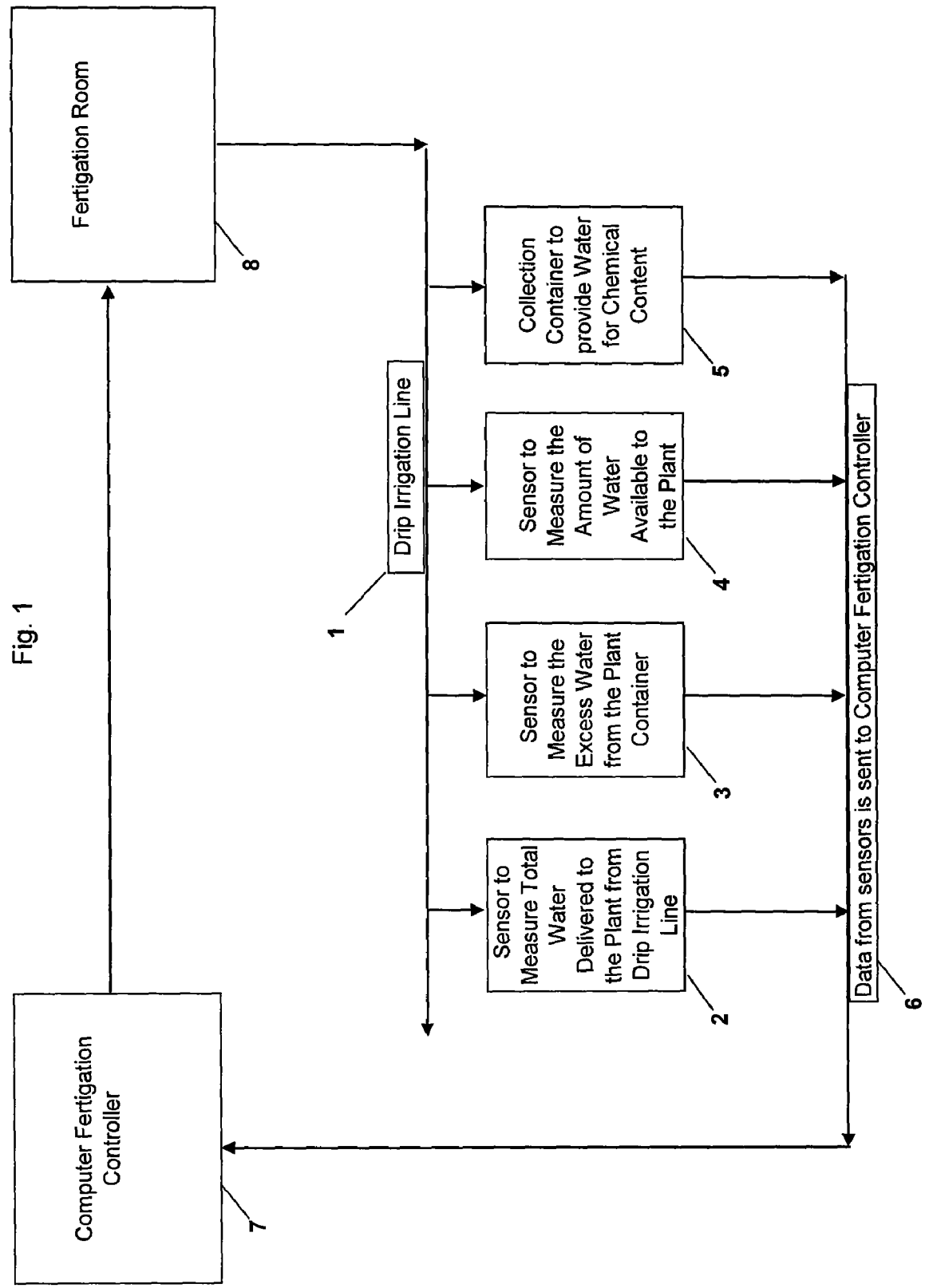
FIG. 1 shows a diagram depicting the process of measuring water consumption, the analysis of the data and the determination as to how much water and/or nutrients the plant required.

The present invention successfully improves the shortcomings of the presently known systems by providing a computer controlled fertigation system which enables a grower to monitor water and/or nutrient consumption by a plant in a container and automatically determine the appropriate amount of water and/or nutrients necessary for the next irrigation event and the timing of the next irrigation event.

Computer controlled fertigation through the use of sensors to monitor water and nutrient consumption by perennial plants or plants that live for more than two years, has not been used prior to the present invention.

The current invention has been successfully employed with a wide variety of plants, including but not limited to: citrus, table grapes, wine grapes, bananas, papaya, coffee, goji berries, figs, avocados, guava, pineapple, raspberries, blackberries, blueberries, olives, pistachios, pomegranates, artichokes and almonds.

The present invention provides a method of computer controlled fertigation with one or more sensors for measuring the total water consumption and/or one or more sensors to measure the total nutrient consumption by a plant. In one preferred embodiment of the present invention at least one sensor was provided to measure the total water delivered to the plant.

In a second preferred embodiment of the present invention, a sensor was provided to measure the volume of excess water from the plant. In another preferred embodiment of the present invention a weighing scale was placed under the plant to measure the total amount of water available to the plant and at least one collection container for receiving excess water from the plant container (a receptacle for holding the soil and the plant) was placed under the plant and an chemical content sensor was provided to measure the chemical content of the excess water. Additionally, in another preferred embodiment of the present invention, at least one sensor was provided to measure the total amount of water that was continuously available to the plant.

The data from the various sensors was sent to and analyzed by a computer fertigation controller. The computer fertigation controller then used the analysis to determine the timing of irrigation events as well as the amount of water and/or nutrients to be applied during the next irrigation event. The irrigation events would then be sent through an irrigation conduit with a liquid drip emitter or irrigation line that provides water and/or nutrients at a predetermined schedule Additionally, the present invention unexpectedly produced a plant, or a part thereof, that had increased nutrient values of approximately 100% or more as well as improved yield. The present invention has decreased the time from planting to harvesting of the plant or a part thereof by approximately 30% or more.

Example 1

Measurement of Water Consumption

In a first embodiment of the current invention, a series of four sensors was positioned in order to quantify the amount of water and/or nutrients that a plant consumed. These four sensors were used to measure: 1) the amount of water delivered to the plant; 2) the volume of excess water exiting from the plant; 3) the chemical content of the excess water from the plant; and 4) the total amount of water continuously available to the plant.

Figure 4:
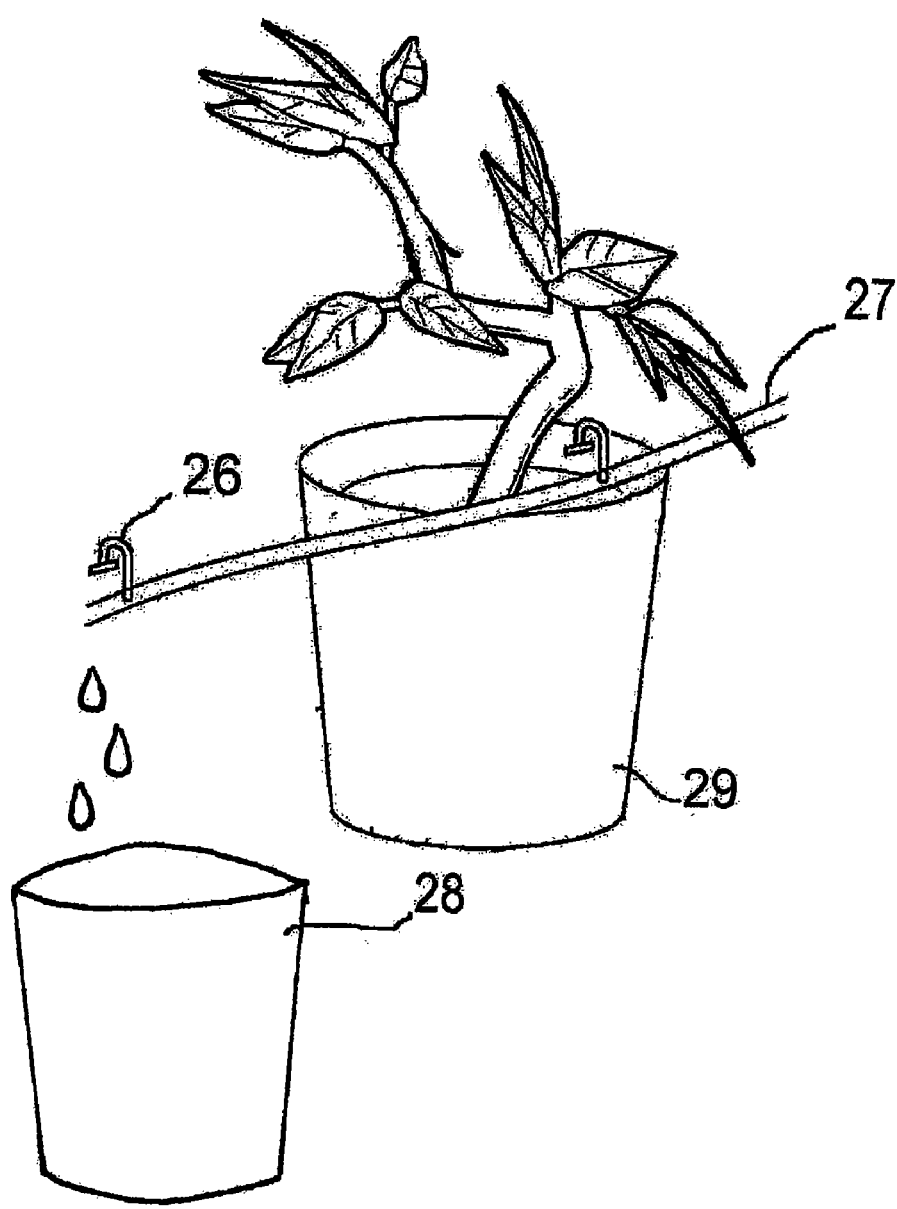
FIG. 4 shows a diagram depicting a plant in a plant container with an irrigation line delivering water to a drip emitter stationed over a sensor.

To measure the amount of water delivered to the plant, a sensor (for example, TB4-L Hydrological Services 8" Tipping Bucket Rain Gauge), as shown in FIG. 1, part 2 and FIG. 4, part 28, was stationed under a single set of drip emitters that deliver water to a single plant container. Alternatively, an in-line flow sensor could also be employed. The drip emitter is a device that is used on an irrigation line to transfer water to the area to be irrigated, as shown in FIG. 4, part 26, next to the plant container in FIG. 4 part 29. Netafim integrated drippers, pressure compensated on-line drippers or arrow drippers were used depending on the crop type grown. The sensor collected and measured the amount of water distributed from the drip emitter during watering events that provide water and/or nutrients to the neighboring plant. Alternatively, water may also be delivered via overhead sprinklers or through flood irrigation to plants in containers.

Drip emitters were situated along the irrigation line (also known as the drip irrigation line) which is a pipe, hose or conduit which delivers water and/or nutrients from the fertigation system to the base of plants under cultivation, as shown in FIG. 1, part 1 and FIG. 4, part 27. Preferably a drip emitter was located at the base of a plant and to each side of the plant. For example, for use with fruit trees, a drip emitter was placed at the base of the tree and to either side of the inside of the plant container. Alternatively, several drip emitters may surround the plant at various locations over the plant container. The drip emitter may simply be a small hole in the conduit through which liquid may slowly escape or a small tube running from the conduit and into the container.

Table 1 shows the volume of water that was applied to the plant container through the drip emitter in milliliters based on collection of the water directly from the drip emitter into a sensor. Table 1 also shows the dates and various times of the irrigation events as well as the ph and electrode concentrations of the water collected from the drip emitter. Column 1 of Table 1 shows the date, column 2 shows the time of the irrigation even and column 3 shows the total volume of water from the irrigation line in milliliters.

TABLE 1

| DATE | TIME OF IRRIGATION EVENT | VOLUME OF WATER FROM IRRIGATION LINE (ml) |
|---|---|---|
| May 25, 2006 | 11:20 AM | 2,500 |
| May 25, 2006 | 4:25 PM | 2,500 |
| May 26, 2006 | 11:35 AM | 2,375 |
| May 26, 2006 | 4:15 PM | 2,255 |
| May 26, 2006 | 3:25 PM | 1,375 |
| May 27, 2006 | 10:15 AM | 2,500 |
| May 27, 2006 | 4:00 PM | 2,625 |
| May 28, 2006 | 10:00 AM | 2,250 |
| May 28, 2006 | 3:40 PM | 2,375 |
| May 28, 2006 | 9:00 PM | 1,750 |
| May 29, 2006 | 11:00 AM | 2,200 |
| May 29, 2006 | 3:40 PM | 2,500 |
| May 29, 2006 | 9:00 PM | 1,375 |
| May 30, 2006 | 9:40 AM | 2,050 |
| May 30, 2006 | 3:00 PM | 2,500 |
| May 30, 2006 | 9:00 PM | 2,250 |
| May 31, 2006 | 11:00 AM | 2,150 |
| May 31, 2006 | 3:00 PM | 3,000 |
| Jun. 02, 2006 | 9:00 PM | 2,100 |
| Jun. 04, 2006 | 10:30 AM | 2,200 |
| Jun. 04, 2006 | 2:45 PM | 2,875 |
| Jun. 04, 2006 | 7:00 PM | 1,550 |
| Jun. 05, 2006 | 10:50 AM | 2,000 |
| Jun. 05, 2006 | 2:40 PM | 3,000 |
| Jun. 05, 2006 | 8:20 PM | 5,500 |
| Jun. 06, 2006 | 9:40 AM | 2,875 |
| Jun. 06, 2006 | 1:40 PM | 2,900 |
| Jun. 06, 2006 | 5:25 PM | 2,850 |
| Jun. 06, 2006 | 8:30 PM | 3,530 |
| Jun. 07, 2006 | 9:45 AM | 2,250 |
| Jun. 07, 2006 | 1:20 PM | 2,750 |
| Jun. 07, 2006 | 4:30 PM | 2,900 |
| Jun. 07, 2006 | 8:20 PM | 2,750 |
| Jun. 08, 2006 | 8:30 AM | 2,000 |
| Jun. 08, 2006 | 12:40 PM | 6,000 |
| Jun. 08, 2006 | 3:00 PM | 2,700 |
| Jun. 08, 2006 | 8:30 PM | 3,250 |
| Jun. 09, 2006 | 9:00 AM | 2,100 |
| Jun. 09, 2006 | 11:50 AM | 2,300 |
| Jun. 09, 2006 | 3:00 PM | 2,000 |
| Jun. 09, 2006 | 7:15 PM | 2,250 |
| Jun. 10, 2006 | 9:40 AM | 2,875 |
| Jun. 10, 2006 | 1:30 PM | 2,000 |
| Jun. 10, 2006 | 4:30 PM | 2,875 |
| Jun. 11, 2006 | 9:30 AM | 2,000 |
| Jun. 11, 2006 | 1:45 PM | 3,500 |
| Jun. 11, 2006 | 4:30 PM | 5,000 |
| Jun. 11, 2006 | 8:30 PM | 2,750 |
| Jun. 12, 2006 | 8:10 AM | 2,050 |
| Jun. 12, 2006 | 10:50 AM | 2,400 |
| Jun. 12, 2006 | 1:40 PM | 2,400 |
| Jun. 12, 2006 | 4:00 PM | 2,375 |
| Jun. 12, 2006 | 7:30 PM | 2,400 |
| Jun. 13, 2006 | 10:35 AM | 2,150 |
| Jun. 13, 2006 | 1:00 PM | 2,500 |
| Jun. 13, 2006 | 3:00 PM | 2,375 |
| Jun. 13, 2006 | 6:45 PM | 2,375 |
| Jun. 14, 2006 | 10:20 AM | 2,000 |
| Jun. 14, 2006 | 12:30 PM | 2,325 |
| Jun. 14, 2006 | 2:35 PM | 2,200 |
| Jun. 14, 2006 | 8:30 PM | 1,750 |

TABLE 1-continued

| DATE | TIME OF IRRIGATION EVENT | VOLUME OF WATER FROM IRRIGATION LINE (ml) |
|---|---|---|
| Jun. 15, 2006 | 11:30 AM | 2,200 |
| Jun. 15, 2006 | 1:15 PM | 3,125 |
| Jun. 15, 2006 | 3:30 PM | 2,375 |
| Jun. 15, 2006 | 8:30 PM | 3,250 |
| Jun. 16, 2006 | 10:00 AM | 2,200 |
| Jun. 16, 2006 | 12:30 PM | 2,350 |
| Jun. 16, 2006 | 2:30 PM | 2,150 |
| Jun. 16, 2006 | 5:30 PM | 2,500 |
| Jun. 16, 2006 | 8:30 PM | 2,500 |
| Jun. 17, 2006 | 9:30 AM | 2,400 |
| Jun. 17, 2006 | 10:20 PM | 2,500 |
| Jun. 17, 2006 | 2:35 PM | 2,000 |
| Jun. 17, 2006 | 5:30 PM | 2,400 |
| Jun. 17, 2006 | 5:30 PM | 2,375 |
| Jun. 18, 2006 | 8:30 AM | 2,325 |
| Jun. 18, 2006 | 11:00 AM | 2,500 |
| Jun. 18, 2006 | 1:20 PM | 2,500 |
| Jun. 18, 2006 | 3:30 PM | 2,325 |
| Jun. 18, 2006 | 5:30 PM | 2,500 |
| Jun. 19, 2006 | 7:30 AM | 2,050 |
| Jun. 19, 2006 | 10:45 AM | 2,000 |
| Jun. 19, 2006 | 1:30 PM | 2,300 |
| Jun. 19, 2006 | 3:30 PM | 2,375 |
| Jun. 19, 2006 | 5:52 PM | 2,300 |
| Jun. 20, 2006 | 9:00 AM | 2,225 |
| Jun. 20, 2006 | 11:20 AM | 2,075 |
| Jun. 20, 2006 | 1:45 PM | 2,250 |
| Jun. 20, 2006 | 4:00 PM | 2,150 |
| Jun. 20, 2006 | 5:45 PM | 2,250 |
| Jun. 21, 2006 | 9:00 AM | 2,275 |
| Jun. 21, 2006 | 11:45 AM | 2,000 |
| Jun. 21, 2006 | 1:40 PM | 1,550 |
| Jun. 21, 2006 | 3:30 PM | 2,300 |
| Jun. 21, 2006 | 6:30 PM | 2,000 |
| Jun. 22, 2006 | 8:00 AM | 2,075 |
| Jun. 22, 2006 | 10:05 AM | 2,050 |
| Jun. 22, 2006 | 12:15 PM | 2,000 |
| Jun. 22, 2006 | 2:00 PM | 2,150 |
| Jun. 22, 2006 | 4:00 PM | 2,500 |
| Jun. 23, 2006 | 8:30 AM | 2,350 |
| Jun. 23, 2006 | 10:30 AM | 2,125 |
| Jun. 23, 2006 | 12:30 PM | 2,000 |
| Jun. 23, 2006 | 2:30 PM | 2,225 |
| Jun. 23, 2006 | 4:30 PM | 2,050 |
| Jun. 24, 2006 | 6:10 AM | 2,300 |
| Jun. 24, 2006 | 9:15 AM | 2,275 |
| Jun. 24, 2006 | 11:15 AM | 2,300 |
| Jun. 24, 2006 | 1:10 PM | 1,900 |
| Jun. 24, 2006 | 3:00 PM | 2,100 |
| Jun. 25, 2006 | 6:20 AM | 2,375 |
| Jun. 25, 2006 | 9:30 AM | 2,100 |
| Jun. 25, 2006 | 11:30 AM | 2,225 |
| Jun. 25, 2006 | 1:45 PM | 2,200 |
| Jun. 25, 2006 | 3:45 PM | 2,075 |
| Jun. 26, 2006 | 7:00 AM | 2,350 |
| Jun. 26, 2006 | 9:25 AM | 2,375 |
| Jun. 26, 2006 | 11:25 AM | 2,200 |
| Jun. 26, 2006 | 1:25 PM | 2,300 |
| Jun. 26, 2006 | 3:25 PM | 2,375 |
| Jun. 27, 2006 | 6:10 AM | 1,775 |
| Jun. 27, 2006 | 8:00 AM | 1,750 |
| Jun. 27, 2006 | 11:30 AM | 1,750 |
| Jun. 27, 2006 | 1:30 PM | 1,850 |
| Jun. 27, 2006 | 3:30 PM | 1,550 |
| Jun. 29, 2006 | 9:00 AM | 1,250 |
| Jun. 29, 2006 | 11:00 AM | 1,175 |
| Jun. 29, 2006 | 1:00 PM | 1,300 |
| Jun. 29, 2006 | 3:10 PM | 1,250 |
| Jun. 29, 2006 | 5:00 PM | 1,100 |
| Jun. 30, 2006 | 9:30 AM | 1,250 |
| Jun. 30, 2006 | 11:30 AM | 1,375 |
| Jun. 30, 2006 | 1:30 PM | 1,125 |
| Jun. 30, 2006 | 3:30 PM | 1,125 |
| Jun. 30, 2006 | 5:15 PM | 1,500 |
| Jun. 30, 2006 | 7:00 PM | 1,650 |

TABLE 1-continued

| DATE | TIME OF IRRIGATION EVENT | VOLUME OF WATER FROM IRRIGATION LINE (ml) |
|---|---|---|
| Jun. 30, 2006 | 9:15 PM | 1,625 |
| Jul. 01, 2006 | 9:00 AM | 1,250 |
| Jul. 01, 2006 | 11:00 AM | 1,050 |
| Jul. 01, 2006 | 1:00 PM | 1,450 |
| Jul. 01, 2006 | 3:00 PM | 1,250 |
| Jul. 01, 2006 | 5:00 PM | 1,325 |
| Jul. 01, 2006 | 7:00 PM | 1,300 |
| Jul. 01, 2006 | 9:45 PM | 1,375 |
| Jul. 02, 2006 | 10:00 AM | 1,375 |
| Jul. 02, 2006 | 12:00 PM | 1,625 |
| Jul. 02, 2006 | 1:45 PM | 1,500 |
| Jul. 02, 2006 | 3:20 PM | 1,500 |
| Jul. 02, 2006 | 4:20 PM | 1,625 |
| Jul. 02, 2006 | 6:00 PM | 1,375 |
| Jul. 02, 2006 | 8:00 PM | 1,250 |
| Jul. 02, 2006 | 9:15 PM | 1,900 |
| Jul. 03, 2006 | 9:00 AM | 1,250 |
| Jul. 03, 2006 | 11:00 AM | 1,025 |
| Jul. 03, 2006 | 1:00 PM | 1,250 |
| Jul. 03, 2006 | 2:30 PM | 1,250 |
| Jul. 03, 2006 | 4:00 PM | 1,350 |
| Jul. 03, 2006 | 6:00 PM | 1,125 |
| Jul. 03, 2006 | 9:35 PM | 1,350 |
| Jul. 04, 2006 | 9:00 AM | 1,500 |
| Jul. 04, 2006 | 10:30 AM | 1,300 |
| Jul. 04, 2006 | 12:00 PM | 1,350 |
| Jul. 04, 2006 | 2:15 PM | 1,375 |
| Jul. 04, 2006 | 4:00 PM | 1,250 |
| Jul. 04, 2006 | 6:00 PM | 1,250 |
| Jul. 04, 2006 | 7:50 PM | 1,500 |
| Jul. 04, 2006 | 9:45 PM | 1,375 |
| Jul. 05, 2006 | 9:00 AM | 1,250 |
| Jul. 05, 2006 | 11:00 AM | 1,050 |
| Jul. 05, 2006 | 12:40 PM | 1,250 |
| Jul. 05, 2006 | 2:30 PM | 1,375 |
| Jul. 05, 2006 | 4:20 PM | 1,000 |
| Jul. 05, 2006 | 5:50 PM | 1,600 |
| Jul. 05, 2006 | 7:45 PM | 1,375 |
| Jul. 05, 2006 | 10:00 PM | 1,900 |
| Jul. 06, 2006 | 9:00 AM | 1,250 |
| Jul. 06, 2006 | 11:15 AM | 1,225 |
| Jul. 06, 2006 | 1:10 PM | 1,250 |
| Jul. 06, 2006 | 3:00 PM | 1,325 |
| Jul. 06, 2006 | 5:00 PM | 1,125 |
| Jul. 06, 2006 | 6:50 PM | 1,375 |
| Jul. 06, 2006 | 9:35 PM | 1,500 |
| Jul. 07, 2006 | 9:00 AM | 1,250 |
| Jul. 07, 2006 | 11:05 AM | 1,375 |
| Jul. 07, 2006 | 1:15 PM | 1,125 |
| Jul. 07, 2006 | 3:10 PM | 1,375 |
| Jul. 07, 2006 | 4:30 PM | 1,125 |
| Jul. 07, 2006 | 6:00 PM | 1,500 |
| Jul. 07, 2006 | 9:30 PM | 1,375 |
| Jul. 08, 2006 | 9:15 AM | 1,250 |
| Jul. 08, 2006 | 11:15 AM | 1,125 |
| Jul. 08, 2006 | 12:45 PM | 1,375 |
| Jul. 08, 2006 | 2:00 PM | 1,000 |
| Jul. 08, 2006 | 2:50 PM | 1,250 |
| Jul. 08, 2006 | 3:55 PM | 1,250 |
| Jul. 08, 2006 | 5:15 PM | 1,375 |
| Jul. 08, 2006 | 7:30 PM | 1,250 |
| Jul. 09, 2006 | 9:00 AM | 1,350 |
| Jul. 09, 2006 | 10:30 AM | 1,250 |
| Jul. 09, 2006 | 12:15 PM | 1,250 |
| Jul. 09, 2006 | 1:25 PM | 1,250 |
| Jul. 09, 2006 | 2:50 PM | 970 |
| Jul. 09, 2006 | 4:10 PM | 1,370 |
| Jul. 09, 2006 | 6:00 PM | 1,400 |
| Jul. 09, 2006 | 7:50 PM | 1,375 |
| Jul. 10, 2006 | 9:00 AM | 1,250 |
| Jul. 10, 2006 | 10:45 AM | 1,375 |
| Jul. 10, 2006 | 12:25 PM | 1,250 |
| Jul. 10, 2006 | 2:00 PM | 1,125 |
| Jul. 10, 2006 | 3:30 PM | 1,225 |
| Jul. 10, 2006 | 5:15 PM | 2,000 |
| Jul. 10, 2006 | 7:30 PM | 1,375 |
| Jul. 10, 2006 | 10:15 PM | 1,100 |
| Jul. 11, 2006 | 9:15 AM | 1,275 |
| Jul. 11, 2006 | 11:25 AM | 1,250 |
| Jul. 11, 2006 | 1:05 PM | 1,050 |
| Jul. 11, 2006 | 2:45 PM | 1,275 |
| Jul. 11, 2006 | 4:30 PM | 1,275 |
| Jul. 11, 2006 | 6:40 PM | 1,375 |
| Jul. 11, 2006 | 9:20 PM | 1,000 |
| Jul. 12, 2006 | 9:30 AM | 1,375 |
| Jul. 12, 2006 | 12:00 PM | 1,125 |
| Jul. 12, 2006 | 1:45 PM | 1,125 |
| Jul. 12, 2006 | 3:30 PM | 1,025 |
| Jul. 12, 2006 | 4:50 PM | 1,375 |
| Jul. 12, 2006 | 6:15 PM | 1,375 |
| Jul. 12, 2006 | 9:20 PM | 1,375 |
| Jul. 13, 2006 | 9:50 AM | 1,375 |
| Jul. 13, 2006 | 11:50 AM | 1,000 |
| Jul. 13, 2006 | 1:35 PM | 1,375 |
| Jul. 13, 2006 | 3:30 PM | 1,225 |
| Jul. 13, 2006 | 5:10 PM | 1,375 |
| Jul. 13, 2006 | 6:15 PM | 1,375 |
| Jul. 14, 2006 | 9:45 AM | 1,375 |
| Jul. 14, 2006 | 11:30 AM | 1,450 |
| Jul. 14, 2006 | 1:15 PM | 1,375 |
| Jul. 14, 2006 | 3:00 PM | 1,275 |
| Jul. 14, 2006 | 4:45 PM | 1,375 |
| Jul. 14, 2006 | 6:00 PM | 1,400 |
| Jul. 14, 2006 | 9:15 PM | 1,250 |
| Jul. 15, 2006 | 9:45 AM | 1,375 |
| Jul. 15, 2006 | 11:25 AM | 1,375 |
| Jul. 15, 2006 | 1:05 PM | 1,400 |
| Jul. 15, 2006 | 2:40 PM | 1,225 |
| Jul. 15, 2006 | 4:25 PM | 1,250 |
| Jul. 15, 2006 | 6:20 PM | 1,250 |
| Jul. 16, 2006 | 9:15 AM | 1,000 |
| Jul. 16, 2006 | 11:05 AM | 1,375 |
| Jul. 16, 2006 | 12:50 PM | 1,375 |
| Jul. 16, 2006 | 2:30 PM | 1,125 |
| Jul. 16, 2006 | 3:55 PM | 1,375 |
| Jul. 16, 2006 | 5:30 PM | 1,625 |
| Jul. 16, 2006 | 9:00 PM | 1,350 |
| Jul. 17, 2006 | 8:50 AM | 1,375 |
| Jul. 17, 2006 | 10:50 AM | 1,375 |
| Jul. 17, 2006 | 12:45 PM | 1,375 |
| Jul. 17, 2006 | 2:25 PM | 1,250 |
| Jul. 17, 2006 | 3:55 PM | 1,125 |
| Jul. 17, 2006 | 6:45 PM | 1,125 |
| Jul. 18, 2006 | 9:00 AM | 1,375 |
| Jul. 18, 2006 | 11:15 AM | 1,625 |
| Jul. 18, 2006 | 1:15 PM | 1,750 |
| Jul. 18, 2006 | 3:25 PM | 1,625 |
| Jul. 18, 2006 | 7:35 PM | 1,375 |
| Jul. 19, 2006 | 9:10 AM | 1,700 |
| Jul. 19, 2006 | 11:30 AM | 1,725 |
| Jul. 19, 2006 | 1:20 PM | 1,650 |
| Jul. 19, 2006 | 3:00 PM | 1,425 |
| Jul. 19, 2006 | 5:00 PM | 1,375 |
| Jul. 19, 2006 | 8:00 PM | 1,780 |
| Jul. 20, 2006 | 9:00 AM | 1,725 |
| Jul. 20, 2006 | 11:05 AM | 1,725 |
| Jul. 20, 2006 | 1:05 PM | 1,750 |
| Jul. 20, 2006 | 2:40 PM | 1,525 |
| Jul. 20, 2006 | 4:15 PM | 1,300 |
| Jul. 20, 2006 | 6:35 PM | 1,300 |
| Jul. 21, 2006 | 8:55 AM | 1,900 |
| Jul. 21, 2006 | 11:35 AM | 1,725 |
| Jul. 21, 2006 | 1:40 PM | 1,750 |
| Jul. 21, 2006 | 3:25 PM | 2,150 |
| Jul. 21, 2006 | 5:40 PM | 1,250 |
| Jul. 22, 2006 | 9:10 AM | 1,425 |
| Jul. 22, 2006 | 11:25 AM | 1,375 |
| Jul. 22, 2006 | 12:50 PM | 1,275 |
| Jul. 22, 2006 | 2:15 PM | 1,250 |
| Jul. 22, 2006 | 4:00 PM | 1,500 |

TABLE 1-continued

| DATE | TIME OF IRRIGATION EVENT | VOLUME OF WATER FROM IRRIGATION LINE (ml) |
|---|---|---|
| Jul. 22, 2006 | 6:00 PM | 2,200 |
| Jul. 24, 2006 | 8:30 AM | 1,750 |
| Jul. 24, 2006 | 10:15 AM | 1,500 |
| Jul. 24, 2006 | 11:45 AM | 1,575 |
| Jul. 24, 2006 | 1:20 PM | 1,375 |
| Jul. 24, 2006 | 2:35 PM | 1,750 |
| Jul. 24, 2006 | 4:15 PM | 1,625 |
| Jul. 24, 2006 | 6:15 PM | 1,125 |
| Jul. 25, 2006 | 9:00 AM | 1,750 |
| Jul. 25, 2006 | 10:50 AM | 1,500 |
| Jul. 25, 2006 | 12:20 PM | 1,750 |
| Jul. 25, 2006 | 2:00 PM | 1,650 |
| Jul. 25, 2006 | 3:35 PM | 2,100 |
| Jul. 25, 2006 | 5:10 PM | 1,375 |
| Jul. 25, 2006 | 6:30 PM | 1,750 |
| Jul. 26, 2006 | 9:15 AM | 1,625 |
| Jul. 26, 2006 | 11:10 AM | 1,750 |
| Jul. 26, 2006 | 12:50 PM | 1,750 |
| Jul. 26, 2006 | 2:20 PM | 1,375 |
| Jul. 26, 2006 | 3:40 PM | 1,500 |
| Jul. 26, 2006 | 5:00 PM | 1,500 |
| Jul. 27, 2006 | 9:15 AM | 1,750 |
| Jul. 27, 2006 | 11:25 AM | 1,750 |
| Jul. 27, 2006 | 12:50 PM | 1,900 |
| Jul. 27, 2006 | 2:15 PM | 1,750 |
| Jul. 27, 2006 | 3:40 PM | 1,500 |
| Jul. 27, 2006 | 5:00 PM | 1,750 |
| Jul. 28, 2006 | 9:05 AM | 1,750 |
| Jul. 28, 2006 | 10:50 AM | 1,625 |
| Jul. 28, 2006 | 12:15 PM | 1,500 |
| Jul. 28, 2006 | 1:35 PM | 1,850 |
| Jul. 28, 2006 | 3:05 PM | 1,525 |
| Jul. 28, 2006 | 6:00 PM | 1,750 |
| Jul. 28, 2006 | 8:30 PM | 1,625 |
| Jul. 29, 2006 | 9:10 AM | 1,750 |
| Jul. 29, 2006 | 10:45 AM | 1,525 |
| Jul. 29, 2006 | 12:15 PM | 1,525 |
| Jul. 29, 2006 | 1:40 PM | 1,750 |
| Jul. 29, 2006 | 3:05 PM | 1,375 |
| Jul. 29, 2006 | 4:31 PM | 1,750 |
| Jul. 29, 2006 | 6:25 PM | 1,750 |
| Jul. 31, 2006 | 8:30 AM | 1,625 |
| Jul. 31, 2006 | 10:30 AM | 1,600 |
| Jul. 31, 2006 | 12:05 PM | 1,500 |
| Jul. 31, 2006 | 1:45 PM | 1,750 |
| Jul. 31, 2006 | 3:10 PM | 1,750 |
| Jul. 31, 2006 | 4:20 PM | 1,750 |
| Jul. 31, 2006 | 6:00 PM | 1,625 |
| Jul. 31, 2006 | 7:45 PM | 1,625 |
| Aug. 01, 2006 | 7:53 AM | 1,625 |
| Aug. 01, 2006 | 10:48 AM | 1,750 |
| Aug. 01, 2006 | 12:20 PM | 1,500 |
| Aug. 01, 2006 | 2:15 PM | 1,750 |
| Aug. 01, 2006 | 3:48 PM | 1,625 |
| Aug. 01, 2006 | 5:30 PM | 1,375 |
| Aug. 01, 2006 | 8:30 PM | 1,500 |
| Aug. 02, 2006 | 9:28 AM | 1,500 |
| Aug. 02, 2006 | 11:44 AM | 1,375 |
| Aug. 02, 2006 | 1:37 PM | 1,625 |
| Aug. 02, 2006 | 4:40 PM | 3,900 |
| Aug. 02, 2006 | 6:20 PM | 1,300 |
| Aug. 02, 2006 | 9:00 PM | 1,050 |
| Aug. 03, 2006 | 9:33 AM | 1,625 |
| Aug. 03, 2006 | 11:52 AM | 2,000 |
| Aug. 03, 2006 | 1:29 PM | 1,625 |
| Aug. 03, 2006 | 2:53 PM | 1,625 |
| Aug. 03, 2006 | 5:15 PM | 1,025 |
| Aug. 03, 2006 | 7:30 PM | 1,900 |
| Aug. 04, 2006 | 9:40 AM | 1,625 |
| Aug. 04, 2006 | 11:05 AM | 1,625 |
| Aug. 04, 2006 | 12:44 PM | 875 |
| Aug. 04, 2006 | 2:01 PM | 1,625 |
| Aug. 04, 2006 | 3:30 PM | 1,625 |
| Aug. 04, 2006 | 5:00 PM | 1,500 |
| Aug. 04, 2006 | 6:30 PM | 1,150 |
| Aug. 04, 2006 | 9:25 PM | 1,500 |
| Aug. 05, 2006 | 8:47 AM | 1,625 |
| Aug. 05, 2006 | 10:30 AM | 1,625 |
| Aug. 05, 2006 | 12:06 PM | 1,625 |
| Aug. 05, 2006 | 1:48 PM | 1,625 |
| Aug. 05, 2006 | 3:05 PM | 1,625 |
| Aug. 05, 2006 | 4:25 PM | 1,625 |
| Aug. 05, 2006 | 6:15 PM | 2,000 |
| Aug. 05, 2006 | 9:30 PM | 1,250 |
| Aug. 06, 2006 | 9:00 AM | 1,625 |
| Aug. 07, 2006 | 8:56 AM | 1,625 |
| Aug. 07, 2006 | 10:28 AM | 1,625 |
| Aug. 07, 2006 | 12:00 PM | 1,625 |
| Aug. 07, 2006 | 1:10 PM | 1,375 |
| Aug. 07, 2006 | 2:34 PM | 1,625 |
| Aug. 07, 2006 | 3:59 PM | 1,500 |
| Aug. 07, 2006 | 5:11 PM | 1,500 |
| Aug. 07, 2006 | 8:30 PM | 1,500 |
| Aug. 08, 2006 | 8:00 AM | 1,125 |
| Aug. 08, 2006 | 11:10 AM | 1,500 |
| Aug. 08, 2006 | 12:44 PM | 1,625 |
| Aug. 08, 2006 | 2:05 PM | 1,500 |
| Aug. 08, 2006 | 3:22 PM | 1,500 |
| Aug. 08, 2006 | 4:50 PM | 1,625 |
| Aug. 08, 2006 | 6:20 PM | 1,500 |
| Aug. 09, 2006 | 10:40 AM | 1,750 |
| Aug. 09, 2006 | 12:09 PM | 1,750 |
| Aug. 09, 2006 | 1:36 PM | 1,750 |
| Aug. 09, 2006 | 3:04 PM | 1,750 |
| Aug. 09, 2006 | 4:26 PM | 1,750 |
| Aug. 09, 2006 | 6:15 PM | 1,250 |
| Aug. 10, 2006 | 8:04 AM | 1,125 |
| Aug. 10, 2006 | 11:46 AM | 1,900 |
| Aug. 10, 2006 | 1:17 PM | 1,750 |
| Aug. 10, 2006 | 2:45 PM | 1,500 |
| Aug. 10, 2006 | 4:11 PM | 1,375 |
| Aug. 10, 2006 | 5:45 PM | 1,750 |
| Aug. 10, 2006 | 9:00 PM | 1,500 |
| Aug. 11, 2006 | 8:40 AM | 1,750 |
| Aug. 11, 2006 | 10:26 AM | 1,750 |
| Aug. 11, 2006 | 11:54 AM | 1,750 |
| Aug. 11, 2006 | 1:20 PM | 1,750 |
| Aug. 11, 2006 | 2:51 PM | 1,750 |
| Aug. 11, 2006 | 4:17 PM | 1,500 |
| Aug. 11, 2006 | 5:26 PM | 1,500 |
| Aug. 11, 2006 | 8:12 PM | 1,750 |
| Aug. 11, 2006 | 10:01 PM | 1,750 |
| Aug. 12, 2006 | 8:12 AM | 1,750 |
| Aug. 12, 2006 | 10:00 AM | 1,750 |
| Aug. 12, 2006 | 11:30 AM | 1,900 |
| Aug. 12, 2006 | 12:55 PM | 1,775 |
| Aug. 12, 2006 | 2:24 PM | 1,625 |
| Aug. 12, 2006 | 3:37 PM | 1,750 |
| Aug. 12, 2006 | 4:50 PM | 1,750 |
| Aug. 13, 2006 | 9:35 AM | 1,750 |
| Aug. 13, 2006 | 11:30 AM | 1,625 |
| Aug. 13, 2006 | 12:58 PM | 1,750 |
| Aug. 13, 2006 | 2:25 PM | 1,750 |
| Aug. 13, 2006 | 3:44 PM | 1,625 |
| Aug. 13, 2006 | 5:40 PM | 1,750 |
| Aug. 13, 2006 | 6:20 PM | 1,700 |
| Aug. 13, 2006 | 8:30 PM | 1,375 |
| Aug. 14, 2006 | 8:23 AM | 1,750 |
| Aug. 14, 2006 | 10:13 AM | 1,750 |
| Aug. 14, 2006 | 11:53 AM | 1,750 |
| Aug. 14, 2006 | 1:18 PM | 1,625 |
| Aug. 14, 2006 | 3:16 PM | 1,625 |
| Aug. 14, 2006 | 4:42 PM | 1,625 |
| Aug. 14, 2006 | 8:45 PM | 1,325 |
| Aug. 15, 2006 | 9:04 AM | 1,750 |
| Aug. 15, 2006 | 10:54 AM | 1,900 |
| Aug. 15, 2006 | 12:27 PM | 1,750 |
| Aug. 15, 2006 | 1:44 PM | 1,900 |
| Aug. 15, 2006 | 3:44 PM | 1,750 |
| Aug. 15, 2006 | 4:41 PM | 1,750 |

TABLE 1-continued

| DATE | TIME OF IRRIGATION EVENT | VOLUME OF WATER FROM IRRIGATION LINE (ml) |
|---|---|---|
| Aug. 15, 2006 | 6:50 PM | 1,900 |
| Aug. 16, 2006 | 9:36 AM | 1,750 |
| Aug. 16, 2006 | 11:05 AM | 1,500 |
| Aug. 16, 2006 | 12:35 PM | 1,750 |
| Aug. 16, 2006 | 2:13 PM | 1,625 |
| Aug. 16, 2006 | 3:35 PM | 1,625 |
| Aug. 16, 2006 | 5:27 PM | 1,750 |
| Aug. 16, 2006 | 8:45 PM | 1,625 |
| Aug. 17, 2006 | 9:14 AM | 1,500 |
| Aug. 17, 2006 | 11:02 AM | 1,500 |
| Aug. 17, 2006 | 12:26 PM | 1,750 |
| Aug. 17, 2006 | 2:14 PM | 1,750 |
| Aug. 17, 2006 | 3:50 PM | 1,750 |
| Aug. 17, 2006 | 5:35 PM | 1,750 |
| Aug. 17, 2006 | 8:30 PM | 1,825 |
| Aug. 18, 2006 | 9:49 AM | 1,750 |
| Aug. 18, 2006 | 11:44 AM | 1,750 |
| Aug. 18, 2006 | 1:38 PM | 1,625 |
| Aug. 18, 2006 | 3:13 PM | 1,625 |
| Aug. 18, 2006 | 4:42 PM | 1,750 |
| Aug. 18, 2006 | 9:00 PM | 1,900 |
| Aug. 19, 2006 | 9:39 AM | 1,750 |
| Aug. 19, 2006 | 11:32 AM | 1,750 |
| Aug. 19, 2006 | 1:27 PM | 1,500 |
| Aug. 19, 2006 | 3:04 PM | 1,590 |
| Aug. 19, 2006 | 4:56 PM | 1,625 |
| Aug. 19, 2006 | 7:45 PM | 1,600 |
| Aug. 20, 2006 | 10:05 AM | 1,900 |
| Aug. 20, 2006 | 12:20 PM | 1,750 |
| Aug. 20, 2006 | 2:16 PM | 1,750 |
| Aug. 20, 2006 | 4:00 PM | 1,750 |
| Aug. 20, 2006 | 6:30 PM | 1,900 |
| Aug. 20, 2006 | 8:25 PM | 1,500 |
| Aug. 21, 2006 | 7:18 AM | 1,750 |
| Aug. 21, 2006 | 10:36 AM | 1,590 |
| Aug. 21, 2006 | 12:16 PM | 1,690 |
| Aug. 21, 2006 | 1:55 PM | 1,750 |
| Aug. 21, 2006 | 3:24 PM | 1,650 |
| Aug. 21, 2006 | 4:57 PM | 1,625 |
| Aug. 21, 2006 | 7:20 PM | 1,900 |
| Aug. 22, 2006 | 9:23 AM | 1,900 |
| Aug. 22, 2006 | 11:13 AM | 1,380 |
| Aug. 22, 2006 | 12:40 PM | 1,750 |
| Aug. 22, 2006 | 2:12 PM | 1,625 |
| Aug. 22, 2006 | 3:30 PM | 1,625 |
| Aug. 22, 2006 | 5:00 PM | 1,625 |
| Aug. 22, 2006 | 7:20 PM | 1,900 |
| Aug. 23, 2006 | 9:40 AM | 1,790 |
| Aug. 23, 2006 | 11:23 AM | 1,625 |
| Aug. 23, 2006 | 12:42 PM | 1,780 |
| Aug. 23, 2006 | 2:05 PM | 1,770 |
| Aug. 23, 2006 | 3:24 PM | 1,750 |
| Aug. 23, 2006 | 4:50 PM | 1,500 |
| Aug. 23, 2006 | 6:30 PM | 1,625 |
| Aug. 23, 2006 | 8:30 PM | 1,900 |
| Aug. 24, 2006 | 9:16 AM | 1,750 |
| Aug. 24, 2006 | 10:47 AM | 1,625 |
| Aug. 24, 2006 | 12:00 PM | 1,900 |
| Aug. 24, 2006 | 1:25 PM | 1,790 |
| Aug. 24, 2006 | 3:01 PM | 1,790 |
| Aug. 24, 2006 | 4:34 PM | 1,900 |
| Aug. 24, 2006 | 6:30 PM | 1,000 |
| Aug. 24, 2006 | 8:45 PM | 1,250 |
| Aug. 25, 2006 | 9:22 AM | 2,650 |
| Aug. 25, 2006 | 11:17 AM | 1,900 |
| Aug. 25, 2006 | 12:55 PM | 1,790 |
| Aug. 25, 2006 | 2:28 PM | 1,500 |
| Aug. 25, 2006 | 3:46 PM | 1,900 |
| Aug. 25, 2006 | 5:21 PM | 1,900 |
| Aug. 26, 2006 | 8:30 AM | 2,000 |
| Aug. 26, 2006 | 10:47 AM | 1,625 |
| Aug. 26, 2006 | 12:27 PM | 1,750 |
| Aug. 26, 2006 | 2:10 PM | 1,290 |
| Aug. 26, 2006 | 3:25 PM | 1,750 |
| Aug. 26, 2006 | 4:51 PM | 1,390 |
| Aug. 26, 2006 | 7:00 PM | 1,050 |
| Aug. 27, 2006 | 8:45 AM | 2,300 |
| Aug. 27, 2006 | 10:51 AM | 1,750 |
| Aug. 27, 2006 | 12:33 PM | 1,290 |
| Aug. 27, 2006 | 2:02 PM | 1,750 |
| Aug. 27, 2006 | 3:40 PM | 1,750 |
| Aug. 27, 2006 | 5:20 PM | 1,750 |
| Aug. 27, 2006 | 8:00 PM | 220 |
| Aug. 28, 2006 | 9:15 AM | 1,750 |
| Aug. 28, 2006 | 11:02 AM | 1,890 |
| Aug. 28, 2006 | 12:36 PM | 1,790 |
| Aug. 28, 2006 | 2:12 PM | 1,750 |
| Aug. 28, 2006 | 3:04 PM | 1,625 |
| Aug. 28, 2006 | 4:27 PM | 1,900 |
| Aug. 28, 2006 | 6:05 PM | 1,500 |
| Aug. 28, 2006 | 9:00 PM | 1,750 |
| Aug. 29, 2006 | 9:32 AM | 1,750 |
| Aug. 29, 2006 | 11:28 AM | 1,625 |
| Aug. 29, 2006 | 1:09 PM | 1,625 |
| Aug. 29, 2006 | 2:52 PM | 1,690 |
| Aug. 29, 2006 | 4:26 PM | 1,625 |
| Aug. 29, 2006 | 6:10 PM | 1,625 |
| Aug. 30, 2006 | 8:30 AM | 1,500 |
| Aug. 30, 2006 | 10:30 AM | 1,500 |
| Aug. 30, 2006 | 12:08 PM | 1,520 |
| Aug. 30, 2006 | 1:29 PM | 1,500 |
| Aug. 30, 2006 | 2:51 PM | 1,625 |
| Aug. 30, 2006 | 4:05 PM | 1,500 |
| Aug. 30, 2006 | 5:30 PM | 1,625 |
| Aug. 30, 2006 | 9:00 PM | 1,625 |
| Aug. 31, 2006 | 9:30 AM | 2,000 |
| Aug. 31, 2006 | 11:50 AM | 1,500 |
| Aug. 31, 2006 | 1:31 PM | 1,500 |
| Aug. 31, 2006 | 2:49 PM | 1,625 |
| Aug. 31, 2006 | 4:09 PM | 1,625 |
| Aug. 31, 2006 | 5:48 PM | 2,050 |
| Sep. 01, 2006 | 8:30 AM | 1,450 |
| Sep. 01, 2006 | 10:50 AM | 1,500 |
| Sep. 01, 2006 | 12:23 PM | 1,625 |
| Sep. 01, 2006 | 1:51 PM | 1,500 |
| Sep. 01, 2006 | 3:16 PM | 1,550 |
| Sep. 01, 2006 | 4:40 PM | 1,500 |
| Sep. 01, 2006 | 7:00 PM | 1,500 |
| Sep. 02, 2006 | 8:35 AM | 1,500 |
| Sep. 02, 2006 | 10:31 AM | 1,375 |
| Sep. 02, 2006 | 12:04 PM | 1,625 |
| Sep. 02, 2006 | 1:30 PM | 1,625 |
| Sep. 02, 2006 | 3:00 PM | 1,500 |
| Sep. 02, 2006 | 4:20 PM | 1,625 |
| Sep. 02, 2006 | 6:00 PM | 1,500 |
| Sep. 02, 2006 | 9:15 PM | 1,500 |
| Sep. 03, 2006 | 9:10 AM | 1,625 |
| Sep. 03, 2006 | 11:21 AM | 1,750 |
| Sep. 03, 2006 | 12:55 PM | 1,690 |
| Sep. 03, 2006 | 2:14 PM | 1,625 |
| Sep. 03, 2006 | 3:34 PM | 1,750 |
| Sep. 03, 2006 | 5:25 PM | 1,750 |
| Sep. 03, 2006 | 8:00 PM | 2,625 |
| Sep. 04, 2006 | 8:59 AM | 1,750 |
| Sep. 04, 2006 | 11:17 AM | 1,750 |
| Sep. 04, 2006 | 12:59 PM | 1,625 |
| Sep. 04, 2006 | 2:32 PM | 1,625 |
| Sep. 04, 2006 | 3:52 PM | 1,750 |
| Sep. 04, 2006 | 5:25 PM | 1,625 |
| Sep. 04, 2006 | 8:30 PM | 1,625 |
| Sep. 06, 2006 | 8:30 AM | 1,750 |
| Sep. 06, 2006 | 10:30 AM | 1,750 |
| Sep. 06, 2006 | 11:45 AM | 1,900 |
| Sep. 06, 2006 | 12:59 PM | 1,625 |
| Sep. 06, 2006 | 2:04 PM | 1,500 |
| Sep. 06, 2006 | 3:30 PM | 1,625 |
| Sep. 06, 2006 | 4:20 PM | 1,750 |
| Sep. 06, 2006 | 6:45 PM | 2,371 |
| Sep. 07, 2006 | 8:50 AM | 2,000 |
| Sep. 07, 2006 | 10:20 AM | 2,000 |

TABLE 1-continued

| DATE | TIME OF IRRIGATION EVENT | VOLUME OF WATER FROM IRRIGATION LINE (ml) |
|---|---|---|
| Sep. 07, 2006 | 11:46 AM | 1,750 |
| Sep. 07, 2006 | 1:06 PM | 1,625 |
| Sep. 07, 2006 | 2:15 PM | 1,375 |
| Sep. 07, 2006 | 3:18 PM | 1,500 |
| Sep. 07, 2006 | 4:36 PM | 1,500 |
| Sep. 07, 2006 | 7:00 PM | 2,375 |
| Sep. 08, 2006 | 7:48 AM | 2,375 |
| Sep. 08, 2006 | 9:42 AM | 1,750 |
| Sep. 08, 2006 | 10:42 AM | 1,500 |
| Sep. 08, 2006 | 11:49 AM | 1,750 |
| Sep. 08, 2006 | 1:11 PM | 1,500 |
| Sep. 08, 2006 | 2:19 PM | 1,750 |
| Sep. 08, 2006 | 3:38 PM | 1,750 |
| Sep. 08, 2006 | 5:00 PM | 1,750 |
| Sep. 08, 2006 | 7:20 PM | 1,625 |
| Sep. 09, 2006 | 9:00 AM | 1,750 |
| Sep. 09, 2006 | 10:59 AM | 1,625 |
| Sep. 09, 2006 | 12:37 PM | 1,825 |
| Sep. 09, 2006 | 3:44 PM | 1,625 |
| Sep. 09, 2006 | 5:15 PM | 1,625 |
| Sep. 09, 2006 | 7:45 PM | 1,600 |
| Sep. 10, 2006 | 10:30 AM | 1,400 |
| Sep. 10, 2006 | 12:32 PM | 1,400 |
| Sep. 10, 2006 | 2:40 PM | 1,375 |
| Sep. 10, 2006 | 4:20 PM | 1,250 |
| Sep. 10, 2006 | 7:00 PM | 1,250 |
| Sep. 11, 2006 | 10:00 AM | 1,375 |
| Sep. 11, 2006 | 12:04 PM | 1,750 |
| Sep. 11, 2006 | 1:51 PM | 1,250 |
| Sep. 11, 2006 | 3:15 PM | 1,375 |
| Sep. 11, 2006 | 5:00 PM | 1,300 |
| Sep. 11, 2006 | 7:10 PM | 1,250 |
| Sep. 12, 2006 | 10:14 AM | 1,500 |
| Sep. 12, 2006 | 11:59 AM | 1,500 |
| Sep. 12, 2006 | 1:27 PM | 1,375 |
| Sep. 12, 2006 | 3:00 PM | 2,500 |
| Sep. 12, 2006 | 4:36 PM | 1,275 |
| Sep. 12, 2006 | 7:40 PM | 1,375 |
| Sep. 13, 2006 | 10:00 AM | 1,375 |
| Sep. 13, 2006 | 12:07 PM | 1,500 |
| Sep. 13, 2006 | 1:39 PM | 1,375 |
| Sep. 13, 2006 | 2:58 PM | 1,375 |
| Sep. 13, 2006 | 4:16 PM | 1,290 |
| Sep. 13, 2006 | 5:20 PM | 1,375 |
| Sep. 14, 2006 | 10:00 AM | 1,500 |
| Sep. 14, 2006 | 11:51 AM | 1,500 |
| Sep. 14, 2006 | 1:30 PM | 1,500 |
| Sep. 14, 2006 | 2:55 PM | 1,500 |
| Sep. 14, 2006 | 4:39 PM | 1,375 |
| Sep. 14, 2006 | 7:40 PM | 1,375 |
| Sep. 15, 2006 | 10:45 AM | 1,900 |
| Sep. 15, 2006 | 12:41 PM | 1,500 |
| Sep. 15, 2006 | 2:34 PM | 1,500 |
| Sep. 15, 2006 | 5:40 PM | 1,625 |
| Sep. 16, 2006 | 11:00 AM | 1,750 |
| Sep. 16, 2006 | 2:53 PM | 1,375 |
| Sep. 16, 2006 | 5:20 PM | 1,750 |
| Sep. 17, 2006 | 10:50 AM | 1,500 |
| Sep. 17, 2006 | 2:00 PM | 1,375 |
| Sep. 17, 2006 | 5:45 PM | 1,500 |
| Sep. 18, 2006 | 11:15 AM | 1,750 |
| Sep. 18, 2006 | 1:56 PM | 1,500 |
| Sep. 18, 2006 | 4:40 PM | 1,500 |
| Sep. 19, 2006 | 9:37 AM | 1,750 |
| Sep. 19, 2006 | 12:37 PM | 1,700 |
| Sep. 19, 2006 | 2:40 PM | 1,625 |
| Sep. 19, 2006 | 5:30 PM | 1,900 |
| Sep. 20, 2006 | 10:04 AM | 1,750 |
| Sep. 20, 2006 | 1:10 PM | 1,625 |
| Sep. 20, 2006 | 4:30 PM | 1,500 |
| Sep. 21, 2006 | 9:10 AM | 1,750 |
| Sep. 21, 2006 | 12:09 PM | 1,375 |
| Sep. 21, 2006 | 2:31 PM | 1,750 |
| Sep. 21, 2006 | 5:40 PM | 1,500 |
| Sep. 22, 2006 | 10:30 AM | 1,750 |
| Sep. 22, 2006 | 1:48 PM | 1,750 |
| Sep. 22, 2006 | 5:00 PM | 1,750 |
| Sep. 23, 2006 | 9:45 AM | 1,900 |
| Sep. 23, 2006 | 2:10 PM | 2,250 |
| Sep. 23, 2006 | 5:00 PM | 2,000 |
| Sep. 24, 2006 | 8:30 AM | 2,500 |
| Sep. 24, 2006 | 11:45 AM | 2,050 |
| Sep. 24, 2006 | 3:00 PM | 2,250 |
| Sep. 24, 2006 | 6:00 PM | 1,500 |
| Sep. 25, 2006 | 10:55 AM | 1,250 |
| Sep. 25, 2006 | 1:34 PM | 1,250 |
| Sep. 25, 2006 | 3:32 PM | 1,550 |
| Sep. 25, 2006 | 5:20 PM | 1,900 |
| Sep. 26, 2006 | 11:13 AM | 1,625 |
| Sep. 26, 2006 | 1:32 PM | 1,625 |
| Sep. 26, 2006 | 4:47 PM | 1,750 |
| Sep. 26, 2006 | 10:21 AM | 1,625 |
| Sep. 26, 2006 | 12:47 PM | 1,625 |
| Sep. 26, 2006 | 2:43 PM | 1,625 |
| Sep. 26, 2006 | 4:52 PM | 1,600 |
| Sep. 26, 2006 | 6:50 PM | 1,600 |
| Sep. 27, 2006 | 9:45 AM | 1,250 |
| Sep. 27, 2006 | 12:09 PM | 1,250 |
| Sep. 27, 2006 | 1:55 PM | 1,375 |
| Sep. 27, 2006 | 3:36 PM | 1,375 |
| Sep. 27, 2006 | 6:00 PM | 1,250 |
| Sep. 29, 2006 | 10:38 AM | 1,375 |
| Sep. 29, 2006 | 12:38 PM | 1,375 |
| Sep. 29, 2006 | 2:40 PM | 1,375 |
| Sep. 29, 2006 | 4:57 PM | 1,250 |
| Sep. 30, 2006 | 10:40 AM | 1,375 |
| Sep. 30, 2006 | 1:30 PM | 1,625 |
| Sep. 30, 2006 | 4:00 PM | 1,625 |

As can be seen in Table 1, the volume of water applied to the plants varied during each day and from day to day over a four-month growing period. For example, on Jun. 14, 2006 more water was applied in the middle of the day (2,325 ml at 12:30 pm) than at any other time that day. Whereas on Jun. 22, 2006 at approximately the same time, 12:15 pm, only 2,000 ml was needed. In another example, in late May and early June, as the plants were getting established, their water requirements varied considerably, from 1,375 ml to 6,000 ml, whereas from mid to late September at the end of the growing season the plants' water requirements were less variable, from 1,375 ml to 2,500 ml.

Table 1 also shows that the number of irrigation events per day increased during the summer months. For example, on Jun. 6, 2006 there were 4 irrigation events, where as on Jul. 1, 2006 there were 7 irrigation events and on Aug. 1, 2006 the irrigation events increased to 8. Additionally, the irrigation events began to decrease later in the growing season. For example, on Sep. 1, 2006 the number of irrigation events dropped to 7 and on Sep. 29, 2006 the number of irrigation events dropped to 3.

Figure 5:
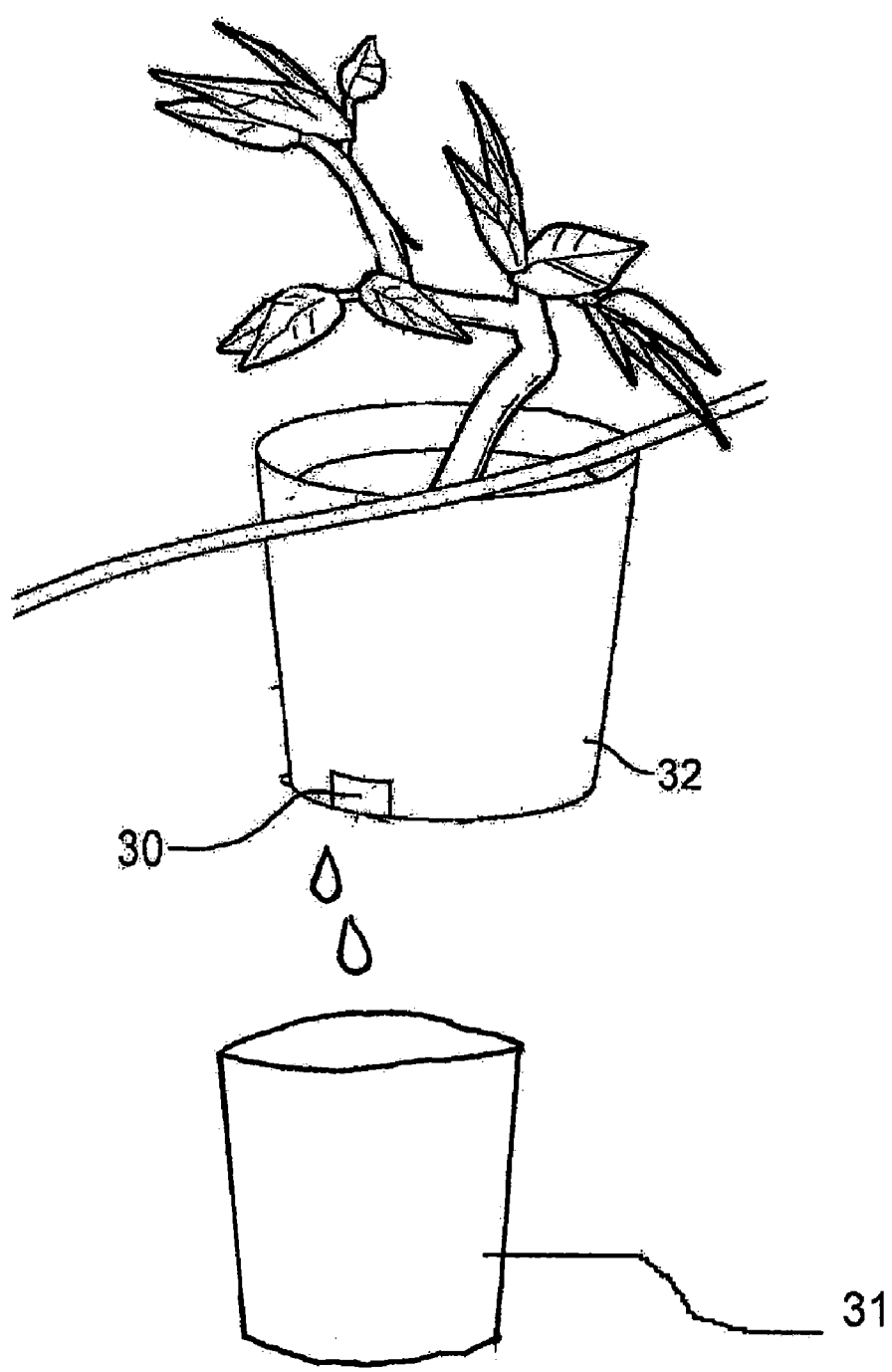
FIG. 5 shows a diagram depicting a plant in a plant container elevated above a sensor stationed to collect and measure excess water draining from the bottom of the plant container.

Once it was determined how much water was being delivered to the plant, it was then determined how much water was actually being used by the plant. This was done by measuring the excess water or outflow of water from a plant container. The excess water, as shown in FIG. 5, part 30 was measured using a sensor, as shown in FIG. 1, part 3 and FIG. 5, part 31 that was placed under the container, FIG. 5, part 32. The sensor continuously collected water that was being emitted from the plant container.

Table 2 shows the date and time of various irrigation events as well as the volume of excess water from the plant container. Column 1 of Table 2 shows the date of the irrigation event, column 2 shows the time of the measurement of the excess water and column 3 shows the volume of excess water from the plant container in milliliters.

TABLE 2

| Date | Sample Time | Volume of Excess Water from Plant Container (ml) |
|---|---|---|
| May 25, 2006 | 12:10 PM | 1,000 |
| May 25, 2006 | 5:00 PM | 1,000 |
| May 26, 2006 | 9:15 PM | 750 |
| May 26, 2006 | 12:00 PM | 1,250 |
| May 26, 2006 | 4:50 PM | 1,400 |
| May 27, 2006 | 10:30 AM | 1,400 |
| May 27, 2006 | 4:30 PM | 875 |
| May 28, 2006 | 9:30 PM | 875 |
| May 28, 2006 | 11:45 AM | 950 |
| May 28, 2006 | 4:30 PM | 1,500 |
| May 29, 2006 | 9:30 PM | 625 |
| May 29, 2006 | 11:20 AM | 1,250 |
| May 29, 2006 | 3:30 PM | 1,000 |
| May 30, 2006 | 8:40 PM | 875 |
| May 30, 2006 | 11:34 AM | 875 |
| May 30, 2006 | 4:10 PM | 1,500 |
| May 31, 2006 | 8:15 PM | 1,375 |
| May 31, 2006 | 11:15 AM | 800 |
| Jun. 02, 2006 | 3:30 PM | 1,500 |
| Jun. 04, 2006 | 8:00 PM | 1,800 |
| Jun. 04, 2006 | 10:40 AM | 875 |
| Jun. 04, 2006 | 3:20 PM | 1,500 |
| Jun. 05, 2006 | 8:25 PM | 3,825 |
| Jun. 05, 2006 | 10:30 AM | 1,900 |
| Jun. 05, 2006 | 2:26 PM | 1,900 |
| Jun. 06, 2006 | 6:10 PM | 1,500 |
| Jun. 06, 2006 | 8:30 PM | 3,000 |
| Jun. 06, 2006 | 10:48 AM | 1,125 |
| Jun. 06, 2006 | 2:50 PM | 1,500 |
| Jun. 07, 2006 | 5:20 PM | 1,375 |
| Jun. 07, 2006 | 9:15 PM | 1,750 |
| Jun. 07, 2006 | 10:30 AM | 1,125 |
| Jun. 07, 2006 | 1:20 PM | 4,500 |
| Jun. 08, 2006 | 3:50 PM | 1,750 |
| Jun. 08, 2006 | 8:00 PM | 2,000 |
| Jun. 08, 2006 | 9:40 AM | 1,250 |
| Jun. 08, 2006 | 12:30 PM | 1,500 |
| Jun. 09, 2006 | 3:30 PM | 875 |
| Jun. 09, 2006 | 8:40 PM | 1,750 |
| Jun. 09, 2006 | 10:30 AM | 2,750 |
| Jun. 09, 2006 | 2:10 PM | 950 |
| Jun. 10, 2006 | 8:10 PM | 1,500 |
| Jun. 10, 2006 | 10:30 AM | 1,300 |
| Jun. 10, 2006 | 2:30 PM | 1,750 |
| Jun. 11, 2006 | 3:50 PM | 3,250 |
| Jun. 11, 2006 | 8:20 PM | 2,000 |
| Jun. 11, 2006 | 9:00 AM | 1,625 |
| Jun. 11, 2006 | 11:30 AM | 1,875 |
| Jun. 12, 2006 | 2:20 PM | 1,500 |
| Jun. 12, 2006 | 4:40 PM | 1,500 |
| Jun. 12, 2006 | 8:00 PM | 1,600 |
| Jun. 12, 2006 | 11:30 AM | 1,125 |
| Jun. 12, 2006 | 1:45 PM | 1,625 |
| Jun. 13, 2006 | 3:43 PM | 1,500 |
| Jun. 13, 2006 | 7:00 PM | 1,375 |
| Jun. 13, 2006 | 11:00 AM | 950 |
| Jun. 13, 2006 | 1:15 PM | 1,700 |
| Jun. 14, 2006 | 3:15 PM | 1,500 |
| Jun. 14, 2006 | 7:05 PM | 600 |
| Jun. 14, 2006 | 12:10 PM | 625 |
| Jun. 14, 2006 | 2:10 PM | 2,325 |
| Jun. 15, 2006 | 4:30 PM | 1,500 |
| Jun. 15, 2006 | 8:00 PM | 2,375 |
| Jun. 15, 2006 | 10:40 AM | 875 |
| Jun. 15, 2006 | 1:15 PM | 1,375 |
| Jun. 16, 2006 | 3:10 PM | 1,250 |
| Jun. 16, 2006 | 6:00 PM | 1,250 |
| Jun. 16, 2006 | 8:00 PM | 1,500 |
| Jun. 16, 2006 | 9:20 PM | 1,200 |
| Jun. 16, 2006 | 2:30 PM | 1,550 |
| Jun. 17, 2006 | 3:10 PM | 750 |
| Jun. 17, 2006 | 6:10 PM | 1,000 |
| Jun. 17, 2006 | 9:40 PM | 1,750 |
| Jun. 17, 2006 | 9:00 AM | 1,500 |
| Jun. 17, 2006 | 11:45 AM | 1,350 |
| Jun. 18, 2006 | 2:00 PM | 1,375 |
| Jun. 18, 2006 | 4:45 PM | 1,000 |
| Jun. 18, 2006 | 7:00 PM | 625 |
| Jun. 18, 2006 | 11:30 AM | 1,000 |
| Jun. 19, 2006 | 2:10 PM | 1,375 |
| Jun. 19, 2006 | 4:15 PM | 1,600 |
| Jun. 19, 2006 | 7:45 PM | 1,375 |
| Jun. 19, 2006 | 9:45 AM | 1,500 |
| Jun. 19, 2006 | 12:00 PM | 1,250 |
| Jun. 20, 2006 | 2:30 PM | 1,500 |
| Jun. 20, 2006 | 5:00 PM | 1,250 |
| Jun. 20, 2006 | 6:15 PM | 1,500 |
| Jun. 20, 2006 | 9:30 AM | 1,625 |
| Jun. 20, 2006 | 1:30 PM | 1,000 |
| Jun. 21, 2006 | 2:20 PM | 1,100 |
| Jun. 21, 2006 | 5:15 PM | 1,125 |
| Jun. 21, 2006 | 7:00 PM | 1,250 |
| Jun. 21, 2006 | 8:40 AM | 1,500 |
| Jun. 21, 2006 | 10:45 AM | 1,275 |
| Jun. 22, 2006 | 1:00 PM | 1,125 |
| Jun. 22, 2006 | 2:40 PM | 1,300 |
| Jun. 22, 2006 | 4:50 PM | 1,450 |
| Jun. 22, 2006 | 9:15 AM | 1,500 |
| Jun. 22, 2006 | 11:20 AM | 1,300 |
| Jun. 23, 2006 | 1:15 PM | 1,300 |
| Jun. 23, 2006 | 3:10 PM | 1,250 |
| Jun. 23, 2006 | 5:00 PM | 1,050 |
| Jun. 23, 2006 | 7:00 AM | 1,900 |
| Jun. 23, 2006 | 10:00 AM | 1,500 |
| Jun. 24, 2006 | 12:00 PM | 1,500 |
| Jun. 24, 2006 | 1:40 PM | 1,250 |
| Jun. 24, 2006 | 3:40 PM | 1,000 |
| Jun. 24, 2006 | 7:00 AM | 1,900 |
| Jun. 24, 2006 | 10:15 AM | 1,500 |
| Jun. 25, 2006 | 1:15 PM | 1,375 |
| Jun. 25, 2006 | 2:25 PM | 1,050 |
| Jun. 25, 2006 | 4:25 PM | 1,225 |
| Jun. 25, 2006 | 7:40 AM | 1,900 |
| Jun. 25, 2006 | 10:00 AM | 2,000 |
| Jun. 26, 2006 | 12:00 PM | 1,250 |
| Jun. 26, 2006 | 2:00 PM | 1,500 |
| Jun. 26, 2006 | 4:10 PM | 1,350 |
| Jun. 26, 2006 | 6:45 AM | 1,600 |
| Jun. 26, 2006 | 8:30 AM | 1,500 |
| Jun. 27, 2006 | 12:10 PM | 500 |
| Jun. 27, 2006 | 2:00 PM | 750 |
| Jun. 27, 2006 | 3:50 PM | 525 |
| Jun. 27, 2006 | 9:30 AM | 350 |
| Jun. 27, 2006 | 11:20 AM | 450 |
| Jun. 29, 2006 | 2:00 PM | 325 |
| Jun. 29, 2006 | 3:40 PM | 175 |
| Jun. 29, 2006 | 5:20 PM | 150 |
| Jun. 29, 2006 | 10:00 AM | 400 |
| Jun. 29, 2006 | 12:00 PM | 400 |
| Jun. 30, 2006 | 2:00 PM | 175 |
| Jun. 30, 2006 | 4:00 PM | 50 |
| Jun. 30, 2006 | 5:50 PM | 250 |
| Jun. 30, 2006 | 7:30 PM | 875 |
| Jun. 30, 2006 | 9:40 PM | 1,100 |
| Jun. 30, 2006 | 9:30 AM | 450 |
| Jun. 30, 2006 | 11:30 AM | 300 |
| Jul. 01, 2006 | 9:30 AM | 450 |
| Jul. 01, 2006 | 11:30 AM | 300 |
| Jul. 01, 2006 | 1:20 PM | 275 |
| Jul. 01, 2006 | 3:30 PM | 175 |
| Jul. 01, 2006 | 5:30 PM | 175 |
| Jul. 01, 2006 | 7:30 PM | 400 |
| Jul. 01, 2006 | 10:15 PM | 800 |
| Jul. 02, 2006 | 10:30 AM | 175 |
| Jul. 02, 2006 | 12:30 PM | 400 |
| Jul. 02, 2006 | 2:20 PM | 250 |

TABLE 2-continued

| Date | Sample Time | Volume of Excess Water from Plant Container (ml) |
|---|---|---|
| Jul. 02, 2006 | 3:45 PM | 300 |
| Jul. 02, 2006 | 4:45 PM | 500 |
| Jul. 02, 2006 | 6:30 PM | 500 |
| Jul. 02, 2006 | 8:20 PM | 625 |
| Jul. 02, 2006 | 6:15 PM | 1,375 |
| Jul. 03, 2006 | 9:30 AM | 400 |
| Jul. 03, 2006 | 11:30 AM | 325 |
| Jul. 03, 2006 | 1:30 PM | 175 |
| Jul. 03, 2006 | 3:00 PM | 350 |
| Jul. 03, 2006 | 4:30 PM | 350 |
| Jul. 03, 2006 | 6:30 PM | 200 |
| Jul. 03, 2006 | 6:45 PM | 975 |
| Jul. 04, 2006 | 9:30 AM | 625 |
| Jul. 04, 2006 | 11:15 AM | 625 |
| Jul. 04, 2006 | 12:45 PM | 500 |
| Jul. 04, 2006 | 1:15 PM | 500 |
| Jul. 04, 2006 | 4:30 PM | 275 |
| Jul. 04, 2006 | 6:20 PM | 725 |
| Jul. 04, 2006 | 8:31 PM | 875 |
| Jul. 04, 2006 | 7:00 PM | 1,350 |
| Jul. 05, 2006 | 9:30 AM | 450 |
| Jul. 05, 2006 | 11:20 AM | 350 |
| Jul. 05, 2006 | 1:15 PM | 350 |
| Jul. 05, 2006 | 3:00 PM | 375 |
| Jul. 05, 2006 | 4:45 PM | 75 |
| Jul. 05, 2006 | 6:15 PM | 450 |
| Jul. 05, 2006 | 8:15 PM | 750 |
| Jul. 05, 2006 | 9:35 PM | 1,375 |
| Jul. 06, 2006 | 9:30 AM | 500 |
| Jul. 06, 2006 | 11:40 AM | 450 |
| Jul. 06, 2006 | 1:40 PM | 375 |
| Jul. 06, 2006 | 3:30 PM | 300 |
| Jul. 06, 2006 | 5:30 PM | 75 |
| Jul. 06, 2006 | 7:15 PM | 500 |
| Jul. 06, 2006 | 9:45 PM | 1,125 |
| Jul. 07, 2006 | 9:30 AM | 475 |
| Jul. 07, 2006 | 11:30 PM | 500 |
| Jul. 07, 2006 | 1:40 PM | 300 |
| Jul. 07, 2006 | 3:35 PM | 300 |
| Jul. 07, 2006 | 12:00 AM | 350 |
| Jul. 07, 2006 | 6:40 PM | 625 |
| Jul. 07, 2006 | 10:00 PM | 625 |
| Jul. 08, 2006 | 9:40 AM | 275 |
| Jul. 08, 2006 | 11:45 AM | 125 |
| Jul. 08, 2006 | 1:10 PM | 625 |
| Jul. 08, 2006 | 2:20 PM | 375 |
| Jul. 08, 2006 | 3:20 PM | 650 |
| Jul. 08, 2006 | 4:30 PM | 625 |
| Jul. 08, 2006 | 5:40 PM | 500 |
| Jul. 08, 2006 | 7:45 PM | 400 |
| Jul. 09, 2006 | 9:25 AM | 500 |
| Jul. 09, 2006 | 11:00 AM | 625 |
| Jul. 09, 2006 | 12:40 PM | 325 |
| Jul. 09, 2006 | 2:00 PM | 500 |
| Jul. 09, 2006 | 3:15 PM | 150 |
| Jul. 09, 2006 | 4:45 PM | 450 |
| Jul. 09, 2006 | 6:30 PM | 450 |
| Jul. 09, 2006 | 8:15 PM | 875 |
| Jul. 10, 2006 | 9:20 AM | 450 |
| Jul. 10, 2006 | 11:15 AM | 500 |
| Jul. 10, 2006 | 12:50 PM | 400 |
| Jul. 10, 2006 | 2:25 PM | 150 |
| Jul. 10, 2006 | 3:55 PM | 250 |
| Jul. 10, 2006 | 5:50 PM | 875 |
| Jul. 10, 2006 | 7:50 PM | 750 |
| Jul. 10, 2006 | 9:35 PM | 500 |
| Jul. 11, 2006 | 9:45 AM | 400 |
| Jul. 11, 2006 | 11:45 AM | 375 |
| Jul. 11, 2006 | 1:30 PM | 300 |
| Jul. 11, 2006 | 3:10 PM | 300 |
| Jul. 11, 2006 | 5:00 PM | 225 |
| Jul. 11, 2006 | 7:00 PM | 350 |
| Jul. 11, 2006 | 9:40 PM | 500 |
| Jul. 12, 2006 | 10:00 AM | 500 |
| Jul. 12, 2006 | 12:30 PM | 250 |
| Jul. 12, 2006 | 2:10 PM | 250 |
| Jul. 12, 2006 | 3:50 PM | 75 |
| Jul. 12, 2006 | 5:30 PM | 400 |
| Jul. 12, 2006 | 7:00 PM | 700 |
| Jul. 12, 2006 | 7:30 PM | 1,000 |
| Jul. 13, 2006 | 10:30 AM | 350 |
| Jul. 13, 2006 | 12:10 PM | 100 |
| Jul. 13, 2006 | 2:00 PM | 475 |
| Jul. 13, 2006 | 4:00 PM | 150 |
| Jul. 13, 2006 | 5:30 PM | 350 |
| Jul. 13, 2006 | 7:50 PM | 875 |
| Jul. 14, 2006 | 10:15 AM | 325 |
| Jul. 14, 2006 | 12:00 PM | 425 |
| Jul. 14, 2006 | 1:45 PM | 400 |
| Jul. 14, 2006 | 3:30 PM | 300 |
| Jul. 14, 2006 | 6:00 PM | 350 |
| Jul. 14, 2006 | 7:15 PM | 750 |
| Jul. 14, 2006 | 9:00 PM | 825 |
| Jul. 15, 2006 | 10:15 AM | 375 |
| Jul. 15, 2006 | 11:50 AM | 475 |
| Jul. 15, 2006 | 1:30 PM | 500 |
| Jul. 15, 2006 | 3:15 PM | 525 |
| Jul. 15, 2006 | 5:00 PM | 250 |
| Jul. 15, 2006 | 7:00 PM | 400 |
| Jul. 16, 2006 | 10:25 AM | 175 |
| Jul. 16, 2006 | 11:30 AM | 375 |
| Jul. 16, 2006 | 1:15 PM | 500 |
| Jul. 16, 2006 | 2:50 PM | 150 |
| Jul. 16, 2006 | 5:30 PM | 350 |
| Jul. 16, 2006 | 6:30 PM | 625 |
| Jul. 16, 2006 | 9:15 PM | 875 |
| Jul. 17, 2006 | 9:25 AM | 625 |
| Jul. 17, 2006 | 11:15 AM | 375 |
| Jul. 17, 2006 | 1:45 PM | 475 |
| Jul. 17, 2006 | 3:00 PM | 250 |
| Jul. 17, 2006 | 4:30 PM | 150 |
| Jul. 17, 2006 | 7:30 PM | 300 |
| Jul. 18, 2006 | 9:30 AM | 375 |
| Jul. 18, 2006 | 11:45 AM | 625 |
| Jul. 18, 2006 | 1:50 PM | 525 |
| Jul. 18, 2006 | 4:00 PM | 675 |
| Jul. 18, 2006 | 8:00 PM | 625 |
| Jul. 19, 2006 | 9:45 AM | 750 |
| Jul. 19, 2006 | 12:10 PM | 625 |
| Jul. 19, 2006 | 2:00 PM | 650 |
| Jul. 19, 2006 | 3:30 PM | 425 |
| Jul. 19, 2006 | 5:30 PM | 350 |
| Jul. 19, 2006 | 8:30 PM | 750 |
| Jul. 20, 2006 | 9:35 AM | 750 |
| Jul. 20, 2006 | 11:50 AM | 850 |
| Jul. 20, 2006 | 1:40 PM | 725 |
| Jul. 20, 2006 | 3:20 PM | 550 |
| Jul. 20, 2006 | 4:55 PM | 375 |
| Jul. 20, 2006 | 7:15 PM | 375 |
| Jul. 21, 2006 | 9:35 AM | 875 |
| Jul. 21, 2006 | 12:15 PM | 625 |
| Jul. 21, 2006 | 2:20 PM | 500 |
| Jul. 21, 2006 | 4:15 PM | 950 |
| Jul. 21, 2006 | 6:00 PM | 625 |
| Jul. 22, 2006 | 9:45 AM | 475 |
| Jul. 22, 2006 | 12:10 PM | 275 |
| Jul. 22, 2006 | 1:20 PM | 400 |
| Jul. 22, 2006 | 2:40 PM | 375 |
| Jul. 22, 2006 | 4:25 PM | 300 |
| Jul. 22, 2006 | 6:30 PM | 1,500 |
| Jul. 24, 2006 | 9:10 AM | 1,125 |
| Jul. 24, 2006 | 10:45 AM | 750 |
| Jul. 24, 2006 | 12:35 PM | 650 |
| Jul. 24, 2006 | 1:50 PM | 350 |
| Jul. 24, 2006 | 3:10 PM | 775 |
| Jul. 24, 2006 | 4:40 PM | 625 |
| Jul. 24, 2006 | 7:30 PM | 625 |
| Jul. 25, 2006 | 9:35 AM | 875 |
| Jul. 25, 2006 | 11:20 AM | 500 |
| Jul. 25, 2006 | 12:50 PM | 875 |

TABLE 2-continued

| Date | Sample Time | Volume of Excess Water from Plant Container (ml) |
|---|---|---|
| Jul. 25, 2006 | 2:40 PM | 675 |
| Jul. 25, 2006 | 4:12 PM | 1,000 |
| Jul. 25, 2006 | 5:40 PM | 625 |
| Jul. 25, 2006 | 7:50 PM | 1,125 |
| Jul. 26, 2006 | 9:50 AM | 750 |
| Jul. 26, 2006 | 11:45 AM | 875 |
| Jul. 26, 2006 | 1:20 PM | 750 |
| Jul. 26, 2006 | 2:50 PM | 325 |
| Jul. 26, 2006 | 4:05 PM | 550 |
| Jul. 26, 2006 | 5:30 PM | 550 |
| Jul. 26, 2006 | 8:00 PM | 675 |
| Jul. 27, 2006 | 9:50 AM | 1,000 |
| Jul. 27, 2006 | 12:00 PM | 750 |
| Jul. 27, 2006 | 1:25 PM | 950 |
| Jul. 27, 2006 | 3:00 PM | 1,000 |
| Jul. 27, 2006 | 4:10 PM | 575 |
| Jul. 27, 2006 | 5:30 PM | 875 |
| Jul. 28, 2006 | 9:40 AM | 975 |
| Jul. 28, 2006 | 11:20 AM | 750 |
| Jul. 28, 2006 | 12:45 PM | 750 |
| Jul. 28, 2006 | 2:15 PM | 900 |
| Jul. 28, 2006 | 3:30 PM | 625 |
| Jul. 28, 2006 | 5:00 PM | 675 |
| Jul. 28, 2006 | 6:30 PM | 875 |
| Jul. 28, 2006 | 9:00 PM | 1,150 |
| Jul. 29, 2006 | 9:45 AM | 875 |
| Jul. 29, 2006 | 11:20 AM | 850 |
| Jul. 29, 2006 | 12:45 PM | 750 |
| Jul. 29, 2006 | 2:10 PM | 875 |
| Jul. 29, 2006 | 3:35 PM | 625 |
| Jul. 29, 2006 | 4:55 PM | 850 |
| Jul. 29, 2006 | 7:30 PM | 1,000 |
| Jul. 31, 2006 | 9:55 PM | 1,000 |
| Jul. 31, 2006 | 11:28 AM | 875 |
| Jul. 31, 2006 | 12:38 PM | 750 |
| Jul. 31, 2006 | 2:48 PM | 750 |
| Jul. 31, 2006 | 3:45 PM | 750 |
| Jul. 31, 2006 | 5:00 PM | 1,000 |
| Jul. 31, 2006 | 7:50 PM | 750 |
| Jul. 31, 2006 | 8:30 PM | 1,125 |
| Aug. 01, 2006 | 8:30 AM | 1,125 |
| Aug. 01, 2006 | 11:16 AM | 875 |
| Aug. 01, 2006 | 12:55 PM | 875 |
| Aug. 01, 2006 | 3:09 PM | 875 |
| Aug. 01, 2006 | 4:46 PM | 750 |
| Aug. 01, 2006 | 6:00 PM | 500 |
| Aug. 01, 2006 | 9:30 PM | 1,000 |
| Aug. 02, 2006 | 10:30 AM | 750 |
| Aug. 02, 2006 | 12:22 PM | 375 |
| Aug. 02, 2006 | 2:14 PM | 625 |
| Aug. 02, 2006 | 4:35 PM | 2,000 |
| Aug. 02, 2006 | 6:25 PM | 700 |
| Aug. 02, 2006 | 9:35 PM | 1,000 |
| Aug. 03, 2006 | 10:16 AM | 750 |
| Aug. 03, 2006 | 12:40 PM | 750 |
| Aug. 03, 2006 | 2:05 PM | 750 |
| Aug. 03, 2006 | 3:21 PM | 875 |
| Aug. 03, 2006 | 6:30 PM | 1,000 |
| Aug. 03, 2006 | 8:00 PM | 1,150 |
| Aug. 04, 2006 | 10:18 AM | 625 |
| Aug. 04, 2006 | 11:40 AM | 875 |
| Aug. 04, 2006 | 12:45 PM | 250 |
| Aug. 04, 2006 | 2:52 PM | 875 |
| Aug. 04, 2006 | 4:12 PM | 875 |
| Aug. 04, 2006 | 5:25 PM | 750 |
| Aug. 04, 2006 | 7:00 PM | 650 |
| Aug. 04, 2006 | 8:55 PM | 1,250 |
| Aug. 05, 2006 | 9:27 AM | 875 |
| Aug. 05, 2006 | 11:16 AM | 1,000 |
| Aug. 05, 2006 | 12:55 PM | 875 |
| Aug. 05, 2006 | 2:25 PM | 750 |
| Aug. 05, 2006 | 3:41 PM | 875 |
| Aug. 05, 2006 | 4:57 PM | 750 |
| Aug. 05, 2006 | 7:00 PM | 1,000 |
| Aug. 05, 2006 | 8:45 PM | 1,000 |
| Aug. 06, 2006 | 9:50 AM | 900 |
| Aug. 07, 2006 | 9:30 AM | 1,125 |
| Aug. 07, 2006 | 11:08 AM | 1,125 |
| Aug. 07, 2006 | 12:43 PM | 875 |
| Aug. 07, 2006 | 1:52 PM | 875 |
| Aug. 07, 2006 | 3:22 PM | 875 |
| Aug. 07, 2006 | 5:04 PM | 750 |
| Aug. 07, 2006 | 5:48 PM | 875 |
| Aug. 07, 2006 | 9:00 PM | 1,000 |
| Aug. 08, 2006 | 8:39 AM | 875 |
| Aug. 08, 2006 | 12:20 PM | 550 |
| Aug. 08, 2006 | 1:39 PM | 875 |
| Aug. 08, 2006 | 2:54 PM | 750 |
| Aug. 08, 2006 | 4:34 PM | 625 |
| Aug. 08, 2006 | 5:10 PM | 875 |
| Aug. 08, 2006 | 7:45 PM | 875 |
| Aug. 08, 2006 | 9:20 PM | 500 |
| Aug. 09, 2006 | 11:15 AM | 715 |
| Aug. 09, 2006 | 12:53 PM | 875 |
| Aug. 09, 2006 | 2:36 PM | 875 |
| Aug. 09, 2006 | 3:40 PM | 875 |
| Aug. 09, 2006 | 5:00 PM | 800 |
| Aug. 09, 2006 | 7:00 PM | 500 |
| Aug. 10, 2006 | 8:37 AM | 800 |
| Aug. 10, 2006 | 12:45 PM | 250 |
| Aug. 10, 2006 | 2:10 PM | 1,125 |
| Aug. 10, 2006 | 3:30 PM | 625 |
| Aug. 10, 2006 | 4:55 PM | 500 |
| Aug. 10, 2006 | 6:30 PM | 875 |
| Aug. 10, 2006 | 9:50 PM | 1,375 |
| Aug. 11, 2006 | 9:13 AM | 1,000 |
| Aug. 11, 2006 | 11:12 AM | 1,000 |
| Aug. 11, 2006 | 12:40 PM | 1,000 |
| Aug. 11, 2006 | 1:59 PM | 875 |
| Aug. 11, 2006 | 3:27 PM | 765 |
| Aug. 11, 2006 | 4:49 PM | 550 |
| Aug. 11, 2006 | 5:55 PM | 1,125 |
| Aug. 11, 2006 | 8:54 PM | 1,125 |
| Aug. 11, 2006 | 10:54 PM | 1,050 |
| Aug. 12, 2006 | 8:54 AM | 1,125 |
| Aug. 12, 2006 | 10:54 AM | 1,050 |
| Aug. 12, 2006 | 12:05 PM | 1,050 |
| Aug. 12, 2006 | 1:39 PM | 1,050 |
| Aug. 12, 2006 | 3:17 PM | 875 |
| Aug. 12, 2006 | 4:20 PM | 875 |
| Aug. 12, 2006 | 5:40 PM | 875 |
| Aug. 13, 2006 | 10:20 AM | 1,220 |
| Aug. 13, 2006 | 12:05 PM | 750 |
| Aug. 13, 2006 | 1:40 PM | 1,000 |
| Aug. 13, 2006 | 3:05 PM | 875 |
| Aug. 13, 2006 | 4:38 PM | 875 |
| Aug. 13, 2006 | 6:40 PM | 675 |
| Aug. 13, 2006 | 7:55 PM | 1,125 |
| Aug. 13, 2006 | 9:00 PM | 375 |
| Aug. 14, 2006 | 8:57 AM | 1,250 |
| Aug. 14, 2006 | 10:55 AM | 1,000 |
| Aug. 14, 2006 | 12:44 PM | 1,050 |
| Aug. 14, 2006 | 2:08 PM | 750 |
| Aug. 14, 2006 | 4:20 PM | 625 |
| Aug. 14, 2006 | 5:17 PM | 750 |
| Aug. 14, 2006 | 9:00 PM | 375 |
| Aug. 15, 2006 | 9:37 AM | 1,000 |
| Aug. 15, 2006 | 11:47 AM | 1,375 |
| Aug. 15, 2006 | 1:16 PM | 1,000 |
| Aug. 15, 2006 | 2:30 PM | 1,125 |
| Aug. 15, 2006 | 4:28 PM | 500 |
| Aug. 15, 2006 | 5:10 PM | 1,125 |
| Aug. 15, 2006 | 7:50 PM | 875 |
| Aug. 16, 2006 | 10:16 AM | 875 |
| Aug. 16, 2006 | 12:14 PM | 625 |
| Aug. 16, 2006 | 1:28 PM | 875 |
| Aug. 16, 2006 | 2:40 PM | 650 |
| Aug. 16, 2006 | 4:20 PM | 750 |
| Aug. 16, 2006 | 6:10 PM | 675 |
| Aug. 16, 2006 | 9:15 PM | 1,280 |

TABLE 2-continued

| Date | Sample Time | Volume of Excess Water from Plant Container (ml) |
|---|---|---|
| Aug. 17, 2006 | 9:52 AM | 750 |
| Aug. 17, 2006 | 11:47 AM | 625 |
| Aug. 17, 2006 | 1:10 PM | 880 |
| Aug. 17, 2006 | 2:48 PM | 780 |
| Aug. 17, 2006 | 4:20 PM | 750 |
| Aug. 17, 2006 | 6:10 PM | 500 |
| Aug. 17, 2006 | 8:55 PM | 1,000 |
| Aug. 18, 2006 | 10:44 AM | 780 |
| Aug. 18, 2006 | 12:27 PM | 760 |
| Aug. 18, 2006 | 2:17 PM | 750 |
| Aug. 18, 2006 | 3:56 PM | 750 |
| Aug. 18, 2006 | 5:20 PM | 760 |
| Aug. 18, 2006 | 8:00 PM | 875 |
| Aug. 19, 2006 | 10:25 AM | 780 |
| Aug. 19, 2006 | 12:18 PM | 780 |
| Aug. 19, 2006 | 1:40 PM | 625 |
| Aug. 19, 2006 | 3:50 PM | 625 |
| Aug. 19, 2006 | 9:15 PM | 680 |
| Aug. 19, 2006 | 8:15 PM | 875 |
| Aug. 20, 2006 | 10:30 AM | 750 |
| Aug. 20, 2006 | 1:20 PM | 625 |
| Aug. 20, 2006 | 3:00 PM | 625 |
| Aug. 20, 2006 | 5:00 PM | 375 |
| Aug. 20, 2006 | 7:00 PM | 700 |
| Aug. 20, 2006 | 9:00 PM | 1,125 |
| Aug. 21, 2006 | 7:50 AM | 1,280 |
| Aug. 21, 2006 | 11:05 AM | 590 |
| Aug. 21, 2006 | 12:50 PM | 760 |
| Aug. 21, 2006 | 2:32 PM | 630 |
| Aug. 21, 2006 | 3:52 PM | 540 |
| Aug. 21, 2006 | 5:30 PM | 500 |
| Aug. 21, 2006 | 8:00 PM | 750 |
| Aug. 22, 2006 | 10:00 AM | 1,000 |
| Aug. 22, 2006 | 11:45 AM | 500 |
| Aug. 22, 2006 | 1:11 PM | 760 |
| Aug. 22, 2006 | 2:38 PM | 500 |
| Aug. 22, 2006 | 3:58 PM | 680 |
| Aug. 22, 2006 | 5:40 PM | 500 |
| Aug. 22, 2006 | 8:00 PM | 1,050 |
| Aug. 23, 2006 | 10:13 AM | 875 |
| Aug. 23, 2006 | 11:52 AM | 625 |
| Aug. 23, 2006 | 1:20 PM | 875 |
| Aug. 23, 2006 | 3:37 PM | 790 |
| Aug. 23, 2006 | 4:00 PM | 625 |
| Aug. 23, 2006 | 5:20 PM | 500 |
| Aug. 23, 2006 | 7:00 PM | 750 |
| Aug. 23, 2006 | 9:00 PM | 1,625 |
| Aug. 24, 2006 | 9:48 AM | 690 |
| Aug. 24, 2006 | 11:15 AM | 750 |
| Aug. 24, 2006 | 12:30 PM | 1,000 |
| Aug. 24, 2006 | 1:58 PM | 875 |
| Aug. 24, 2006 | 3:35 PM | 625 |
| Aug. 24, 2006 | 5:05 PM | 650 |
| Aug. 24, 2006 | 7:00 PM | 500 |
| Aug. 24, 2006 | 9:00 PM | 1,050 |
| Aug. 25, 2006 | 10:04 AM | 1,500 |
| Aug. 25, 2006 | 11:52 AM | 1,000 |
| Aug. 25, 2006 | 1:30 PM | 890 |
| Aug. 25, 2006 | 2:58 PM | 500 |
| Aug. 25, 2006 | 4:19 PM | 750 |
| Aug. 25, 2006 | 6:00 PM | 800 |
| Aug. 26, 2006 | 9:33 AM | 1,125 |
| Aug. 26, 2006 | 11:19 AM | 750 |
| Aug. 26, 2006 | 12:55 PM | 780 |
| Aug. 26, 2006 | 2:35 PM | 390 |
| Aug. 26, 2006 | 4:00 PM | 790 |
| Aug. 26, 2006 | 5:31 PM | 530 |
| Aug. 26, 2006 | 7:40 PM | 1,125 |
| Aug. 27, 2006 | 9:25 AM | 1,375 |
| Aug. 27, 2006 | 11:30 AM | 875 |
| Aug. 27, 2006 | 1:00 PM | 390 |
| Aug. 27, 2006 | 2:35 PM | 750 |
| Aug. 27, 2006 | 4:09 PM | 750 |
| Aug. 27, 2006 | 6:50 PM | 625 |
| Aug. 27, 2006 | 8:55 PM | 1,625 |
| Aug. 28, 2006 | 10:16 AM | 790 |
| Aug. 28, 2006 | 11:37 AM | 790 |
| Aug. 28, 2006 | 1:12 PM | 875 |
| Aug. 28, 2006 | 2:47 PM | 750 |
| Aug. 28, 2006 | 3:38 PM | 875 |
| Aug. 28, 2006 | 5:00 PM | 750 |
| Aug. 28, 2006 | 7:45 PM | 750 |
| Aug. 28, 2006 | 9:35 PM | 1,375 |
| Aug. 29, 2006 | 10:06 AM | 790 |
| Aug. 29, 2006 | 11:57 AM | 750 |
| Aug. 29, 2006 | 1:30 PM | 640 |
| Aug. 29, 2006 | 3:22 PM | 625 |
| Aug. 29, 2006 | 4:58 PM | 625 |
| Aug. 29, 2006 | 7:00 PM | 750 |
| Aug. 30, 2006 | 8:56 AM | 790 |
| Aug. 30, 2006 | 10:58 AM | 750 |
| Aug. 30, 2006 | 12:36 PM | 530 |
| Aug. 30, 2006 | 1:56 PM | 750 |
| Aug. 30, 2006 | 3:24 PM | 750 |
| Aug. 30, 2006 | 4:48 PM | 680 |
| Aug. 30, 2006 | 6:00 PM | 750 |
| Aug. 30, 2006 | 8:55 PM | 1,000 |
| Aug. 31, 2006 | 10:15 AM | 1,000 |
| Aug. 31, 2006 | 12:37 PM | 750 |
| Aug. 31, 2006 | 1:58 PM | 500 |
| Aug. 31, 2006 | 3:30 PM | 625 |
| Aug. 31, 2006 | 4:40 PM | 630 |
| Aug. 31, 2006 | 6:45 PM | 875 |
| Sep. 01, 2006 | 10:40 AM | 750 |
| Sep. 01, 2006 | 11:30 AM | 500 |
| Sep. 01, 2006 | 12:57 PM | 625 |
| Sep. 01, 2006 | 2:23 PM | 625 |
| Sep. 01, 2006 | 4:05 PM | 550 |
| Sep. 01, 2006 | 5:05 PM | 520 |
| Sep. 01, 2006 | 7:45 PM | 750 |
| Sep. 02, 2006 | 9:10 AM | 875 |
| Sep. 02, 2006 | 10:57 AM | 750 |
| Sep. 02, 2006 | 12:40 PM | 750 |
| Sep. 02, 2006 | 2:10 PM | 750 |
| Sep. 02, 2006 | 3:30 PM | 500 |
| Sep. 02, 2006 | 5:00 PM | 750 |
| Sep. 02, 2006 | 6:30 PM | 625 |
| Sep. 02, 2006 | 8:50 PM | 1,375 |
| Sep. 03, 2006 | 9:45 AM | 1,500 |
| Sep. 03, 2006 | 12:00 PM | 625 |
| Sep. 03, 2006 | 1:30 PM | 790 |
| Sep. 03, 2006 | 2:43 PM | 750 |
| Sep. 03, 2006 | 4:20 PM | 875 |
| Sep. 03, 2006 | 6:00 PM | 650 |
| Sep. 03, 2006 | 9:20 PM | 2,000 |
| Sep. 04, 2006 | 9:34 AM | 1,000 |
| Sep. 04, 2006 | 11:50 AM | 750 |
| Sep. 04, 2006 | 1:27 PM | 640 |
| Sep. 04, 2006 | 3:15 PM | 625 |
| Sep. 04, 2006 | 4:26 PM | 795 |
| Sep. 04, 2006 | 6:30 PM | 800 |
| Sep. 04, 2006 | 9:25 PM | 1,250 |
| Sep. 06, 2006 | 9:00 AM | 1,000 |
| Sep. 06, 2006 | 11:03 AM | 1,000 |
| Sep. 06, 2006 | 12:23 PM | 1,090 |
| Sep. 06, 2006 | 1:30 PM | 875 |
| Sep. 06, 2006 | 2:30 PM | 750 |
| Sep. 06, 2006 | 4:20 PM | 625 |
| Sep. 06, 2006 | 5:00 PM | 875 |
| Sep. 06, 2006 | 7:20 PM | 1,375 |
| Sep. 06, 2006 | 9:30 PM | 1,300 |
| Sep. 07, 2006 | 11:40 AM | 1,375 |
| Sep. 07, 2006 | 12:20 PM | 875 |
| Sep. 07, 2006 | 1:37 PM | 875 |
| Sep. 07, 2006 | 2:45 PM | 625 |
| Sep. 07, 2006 | 4:50 PM | 625 |
| Sep. 07, 2006 | 5:00 PM | 625 |
| Sep. 07, 2006 | 7:45 PM | 1,500 |
| Sep. 08, 2006 | 8:30 AM | 1,900 |
| Sep. 08, 2006 | 10:05 AM | 1,125 |

TABLE 2-continued

| Date | Sample Time | Volume of Excess Water from Plant Container (ml) |
|---|---|---|
| Sep. 08, 2006 | 11:32 AM | 1,000 |
| Sep. 08, 2006 | 12:19 PM | 1,000 |
| Sep. 08, 2006 | 1:39 PM | 750 |
| Sep. 08, 2006 | 2:55 PM | 1,000 |
| Sep. 08, 2006 | 4:11 PM | 875 |
| Sep. 08, 2006 | 5:30 PM | 1,000 |
| Sep. 08, 2006 | 8:00 PM | 1,250 |
| Sep. 09, 2006 | 9:30 AM | 1,125 |
| Sep. 09, 2006 | 11:28 AM | 1,000 |
| Sep. 09, 2006 | 1:12 PM | 1,125 |
| Sep. 09, 2006 | 4:30 PM | 900 |
| Sep. 09, 2006 | 5:50 PM | 875 |
| Sep. 09, 2006 | 8:35 PM | 1,375 |
| Sep. 10, 2006 | 10:38 AM | 500 |
| Sep. 10, 2006 | 1:07 PM | 530 |
| Sep. 10, 2006 | 3:09 PM | 250 |
| Sep. 10, 2006 | 4:41 PM | 375 |
| Sep. 10, 2006 | 7:15 PM | 500 |
| Sep. 11, 2006 | 11:49 AM | 400 |
| Sep. 11, 2006 | 12:40 PM | 750 |
| Sep. 11, 2006 | 2:23 PM | 375 |
| Sep. 11, 2006 | 3:45 PM | 500 |
| Sep. 11, 2006 | 5:30 PM | 250 |
| Sep. 11, 2006 | 7:40 PM | 875 |
| Sep. 12, 2006 | 10:41 AM | 375 |
| Sep. 12, 2006 | 12:29 PM | 500 |
| Sep. 12, 2006 | 1:52 PM | 500 |
| Sep. 12, 2006 | 3:35 PM | 1,375 |
| Sep. 12, 2006 | 5:01 PM | 375 |
| Sep. 12, 2006 | 8:00 PM | 625 |
| Sep. 13, 2006 | 10:15 AM | 250 |
| Sep. 13, 2006 | 12:43 PM | 375 |
| Sep. 13, 2006 | 2:00 PM | 375 |
| Sep. 13, 2006 | 3:23 PM | 390 |
| Sep. 13, 2006 | 4:45 PM | 390 |
| Sep. 13, 2006 | 5:45 PM | 625 |
| Sep. 14, 2006 | 10:20 AM | 375 |
| Sep. 14, 2006 | 12:21 PM | 390 |
| Sep. 14, 2006 | 1:54 PM | 375 |
| Sep. 14, 2006 | 3:30 PM | 375 |
| Sep. 14, 2006 | 5:00 PM | 250 |
| Sep. 14, 2006 | 8:00 PM | 625 |
| Sep. 15, 2006 | 11:16 AM | 875 |
| Sep. 15, 2006 | 1:15 PM | 625 |
| Sep. 15, 2006 | 3:00 PM | 590 |
| Sep. 15, 2006 | 6:22 PM | 350 |
| Sep. 16, 2006 | 11:30 AM | 780 |
| Sep. 16, 2006 | 3:20 PM | 100 |
| Sep. 16, 2006 | 7:40 PM | 375 |
| Sep. 17, 2006 | 11:30 AM | 200 |
| Sep. 17, 2006 | 2:30 PM | 375 |
| Sep. 17, 2006 | 6:15 PM | 125 |
| Sep. 18, 2006 | 11:49 AM | 375 |
| Sep. 18, 2006 | 2:19 PM | 250 |
| Sep. 18, 2006 | 5:13 PM | 125 |
| Sep. 19, 2006 | 10:11 AM | 375 |
| Sep. 19, 2006 | 1:08 PM | 250 |
| Sep. 19, 2006 | 3:08 PM | 375 |
| Sep. 19, 2006 | 6:00 PM | 375 |
| Sep. 20, 2006 | 10:33 AM | 500 |
| Sep. 20, 2006 | 1:46 PM | 390 |
| Sep. 20, 2006 | 5:30 PM | 75 |
| Sep. 21, 2006 | 10:00 AM | 375 |
| Sep. 21, 2006 | 12:34 PM | 100 |
| Sep. 21, 2006 | 3:00 PM | 375 |
| Sep. 21, 2006 | 6:00 PM | 125 |
| Sep. 22, 2006 | 11:10 AM | 375 |
| Sep. 22, 2006 | 2:20 PM | 375 |
| Sep. 22, 2006 | 5:30 PM | 375 |
| Sep. 23, 2006 | 10:40 AM | 1,000 |
| Sep. 23, 2006 | 2:52 PM | 500 |
| Sep. 23, 2006 | 7:45 PM | 625 |
| Sep. 24, 2006 | 9:15 AM | 1,700 |
| Sep. 24, 2006 | 1:00 PM | 650 |
| Sep. 24, 2006 | 3:45 PM | 625 |
| Sep. 24, 2006 | 6:30 PM | 375 |
| Sep. 25, 2006 | 11:20 AM | 125 |
| Sep. 25, 2006 | 2:10 PM | 100 |
| Sep. 25, 2006 | 4:00 PM | 150 |
| Sep. 25, 2006 | 5:50 PM | 625 |
| Sep. 26, 2006 | 11:54 AM | 500 |
| Sep. 26, 2006 | 2:04 PM | 500 |
| Sep. 26, 2006 | 5:30 PM | 450 |
| Sep. 26, 2006 | 10:51 AM | 375 |
| Sep. 26, 2006 | 1:20 PM | 380 |
| Sep. 26, 2006 | 3:11 PM | 500 |
| Sep. 26, 2006 | 5:25 PM | 425 |
| Sep. 26, 2006 | 7:30 PM | 1,100 |
| Sep. 27, 2006 | 10:10 AM | 500 |
| Sep. 27, 2006 | 12:38 PM | 250 |
| Sep. 27, 2006 | 2:25 PM | 375 |
| Sep. 27, 2006 | 4:10 PM | 375 |
| Sep. 27, 2006 | 7:45 PM | 375 |
| Sep. 29, 2006 | 11:05 AM | 250 |
| Sep. 29, 2006 | 1:10 PM | 375 |
| Sep. 29, 2006 | 3:27 PM | 250 |
| Sep. 29, 2006 | 5:38 PM | 375 |
| Sep. 30, 2006 | 11:00 AM | 300 |
| Sep. 30, 2006 | 2:30 PM | 500 |
| Sep. 30, 2006 | 4:30 PM | 625 |

As can be seen in Table 2, the volume of excess water draining from the plant container was measured during each irrigation event over a four-month growing period. During each irrigation event more water was applied than was needed to completely fill the plant container. The additional water applied to the plant container was needed to flush excess salts from the planting medium around the roots. When salts build up to unacceptable levels, as revealed through an analysis of the leach water through ion selective electrodes and/or electrical conductivity (EC) sensors, additional water is needed to flush out the harmful salts. For example, from Sep. 1, 2006 to Sep. 2, 2006 the excess water volume ranged from 520 ml to 875 ml, until the last irrigation event on the Sep. 2, 2006 which was a flush with a water volume of 1375 ml. This initial flush was followed by a stronger flush of 1500 ml of excess water during the first irrigation event on Sep. 3, 2006. Once the salt levels in the excess water from the plant container dropped to acceptable levels the amount of excess water applied dropped back down to normal levels.

Table 3 shows the total amount of water and nutrients consumed by the plant. This was calculated by taking the difference between the amount of water delivered to the plant and the amount of excess water from the bottom of the plant container. Table 3 shows that water consumption increased as the number of irrigation events increased over time. Table 3 also shows the dates and times of the various watering events. Column 1 of Table 3 shows the date, column 2 shows the total volume of water delivered from the irrigation line in milliliters, column 3 shows the volume of excess water drained from the plant container and column 4 shows the total volume of water consumed in milliliters.

TABLE 3

| Date | Total Volume of Water from the Irrigation Line (ml) | Total Volume of Excess Water drained from the Plant Container (ml) | Total Volume of Water Consumed (ml) |
|---|---|---|---|
| May 25, 2006 | 2,500 | 1,250 | 1,250 |

TABLE 3-continued

| Date | Total Volume of Water from the Irrigation Line (ml) | Total Volume of Excess Water drained from the Plant Container (ml) | Total Volume of Water Consumed (ml) |
|---|---|---|---|
| May 25, 2006 | 2,500 | 1,000 | 1,500 |
| May 26, 2006 | 2,375 | 1,000 | 1,375 |
| May 26, 2006 | 2,255 | 1,000 | 1,255 |
| May 26, 2006 | 1,375 | 750 | 625 |
| May 27, 2006 | 2,500 | 1,250 | 1,250 |
| May 27, 2006 | 2,625 | 1,400 | 825 |
| May 28, 2006 | 2,250 | 1,400 | 850 |
| May 28, 2006 | 2,375 | 875 | 1,500 |
| May 28, 2006 | 1,750 | 875 | 875 |
| May 29, 2006 | 2,200 | 950 | 1,300 |
| May 29, 2006 | 2,500 | 1,500 | 1,000 |
| May 29, 2006 | 1,375 | 625 | 750 |
| May 30, 2006 | 2,050 | 1,250 | 800 |
| May 30, 2006 | 2,500 | 1,000 | 1,500 |
| May 30, 2006 | 2,250 | 875 | 1,375 |
| May 31, 2006 | 2,150 | 875 | 1,275 |
| May 31, 2006 | 3,000 | 1,500 | 1,500 |
| Jun. 04, 2006 | 2,200 | 800 | 1,400 |
| Jun. 04, 2006 | 2,875 | 1,500 | 1,375 |
| Jun. 05, 2006 | 2,000 | 875 | 1,125 |
| Jun. 05, 2006 | 3,000 | 1,500 | 1,500 |
| Jun. 05, 2006 | 5,500 | 3,825 | 1,675 |
| Jun. 06, 2006 | 2,875 | 1,900 | 975 |
| Jun. 06, 2006 | 2,900 | 1,900 | 1,000 |
| Jun. 06, 2006 | 2,850 | 1,500 | 1,350 |
| Jun. 06, 2006 | 3,530 | 3,000 | 550 |
| Jun. 07, 2006 | 2,250 | 1,125 | 1,125 |
| Jun. 07, 2006 | 2,750 | 1,500 | 1,250 |
| Jun. 07, 2006 | 2,900 | 1,375 | 1,525 |
| Jun. 07, 2006 | 2,750 | 1,750 | 1,000 |
| Jun. 08, 2006 | 2,000 | 1,125 | 875 |
| Jun. 08, 2006 | 6,000 | 4,500 | 1,500 |
| Jun. 08, 2006 | 2,700 | 1,750 | 950 |
| Jun. 08, 2006 | 3,250 | 2,000 | 1,250 |
| Jun. 09, 2006 | 2,100 | 1,250 | 850 |
| Jun. 09, 2006 | 2,300 | 1,500 | 800 |
| Jun. 09, 2006 | 2,000 | 875 | 1,125 |
| Jun. 09, 2006 | 2,250 | 1,750 | 1,500 |
| Jun. 10, 2006 | 2,875 | 2,750 | 125 |
| Jun. 10, 2006 | 2,000 | 950 | 1,050 |
| Jun. 10, 2006 | 2,875 | 1,500 | 1,375 |
| Jun. 11, 2006 | 2,000 | 1,300 | 700 |
| Jun. 11, 2006 | 3,500 | 1,750 | 1,750 |
| Jun. 11, 2006 | 5,000 | 3,250 | 1,750 |
| Jun. 11, 2006 | 2,750 | 2,000 | 750 |
| Jun. 12, 2006 | 2,050 | 1,625 | 425 |
| Jun. 12, 2006 | 2,400 | 1,875 | 525 |
| Jun. 12, 2006 | 2,400 | 1,500 | 900 |
| Jun. 12, 2006 | 2,375 | 1,500 | 875 |
| Jun. 12, 2006 | 2,400 | 1,600 | 800 |
| Jun. 13, 2006 | 2,150 | 1,125 | 1,025 |
| Jun. 13, 2006 | 2,500 | 1,625 | 875 |
| Jun. 13, 2006 | 2,375 | 1,500 | 875 |
| Jun. 13, 2006 | 2,375 | 1,375 | 1,000 |
| Jun. 14, 2006 | 2,000 | 950 | 1,050 |
| Jun. 14, 2006 | 2,325 | 1,700 | 625 |
| Jun. 14, 2006 | 2,200 | 1,500 | 700 |
| Jun. 14, 2006 | 1,750 | 600 | 1,150 |
| Jun. 15, 2006 | 2,200 | 625 | 1,575 |
| Jun. 15, 2006 | 3,125 | 2,325 | 800 |
| Jun. 15, 2006 | 2,375 | 1,500 | 875 |
| Jun. 15, 2006 | 3,250 | 2,375 | 855 |
| Jun. 16, 2006 | 2,200 | 875 | 1,325 |
| Jun. 16, 2006 | 2,350 | 1,375 | 975 |
| Jun. 16, 2006 | 2,150 | 1,250 | 900 |
| Jun. 16, 2006 | 2,500 | 1,250 | 1,250 |
| Jun. 16, 2006 | 2,500 | 1,500 | 1,000 |
| Jun. 17, 2006 | 2,400 | 1,200 | 1,200 |
| Jun. 17, 2006 | 2,500 | 1,550 | 950 |
| Jun. 17, 2006 | 2,000 | 750 | 1,250 |
| Jun. 17, 2006 | 2,400 | 1,000 | 1,400 |
| Jun. 17, 2006 | 2,375 | 1,750 | 625 |
| Jun. 18, 2006 | 2,325 | 1,500 | 825 |
| Jun. 18, 2006 | 2,500 | 1,350 | 1,150 |
| Jun. 18, 2006 | 2,500 | 1,375 | 1,125 |
| Jun. 18, 2006 | 2,325 | 1,000 | 1,325 |
| Jun. 18, 2006 | 2,500 | 625 | 875 |
| Jun. 19, 2006 | 2,000 | 1,000 | 1,000 |
| Jun. 19, 2006 | 2,300 | 1,375 | 1,825 |
| Jun. 19, 2006 | 2,375 | 1,600 | 775 |
| Jun. 19, 2006 | 2,300 | 1,375 | 925 |
| Jun. 20, 2006 | 2,225 | 1,500 | 725 |
| Jun. 20, 2006 | 2,075 | 1,250 | 825 |
| Jun. 20, 2006 | 2,250 | 1,500 | 750 |
| Jun. 20, 2006 | 2,150 | 1,250 | 900 |
| Jun. 20, 2006 | 2,250 | 1,500 | 750 |
| Jun. 21, 2006 | 2,275 | 1,625 | 875 |
| Jun. 21, 2006 | 2,000 | 1,000 | 1,000 |
| Jun. 21, 2006 | 1,550 | 1,100 | 450 |
| Jun. 21, 2006 | 2,300 | 1,125 | 1,175 |
| Jun. 21, 2006 | 2,000 | 1,250 | 750 |
| Jun. 22, 2006 | 2,075 | 1,500 | 575 |
| Jun. 22, 2006 | 2,050 | 1,275 | 775 |
| Jun. 22, 2006 | 2,000 | 1,125 | 875 |
| Jun. 22, 2006 | 2,150 | 1,300 | 850 |
| Jun. 22, 2006 | 2,500 | 1,450 | 1,050 |
| Jun. 23, 2006 | 2,350 | 1,500 | 850 |
| Jun. 23, 2006 | 2,125 | 1,300 | 825 |
| Jun. 23, 2006 | 2,000 | 1,300 | 700 |
| Jun. 23, 2006 | 2,225 | 1,250 | 975 |
| Jun. 23, 2006 | 2,050 | 1,050 | 1,000 |
| Jun. 24, 2006 | 2,300 | 1,900 | 400 |
| Jun. 24, 2006 | 2,275 | 1,500 | 775 |
| Jun. 24, 2006 | 2,300 | 1,500 | 800 |
| Jun. 24, 2006 | 1,900 | 1,250 | 650 |
| Jun. 24, 2006 | 2,100 | 1,000 | 1,100 |
| Jun. 25, 2006 | 2,375 | 1,900 | 475 |
| Jun. 25, 2006 | 2,100 | 1,500 | 600 |
| Jun. 25, 2006 | 2,225 | 1,375 | 850 |
| Jun. 25, 2006 | 2,200 | 1,050 | 1,150 |
| Jun. 25, 2006 | 2,075 | 1,225 | 850 |
| Jun. 26, 2006 | 2,350 | 1,900 | 450 |
| Jun. 26, 2006 | 2,375 | 2,000 | 375 |
| Jun. 26, 2006 | 2,200 | 1,250 | 950 |
| Jun. 26, 2006 | 2,300 | 1,500 | 800 |
| Jun. 26, 2006 | 2,375 | 1,350 | 1,025 |
| Jun. 27, 2006 | 1,775 | 1,600 | 175 |
| Jun. 27, 2006 | 1,750 | 1,500 | 250 |
| Jun. 27, 2006 | 1,750 | 500 | 1,250 |
| Jun. 27, 2006 | 1,850 | 750 | 1,100 |
| Jun. 27, 2006 | 1,550 | 525 | 1,025 |
| Jun. 29, 2006 | 1,250 | 350 | 900 |
| Jun. 29, 2006 | 1,175 | 450 | 725 |
| Jun. 29, 2006 | 1,300 | 325 | 975 |
| Jun. 29, 2006 | 1,250 | 175 | 1,075 |
| Jun. 29, 2006 | 1,100 | 150 | 950 |
| Jun. 30, 2006 | 1,250 | 400 | 850 |
| Jun. 30, 2006 | 1,375 | 400 | 975 |
| Jun. 30, 2006 | 1,125 | 175 | 950 |
| Jun. 30, 2006 | 1,125 | 50 | 1,075 |
| Jun. 30, 2006 | 1,500 | 250 | 1,250 |
| Jun. 30, 2006 | 1,650 | 875 | 775 |
| Jun. 30, 2006 | 1,625 | 1,100 | 525 |
| Jul. 01, 2006 | 1,250 | 450 | 800 |
| Jul. 01, 2006 | 1,050 | 300 | 750 |
| Jul. 01, 2006 | 1,450 | 275 | 1,175 |
| Jul. 01, 2006 | 1,250 | 175 | 1,075 |
| Jul. 01, 2006 | 1,325 | 175 | 1,150 |
| Jul. 01, 2006 | 1,300 | 400 | 900 |
| Jul. 01, 2006 | 1,375 | 800 | 575 |
| Jul. 02, 2006 | 1,375 | 175 | 1,200 |
| Jul. 02, 2006 | 1,625 | 400 | 1,225 |
| Jul. 02, 2006 | 1,500 | 250 | 1,225 |
| Jul. 02, 2006 | 1,500 | 300 | 1,200 |
| Jul. 02, 2006 | 1,625 | 500 | 1,125 |
| Jul. 02, 2006 | 1,375 | 500 | 875 |
| Jul. 02, 2006 | 1,250 | 625 | 625 |
| Jul. 02, 2006 | 1,900 | 1,375 | 525 |

TABLE 3-continued

| Date | Total Volume of Water from the Irrigation Line (ml) | Total Volume of Excess Water drained from the Plant Container (ml) | Total Volume of Water Consumed (ml) |
|---|---|---|---|
| Jul. 03, 2006 | 1,250 | 400 | 850 |
| Jul. 03, 2006 | 1,025 | 325 | 700 |
| Jul. 03, 2006 | 1,250 | 175 | 1,075 |
| Jul. 03, 2006 | 1,250 | 350 | 900 |
| Jul. 03, 2006 | 1,350 | 350 | 1,000 |
| Jul. 03, 2006 | 1,125 | 200 | 925 |
| Jul. 03, 2006 | 1,350 | 975 | 375 |
| Jul. 04, 2006 | 1,500 | 625 | 875 |
| Jul. 04, 2006 | 1,300 | 625 | 675 |
| Jul. 04, 2006 | 1,350 | 500 | 850 |
| Jul. 04, 2006 | 1,375 | 500 | 875 |
| Jul. 04, 2006 | 1,250 | 275 | 975 |
| Jul. 04, 2006 | 1,250 | 725 | 1,025 |
| Jul. 04, 2006 | 1,500 | 875 | 625 |
| Jul. 04, 2006 | 1,375 | 1,350 | 25 |
| Jul. 05, 2006 | 1,250 | 450 | 800 |
| Jul. 05, 2006 | 1,050 | 350 | 700 |
| Jul. 05, 2006 | 1,250 | 350 | 900 |
| Jul. 05, 2006 | 1,375 | 375 | 1,000 |
| Jul. 05, 2006 | 1,000 | 75 | 925 |
| Jul. 05, 2006 | 1,600 | 450 | 1,150 |
| Jul. 05, 2006 | 1,375 | 750 | 625 |
| Jul. 05, 2006 | 1,900 | 1,375 | 525 |
| Jul. 06, 2006 | 1,250 | 500 | 750 |
| Jul. 06, 2006 | 1,225 | 450 | 775 |
| Jul. 06, 2006 | 1,250 | 375 | 875 |
| Jul. 06, 2006 | 1,325 | 300 | 1,025 |
| Jul. 06, 2006 | 1,125 | 75 | 1,050 |
| Jul. 06, 2006 | 1,375 | 500 | 875 |
| Jul. 06, 2006 | 1,500 | 1,125 | 375 |
| Jul. 07, 2006 | 1,250 | 475 | 775 |
| Jul. 07, 2006 | 1,375 | 500 | 825 |
| Jul. 07, 2006 | 1,125 | 300 | 825 |
| Jul. 07, 2006 | 1,375 | 300 | 1,075 |
| Jul. 07, 2006 | 1,125 | 350 | 775 |
| Jul. 07, 2006 | 1,500 | 625 | 875 |
| Jul. 07, 2006 | 1,375 | 625 | 750 |
| Jul. 08, 2006 | 1,250 | 275 | 975 |
| Jul. 08, 2006 | 1,125 | 125 | 1,000 |
| Jul. 08, 2006 | 1,375 | 625 | 750 |
| Jul. 08, 2006 | 1,000 | 375 | 625 |
| Jul. 08, 2006 | 1,250 | 650 | 600 |
| Jul. 08, 2006 | 1,250 | 625 | 625 |
| Jul. 08, 2006 | 1,375 | 500 | 875 |
| Jul. 08, 2006 | 1,250 | 400 | 725 |
| Jul. 09, 2006 | 1,350 | 500 | 850 |
| Jul. 09, 2006 | 1,250 | 625 | 625 |
| Jul. 09, 2006 | 1,250 | 325 | 925 |
| Jul. 09, 2006 | 1,250 | 500 | 750 |
| Jul. 09, 2006 | 970 | 150 | 720 |
| Jul. 09, 2006 | 1,370 | 450 | 920 |
| Jul. 09, 2006 | 1,400 | 450 | 950 |
| Jul. 09, 2006 | 1,375 | 875 | 525 |
| Jul. 10, 2006 | 1,250 | 450 | 800 |
| Jul. 10, 2006 | 1,375 | 500 | 875 |
| Jul. 10, 2006 | 1,250 | 400 | 850 |
| Jul. 10, 2006 | 1,125 | 150 | 975 |
| Jul. 10, 2006 | 1,225 | 250 | 975 |
| Jul. 10, 2006 | 2,000 | 875 | 1,125 |
| Jul. 10, 2006 | 1,375 | 750 | 625 |
| Jul. 10, 2006 | 1,100 | 500 | 600 |
| Jul. 11, 2006 | 1,275 | 400 | 875 |
| Jul. 11, 2006 | 1,250 | 375 | 875 |
| Jul. 11, 2006 | 1,050 | 300 | 750 |
| Jul. 11, 2006 | 1,275 | 300 | 975 |
| Jul. 11, 2006 | 1,275 | 225 | 1,050 |
| Jul. 11, 2006 | 1,375 | 350 | 1,025 |
| Jul. 11, 2006 | 1,000 | 500 | 500 |
| Jul. 12, 2006 | 1,375 | 500 | 875 |
| Jul. 12, 2006 | 1,125 | 250 | 875 |
| Jul. 12, 2006 | 1,125 | 250 | 875 |
| Jul. 12, 2006 | 1,025 | 75 | 950 |
| Jul. 12, 2006 | 1,375 | 400 | 975 |
| Jul. 12, 2006 | 1,375 | 700 | 650 |
| Jul. 12, 2006 | 1,375 | 1,000 | 375 |
| Jul. 13, 2006 | 1,375 | 350 | 1,020 |
| Jul. 13, 2006 | 1,000 | 100 | 900 |
| Jul. 13, 2006 | 1,375 | 475 | 900 |
| Jul. 13, 2006 | 1,225 | 150 | 1,075 |
| Jul. 13, 2006 | 1,375 | 350 | 1,025 |
| Jul. 13, 2006 | 1,375 | 875 | 500 |
| Jul. 14, 2006 | 1,375 | 325 | 1,050 |
| Jul. 14, 2006 | 1,450 | 425 | 1,025 |
| Jul. 14, 2006 | 1,375 | 400 | 975 |
| Jul. 14, 2006 | 1,275 | 300 | 975 |
| Jul. 14, 2006 | 1,375 | 350 | 1,025 |
| Jul. 14, 2006 | 1,400 | 750 | 650 |
| Jul. 14, 2006 | 1,250 | 825 | 425 |
| Jul. 15, 2006 | 1,375 | 375 | 1,000 |
| Jul. 15, 2006 | 1,375 | 475 | 900 |
| Jul. 15, 2006 | 1,400 | 500 | 900 |
| Jul. 15, 2006 | 1,225 | 525 | 700 |
| Jul. 15, 2006 | 1,250 | 250 | 1,000 |
| Jul. 15, 2006 | 1,250 | 400 | 850 |
| Jul. 16, 2006 | 1,000 | 175 | 825 |
| Jul. 16, 2006 | 1,375 | 375 | 1,000 |
| Jul. 16, 2006 | 1,375 | 500 | 875 |
| Jul. 16, 2006 | 1,125 | 150 | 975 |
| Jul. 16, 2006 | 1,375 | 350 | 1,025 |
| Jul. 16, 2006 | 1,625 | 625 | 1,000 |
| Jul. 16, 2006 | 1,350 | 875 | 475 |
| Jul. 17, 2006 | 1,375 | 625 | 750 |
| Jul. 17, 2006 | 1,375 | 375 | 1,000 |
| Jul. 17, 2006 | 1,375 | 475 | 900 |
| Jul. 17, 2006 | 1,250 | 250 | 1,000 |
| Jul. 17, 2006 | 1,125 | 150 | 975 |
| Jul. 17, 2006 | 1,125 | 300 | 825 |
| Jul. 18, 2006 | 1,375 | 375 | 1,000 |
| Jul. 18, 2006 | 1,625 | 625 | 1,000 |
| Jul. 18, 2006 | 1,750 | 525 | 1,225 |
| Jul. 18, 2006 | 1,625 | 675 | 950 |
| Jul. 18, 2006 | 1,375 | 625 | 750 |
| Jul. 19, 2006 | 1,700 | 750 | 950 |
| Jul. 19, 2006 | 1,725 | 625 | 1,100 |
| Jul. 19, 2006 | 1,650 | 650 | 1,000 |
| Jul. 19, 2006 | 1,425 | 425 | 1,000 |
| Jul. 19, 2006 | 1,375 | 350 | 1,000 |
| Jul. 19, 2006 | 1,780 | 750 | 1,000 |
| Jul. 20, 2006 | 1,725 | 750 | 975 |
| Jul. 20, 2006 | 1,725 | 850 | 875 |
| Jul. 20, 2006 | 1,750 | 725 | 1,025 |
| Jul. 20, 2006 | 1,525 | 550 | 975 |
| Jul. 20, 2006 | 1,300 | 375 | 925 |
| Jul. 20, 2006 | 1,300 | 375 | 925 |
| Jul. 21, 2006 | 1,900 | 875 | 1,025 |
| Jul. 21, 2006 | 1,725 | 625 | 1,100 |
| Jul. 21, 2006 | 1,750 | 500 | 1,250 |
| Jul. 21, 2006 | 2,150 | 950 | 1,200 |
| Jul. 21, 2006 | 1,250 | 625 | 625 |
| Jul. 22, 2006 | 1,425 | 475 | 950 |
| Jul. 22, 2006 | 1,375 | 275 | 1,100 |
| Jul. 22, 2006 | 1,275 | 400 | 875 |
| Jul. 22, 2006 | 1,250 | 375 | 875 |
| Jul. 22, 2006 | 1,500 | 300 | 1,200 |
| Jul. 22, 2006 | 2,200 | 1,500 | 700 |
| Jul. 24, 2006 | 1,750 | 1,125 | 625 |
| Jul. 24, 2006 | 1,500 | 750 | 750 |
| Jul. 24, 2006 | 1,575 | 650 | 925 |
| Jul. 24, 2006 | 1,375 | 350 | 1,025 |
| Jul. 24, 2006 | 1,750 | 775 | 975 |
| Jul. 24, 2006 | 1,625 | 625 | 1,000 |
| Jul. 24, 2006 | 1,125 | 625 | 500 |
| Jul. 25, 2006 | 1,750 | 875 | 875 |
| Jul. 25, 2006 | 1,500 | 500 | 1,000 |
| Jul. 25, 2006 | 1,750 | 875 | 875 |
| Jul. 25, 2006 | 1,650 | 675 | 975 |
| Jul. 25, 2006 | 2,100 | 1,000 | 1,100 |
| Jul. 25, 2006 | 1,375 | 625 | 750 |

TABLE 3-continued

| Date | Total Volume of Water from the Irrigation Line (ml) | Total Volume of Excess Water drained from the Plant Container (ml) | Total Volume of Water Consumed (ml) |
|---|---|---|---|
| Jul. 25, 2006 | 1,750 | 1,125 | 625 |
| Jul. 26, 2006 | 1,625 | 750 | 875 |
| Jul. 26, 2006 | 1,750 | 875 | 875 |
| Jul. 26, 2006 | 1,750 | 750 | 1,000 |
| Jul. 26, 2006 | 1,375 | 325 | 1,050 |
| Jul. 26, 2006 | 1,500 | 550 | 950 |
| Jul. 26, 2006 | 1,500 | 550 | 950 |
| Jul. 27, 2006 | 1,750 | 1,000 | 750 |
| Jul. 27, 2006 | 1,750 | 750 | 1,000 |
| Jul. 27, 2006 | 1,900 | 950 | 950 |
| Jul. 27, 2006 | 1,750 | 1,000 | 750 |
| Jul. 27, 2006 | 1,500 | 575 | 925 |
| Jul. 27, 2006 | 1,750 | 875 | 875 |
| Jul. 28, 2006 | 1,750 | 975 | 775 |
| Jul. 28, 2006 | 1,625 | 750 | 875 |
| Jul. 28, 2006 | 1,500 | 750 | 750 |
| Jul. 28, 2006 | 1,850 | 900 | 950 |
| Jul. 28, 2006 | 1,525 | 625 | 900 |
| Jul. 28, 2006 | 1,750 | 875 | 875 |
| Jul. 28, 2006 | 1,625 | 1,150 | 475 |
| Jul. 29, 2006 | 1,750 | 875 | 875 |
| Jul. 29, 2006 | 1,525 | 850 | 675 |
| Jul. 29, 2006 | 1,525 | 750 | 775 |
| Jul. 29, 2006 | 1,750 | 875 | 875 |
| Jul. 29, 2006 | 1,375 | 625 | 750 |
| Jul. 29, 2006 | 1,750 | 850 | 900 |
| Jul. 29, 2006 | 1,750 | 1,000 | 750 |
| Jul. 31, 2006 | 1,625 | 1,000 | 625 |
| Jul. 31, 2006 | 1,600 | 875 | 725 |
| Jul. 31, 2006 | 1,500 | 750 | 750 |
| Jul. 31, 2006 | 1,750 | 750 | 1,000 |
| Jul. 31, 2006 | 1,750 | 750 | 1,000 |
| Jul. 31, 2006 | 1,750 | 1,000 | 750 |
| Jul. 31, 2006 | 1,625 | 750 | 875 |
| Jul. 31, 2006 | 1,625 | 1,125 | 500 |
| Aug. 01, 2006 | 1,625 | 1,125 | 500 |
| Aug. 01, 2006 | 1,750 | 875 | 875 |
| Aug. 01, 2006 | 1,500 | 875 | 625 |
| Aug. 01, 2006 | 1,750 | 875 | 875 |
| Aug. 01, 2006 | 1,625 | 750 | 875 |
| Aug. 01, 2006 | 1,375 | 500 | 875 |
| Aug. 01, 2006 | 1,500 | 1,000 | 500 |
| Aug. 02, 2006 | 1,500 | 750 | 750 |
| Aug. 02, 2006 | 1,375 | 375 | 1,000 |
| Aug. 02, 2006 | 1,625 | 625 | 1,000 |
| Aug. 02, 2006 | 3,900 | 2,000 | 1,900 |
| Aug. 02, 2006 | 1,300 | 700 | 600 |
| Aug. 02, 2006 | 1,050 | 1,000 | 50 |
| Aug. 03, 2006 | 1,625 | 750 | 875 |
| Aug. 03, 2006 | 2,000 | 750 | 1,250 |
| Aug. 03, 2006 | 1,625 | 750 | 875 |
| Aug. 03, 2006 | 1,625 | 875 | 750 |
| Aug. 03, 2006 | 1,025 | 1,000 | 625 |
| Aug. 03, 2006 | 1,900 | 1,150 | 750 |
| Aug. 04, 2006 | 1,625 | 625 | 1,000 |
| Aug. 04, 2006 | 1,625 | 875 | 750 |
| Aug. 04, 2006 | 875 | 250 | 625 |
| Aug. 04, 2006 | 1,625 | 875 | 750 |
| Aug. 04, 2006 | 1,625 | 875 | 750 |
| Aug. 04, 2006 | 1,500 | 750 | 750 |
| Aug. 04, 2006 | 1,150 | 650 | 500 |
| Aug. 04, 2006 | 1,500 | 1,250 | 250 |
| Aug. 05, 2006 | 1,625 | 875 | 750 |
| Aug. 05, 2006 | 1,625 | 1,000 | 625 |
| Aug. 05, 2006 | 1,625 | 875 | 750 |
| Aug. 05, 2006 | 1,625 | 750 | 875 |
| Aug. 05, 2006 | 1,625 | 875 | 750 |
| Aug. 05, 2006 | 1,625 | 750 | 875 |
| Aug. 05, 2006 | 2,000 | 1,000 | 1,000 |
| Aug. 05, 2006 | 1,250 | 1,000 | 250 |
| Aug. 06, 2006 | 1,625 | 900 | 725 |
| Aug. 07, 2006 | 1,625 | 1,125 | 500 |
| Aug. 07, 2006 | 1,625 | 1,125 | 500 |
| Aug. 07, 2006 | 1,625 | 875 | 750 |
| Aug. 07, 2006 | 1,375 | 875 | 500 |
| Aug. 07, 2006 | 1,625 | 875 | 750 |
| Aug. 07, 2006 | 1,500 | 750 | 750 |
| Aug. 07, 2006 | 1,500 | 875 | 625 |
| Aug. 07, 2006 | 1,500 | 1,000 | 500 |
| Aug. 08, 2006 | 1,125 | 875 | 250 |
| Aug. 08, 2006 | 1,500 | 550 | 950 |
| Aug. 08, 2006 | 1,625 | 875 | 750 |
| Aug. 08, 2006 | 1,500 | 750 | 750 |
| Aug. 08, 2006 | 1,500 | 625 | 875 |
| Aug. 08, 2006 | 1,625 | 875 | 750 |
| Aug. 08, 2006 | 1,500 | 875 | 625 |
| Aug. 09, 2006 | 1,750 | 715 | 975 |
| Aug. 09, 2006 | 1,750 | 875 | 875 |
| Aug. 09, 2006 | 1,750 | 875 | 875 |
| Aug. 09, 2006 | 1,750 | 875 | 875 |
| Aug. 09, 2006 | 1,750 | 800 | 950 |
| Aug. 09, 2006 | 1,250 | 500 | 750 |
| Aug. 10, 2006 | 1,125 | 800 | 325 |
| Aug. 10, 2006 | 1,900 | 250 | 1,650 |
| Aug. 10, 2006 | 1,750 | 1,125 | 625 |
| Aug. 10, 2006 | 1,500 | 625 | 875 |
| Aug. 10, 2006 | 1,375 | 500 | 900 |
| Aug. 10, 2006 | 1,750 | 875 | 875 |
| Aug. 10, 2006 | 1,500 | 1,375 | 125 |
| Aug. 11, 2006 | 1,750 | 1,000 | 750 |
| Aug. 11, 2006 | 1,750 | 1,000 | 750 |
| Aug. 11, 2006 | 1,750 | 1,000 | 750 |
| Aug. 11, 2006 | 1,750 | 875 | 875 |
| Aug. 11, 2006 | 1,750 | 765 | 985 |
| Aug. 11, 2006 | 1,500 | 550 | 950 |
| Aug. 11, 2006 | 1,500 | 1,125 | 375 |
| Aug. 11, 2006 | 1,750 | 1,125 | 625 |
| Aug. 11, 2006 | 1,750 | 1,050 | 700 |
| Aug. 12, 2006 | 1,750 | 1,125 | 625 |
| Aug. 12, 2006 | 1,750 | 1,050 | 700 |
| Aug. 12, 2006 | 1,900 | 1,050 | 850 |
| Aug. 12, 2006 | 1,775 | 1,050 | 725 |
| Aug. 12, 2006 | 1,625 | 875 | 750 |
| Aug. 12, 2006 | 1,750 | 875 | 875 |
| Aug. 12, 2006 | 1,750 | 875 | 875 |
| Aug. 13, 2006 | 1,750 | 1,220 | 530 |
| Aug. 13, 2006 | 1,625 | 750 | 875 |
| Aug. 13, 2006 | 1,750 | 1,000 | 750 |
| Aug. 13, 2006 | 1,750 | 875 | 875 |
| Aug. 13, 2006 | 1,625 | 875 | 750 |
| Aug. 13, 2006 | 1,750 | 675 | 1,075 |
| Aug. 13, 2006 | 1,700 | 1,125 | 625 |
| Aug. 13, 2006 | 1,375 | 375 | 1,000 |
| Aug. 14, 2006 | 1,750 | 1,250 | 500 |
| Aug. 14, 2006 | 1,750 | 1,000 | 750 |
| Aug. 14, 2006 | 1,750 | 1,050 | 700 |
| Aug. 14, 2006 | 1,625 | 750 | 875 |
| Aug. 14, 2006 | 1,625 | 625 | 1,000 |
| Aug. 14, 2006 | 1,625 | 750 | 875 |
| Aug. 14, 2006 | 1,325 | 375 | 1,000 |
| Aug. 15, 2006 | 1,750 | 1,000 | 750 |
| Aug. 15, 2006 | 1,900 | 1,375 | 525 |
| Aug. 15, 2006 | 1,750 | 1,000 | 750 |
| Aug. 15, 2006 | 1,900 | 1,125 | 775 |
| Aug. 15, 2006 | 1,750 | 500 | 1,250 |
| Aug. 15, 2006 | 1,750 | 1,125 | 625 |
| Aug. 15, 2006 | 1,900 | 875 | 875 |
| Aug. 16, 2006 | 1,750 | 875 | 875 |
| Aug. 16, 2006 | 1,500 | 625 | 875 |
| Aug. 16, 2006 | 1,750 | 875 | 875 |
| Aug. 16, 2006 | 1,625 | 650 | 975 |
| Aug. 16, 2006 | 1,625 | 750 | 875 |
| Aug. 16, 2006 | 1,750 | 675 | 1,075 |
| Aug. 16, 2006 | 1,625 | 1,280 | 345 |
| Aug. 17, 2006 | 1,500 | 750 | 750 |
| Aug. 17, 2006 | 1,500 | 625 | 875 |
| Aug. 17, 2006 | 1,750 | 880 | 870 |
| Aug. 17, 2006 | 1,750 | 780 | 970 |

TABLE 3-continued

| Date | Total Volume of Water from the Irrigation Line (ml) | Total Volume of Excess Water drained from the Plant Container (ml) | Total Volume of Water Consumed (ml) |
|---|---|---|---|
| Aug. 17, 2006 | 1,750 | 750 | 1,000 |
| Aug. 17, 2006 | 1,750 | 500 | 1,250 |
| Aug. 17, 2006 | 1,825 | 1,000 | 825 |
| Aug. 18, 2006 | 1,750 | 780 | 970 |
| Aug. 18, 2006 | 1,750 | 760 | 990 |
| Aug. 18, 2006 | 1,625 | 750 | 875 |
| Aug. 18, 2006 | 1,625 | 750 | 875 |
| Aug. 18, 2006 | 1,750 | 760 | 990 |
| Aug. 18, 2006 | 1,900 | 875 | 975 |
| Aug. 19, 2006 | 1,750 | 780 | 970 |
| Aug. 19, 2006 | 1,750 | 780 | 970 |
| Aug. 19, 2006 | 1,500 | 625 | 875 |
| Aug. 19, 2006 | 1,590 | 625 | 965 |
| Aug. 19, 2006 | 1,625 | 680 | 945 |
| Aug. 19, 2006 | 1,600 | 875 | 725 |
| Aug. 20, 2006 | 1,900 | 750 | 1,150 |
| Aug. 20, 2006 | 1,750 | 625 | 1,125 |
| Aug. 20, 2006 | 1,750 | 625 | 1,125 |
| Aug. 20, 2006 | 1,750 | 375 | 1,375 |
| Aug. 20, 2006 | 1,900 | 700 | 1,200 |
| Aug. 20, 2006 | 1,500 | 1,125 | 375 |
| Aug. 21, 2006 | 1,750 | 1,280 | 470 |
| Aug. 21, 2006 | 1,590 | 590 | 1,000 |
| Aug. 21, 2006 | 1,690 | 760 | 930 |
| Aug. 21, 2006 | 1,750 | 630 | 1,110 |
| Aug. 21, 2006 | 1,650 | 540 | 1,085 |
| Aug. 21, 2006 | 1,625 | 500 | 1,125 |
| Aug. 21, 2006 | 1,900 | 750 | 1,150 |
| Aug. 22, 2006 | 1,900 | 1,000 | 900 |
| Aug. 22, 2006 | 1,380 | 500 | 880 |
| Aug. 22, 2006 | 1,750 | 760 | 990 |
| Aug. 22, 2006 | 1,625 | 500 | 1,125 |
| Aug. 22, 2006 | 1,625 | 680 | 945 |
| Aug. 22, 2006 | 1,625 | 500 | 1,125 |
| Aug. 22, 2006 | 1,900 | 1,050 | 850 |
| Aug. 23, 2006 | 1,790 | 875 | 915 |
| Aug. 23, 2006 | 1,625 | 625 | 1,000 |
| Aug. 23, 2006 | 1,780 | 875 | 905 |
| Aug. 23, 2006 | 1,770 | 790 | 980 |
| Aug. 23, 2006 | 1,750 | 625 | 1,125 |
| Aug. 23, 2006 | 1,500 | 500 | 1,000 |
| Aug. 23, 2006 | 1,625 | 750 | 875 |
| Aug. 23, 2006 | 1,900 | 1,625 | 275 |
| Aug. 24, 2006 | 1,750 | 690 | 1,060 |
| Aug. 24, 2006 | 1,625 | 750 | 875 |
| Aug. 24, 2006 | 1,900 | 1,000 | 900 |
| Aug. 24, 2006 | 1,790 | 875 | 915 |
| Aug. 24, 2006 | 1,790 | 625 | 1,165 |
| Aug. 24, 2006 | 1,900 | 650 | 1,275 |
| Aug. 24, 2006 | 1,000 | 500 | 1,000 |
| Aug. 24, 2006 | 1,250 | 1,050 | 200 |
| Aug. 25, 2006 | 2,650 | 1,500 | 1,150 |
| Aug. 25, 2006 | 1,900 | 1,000 | 900 |
| Aug. 25, 2006 | 1,790 | 890 | 900 |
| Aug. 25, 2006 | 1,500 | 500 | 1,000 |
| Aug. 25, 2006 | 1,900 | 750 | 1,150 |
| Aug. 25, 2006 | 1,900 | 800 | 1,100 |
| Aug. 26, 2006 | 2,000 | 1,125 | 875 |
| Aug. 26, 2006 | 1,625 | 750 | 875 |
| Aug. 26, 2006 | 1,750 | 780 | 970 |
| Aug. 26, 2006 | 1,290 | 390 | 900 |
| Aug. 26, 2006 | 1,750 | 790 | 960 |
| Aug. 26, 2006 | 1,390 | 530 | 860 |
| Aug. 26, 2006 | 1,050 | 1,125 | 925 |
| Aug. 27, 2006 | 2,300 | 1,375 | 925 |
| Aug. 27, 2006 | 1,750 | 875 | 875 |
| Aug. 27, 2006 | 1,290 | 390 | 900 |
| Aug. 27, 2006 | 1,750 | 750 | 1,000 |
| Aug. 27, 2006 | 1,750 | 750 | 1,060 |
| Aug. 27, 2006 | 1,750 | 625 | 1,125 |
| Aug. 27, 2006 | 220 | 1,625 | 445 |
| Aug. 28, 2006 | 1,750 | 790 | 960 |
| Aug. 28, 2006 | 1,890 | 790 | 990 |
| Aug. 28, 2006 | 1,790 | 875 | 915 |
| Aug. 28, 2006 | 1,750 | 750 | 1,000 |
| Aug. 28, 2006 | 1,625 | 875 | 750 |
| Aug. 28, 2006 | 1,900 | 750 | 1,150 |
| Aug. 28, 2006 | 1,500 | 750 | 750 |
| Aug. 28, 2006 | 1,750 | 1,375 | 375 |
| Aug. 29, 2006 | 1,750 | 790 | 960 |
| Aug. 29, 2006 | 1,625 | 750 | 875 |
| Aug. 29, 2006 | 1,625 | 640 | 985 |
| Aug. 29, 2006 | 1,690 | 625 | 1,065 |
| Aug. 29, 2006 | 1,625 | 625 | 1,000 |
| Aug. 29, 2006 | 1,625 | 750 | 900 |
| Aug. 30, 2006 | 1,500 | 790 | 710 |
| Aug. 30, 2006 | 1,500 | 750 | 750 |
| Aug. 30, 2006 | 1,520 | 530 | 990 |
| Aug. 30, 2006 | 1,500 | 750 | 750 |
| Aug. 30, 2006 | 1,625 | 750 | 875 |
| Aug. 30, 2006 | 1,500 | 680 | 820 |
| Aug. 30, 2006 | 1,625 | 750 | 875 |
| Aug. 30, 2006 | 1,625 | 1,000 | 625 |
| Aug. 31, 2006 | 2,000 | 1,000 | 1,000 |
| Aug. 31, 2006 | 1,500 | 750 | 750 |
| Aug. 31, 2006 | 1,500 | 500 | 1,000 |
| Aug. 31, 2006 | 1,625 | 625 | 1,000 |
| Aug. 31, 2006 | 1,625 | 630 | 995 |
| Aug. 31, 2006 | 2,050 | 875 | 1,175 |
| Sep. 01, 2006 | 1,450 | 750 | 700 |
| Sep. 01, 2006 | 1,500 | 500 | 1,000 |
| Sep. 01, 2006 | 1,625 | 625 | 1,000 |
| Sep. 01, 2006 | 1,500 | 625 | 875 |
| Sep. 01, 2006 | 1,550 | 550 | 1,000 |
| Sep. 01, 2006 | 1,500 | 520 | 980 |
| Sep. 01, 2006 | 1,500 | 750 | 750 |
| Sep. 02, 2006 | 1,500 | 875 | 625 |
| Sep. 02, 2006 | 1,375 | 750 | 625 |
| Sep. 02, 2006 | 1,625 | 750 | 875 |
| Sep. 02, 2006 | 1,625 | 750 | 875 |
| Sep. 02, 2006 | 1,500 | 500 | 1,000 |
| Sep. 02, 2006 | 1,625 | 750 | 875 |
| Sep. 02, 2006 | 1,500 | 625 | 875 |
| Sep. 02, 2006 | 1,500 | 1,375 | 125 |
| Sep. 03, 2006 | 1,625 | 1,500 | 625 |
| Sep. 03, 2006 | 1,750 | 625 | 1,125 |
| Sep. 03, 2006 | 1,690 | 790 | 900 |
| Sep. 03, 2006 | 1,625 | 750 | 875 |
| Sep. 03, 2006 | 1,750 | 875 | 875 |
| Sep. 03, 2006 | 1,750 | 650 | 1,100 |
| Sep. 03, 2006 | 2,625 | 2,000 | 625 |
| Sep. 04, 2006 | 1,750 | 1,000 | 750 |
| Sep. 04, 2006 | 1,750 | 750 | 1,000 |
| Sep. 04, 2006 | 1,625 | 640 | 985 |
| Sep. 04, 2006 | 1,625 | 625 | 1,000 |
| Sep. 04, 2006 | 1,750 | 795 | 955 |
| Sep. 04, 2006 | 1,625 | 800 | 825 |
| Sep. 04, 2006 | 1,625 | 1,250 | 525 |
| Sep. 06, 2006 | 1,750 | 1,000 | 750 |
| Sep. 06, 2006 | 1,750 | 1,000 | 750 |
| Sep. 06, 2006 | 1,900 | 1,090 | 810 |
| Sep. 06, 2006 | 1,625 | 875 | 750 |
| Sep. 06, 2006 | 1,500 | 750 | 750 |
| Sep. 06, 2006 | 1,625 | 625 | 1,000 |
| Sep. 06, 2006 | 1,750 | 875 | 875 |
| Sep. 06, 2006 | 2,371 | 1,375 | 1,000 |
| Sep. 07, 2006 | 2,000 | 1,300 | 700 |
| Sep. 07, 2006 | 2,000 | 1,375 | 625 |
| Sep. 07, 2006 | 1,750 | 875 | 875 |
| Sep. 07, 2006 | 1,625 | 875 | 750 |
| Sep. 07, 2006 | 1,375 | 625 | 750 |
| Sep. 07, 2006 | 1,500 | 625 | 875 |
| Sep. 07, 2006 | 1,500 | 625 | 875 |
| Sep. 07, 2006 | 2,375 | 1,500 | 875 |
| Sep. 08, 2006 | 2,375 | 1,900 | 475 |
| Sep. 08, 2006 | 1,750 | 1,125 | 625 |
| Sep. 08, 2006 | 1,500 | 1,000 | 500 |
| Sep. 08, 2006 | 1,750 | 1,000 | 750 |

TABLE 3-continued

| Date | Total Volume of Water from the Irrigation Line (ml) | Total Volume of Excess Water drained from the Plant Container (ml) | Total Volume of Water Consumed (ml) |
|---|---|---|---|
| Sep. 08, 2006 | 1,500 | 750 | 750 |
| Sep. 08, 2006 | 1,750 | 1,000 | 750 |
| Sep. 08, 2006 | 1,750 | 875 | 875 |
| Sep. 08, 2006 | 1,750 | 1,000 | 750 |
| Sep. 08, 2006 | 1,625 | 1,250 | 425 |
| Sep. 09, 2006 | 1,750 | 1,125 | 625 |
| Sep. 09, 2006 | 1,625 | 1,000 | 625 |
| Sep. 09, 2006 | 1,825 | 1,125 | 700 |
| Sep. 09, 2006 | 1,625 | 900 | 725 |
| Sep. 09, 2006 | 1,625 | 875 | 750 |
| Sep. 09, 2006 | 1,600 | 1,375 | 225 |
| Sep. 10, 2006 | 1,400 | 500 | 900 |
| Sep. 10, 2006 | 1,400 | 530 | 870 |
| Sep. 10, 2006 | 1,375 | 250 | 1,125 |
| Sep. 10, 2006 | 1,250 | 375 | 875 |
| Sep. 10, 2006 | 1,250 | 500 | 750 |
| Sep. 11, 2006 | 1,375 | 400 | 975 |
| Sep. 11, 2006 | 1,750 | 750 | 1,000 |
| Sep. 11, 2006 | 1,250 | 375 | 875 |
| Sep. 11, 2006 | 1,375 | 500 | 875 |
| Sep. 11, 2006 | 1,300 | 250 | 1,050 |
| Sep. 11, 2006 | 1,250 | 875 | 375 |
| Sep. 12, 2006 | 1,500 | 375 | 1,125 |
| Sep. 12, 2006 | 1,500 | 500 | 1,000 |
| Sep. 12, 2006 | 1,375 | 500 | 875 |
| Sep. 12, 2006 | 2,500 | 1,375 | 1,125 |
| Sep. 12, 2006 | 1,275 | 375 | 900 |
| Sep. 12, 2006 | 1,375 | 625 | 750 |
| Sep. 13, 2006 | 1,375 | 250 | 1,125 |
| Sep. 13, 2006 | 1,500 | 375 | 1,125 |
| Sep. 13, 2006 | 1,375 | 375 | 1,000 |
| Sep. 13, 2006 | 1,375 | 390 | 985 |
| Sep. 13, 2006 | 1,290 | 390 | 900 |
| Sep. 13, 2006 | 1,375 | 625 | 750 |
| Sep. 14, 2006 | 1,500 | 375 | 1,125 |
| Sep. 14, 2006 | 1,500 | 390 | 1,110 |
| Sep. 14, 2006 | 1,500 | 375 | 1,125 |
| Sep. 14, 2006 | 1,500 | 375 | 1,125 |
| Sep. 14, 2006 | 1,375 | 250 | 1,125 |
| Sep. 14, 2006 | 1,375 | 625 | 750 |
| Sep. 15, 2006 | 1,900 | 875 | 1,025 |
| Sep. 15, 2006 | 1,500 | 625 | 875 |
| Sep. 15, 2006 | 1,500 | 590 | 910 |
| Sep. 15, 2006 | 1,625 | 350 | 1,275 |
| Sep. 16, 2006 | 1,750 | 780 | 970 |
| Sep. 16, 2006 | 1,375 | 100 | 1,275 |
| Sep. 16, 2006 | 1,750 | 375 | 1,375 |
| Sep. 17, 2006 | 1,500 | 200 | 1,300 |
| Sep. 17, 2006 | 1,375 | 375 | 1,000 |
| Sep. 17, 2006 | 1,500 | 125 | 1,375 |
| Sep. 18, 2006 | 1,750 | 375 | 1,375 |
| Sep. 18, 2006 | 1,500 | 250 | 1,250 |
| Sep. 18, 2006 | 1,500 | 125 | 1,375 |
| Sep. 19, 2006 | 1,750 | 375 | 1,375 |
| Sep. 19, 2006 | 1,700 | 250 | 1,500 |
| Sep. 19, 2006 | 1,625 | 375 | 1,250 |
| Sep. 19, 2006 | 1,900 | 375 | 1,525 |
| Sep. 20, 2006 | 1,750 | 500 | 1,250 |
| Sep. 20, 2006 | 1,625 | 390 | 1,250 |
| Sep. 20, 2006 | 1,500 | 75 | 1,425 |
| Sep. 21, 2006 | 1,750 | 375 | 1,375 |
| Sep. 21, 2006 | 1,375 | 100 | 1,275 |
| Sep. 21, 2006 | 1,750 | 375 | 1,375 |
| Sep. 21, 2006 | 1,500 | 125 | 1,375 |
| Sep. 22, 2006 | 1,750 | 375 | 1,375 |
| Sep. 22, 2006 | 1,750 | 375 | 1,375 |
| Sep. 22, 2006 | 1,750 | 375 | 1,375 |
| Sep. 23, 2006 | 1,900 | 1,000 | 900 |
| Sep. 23, 2006 | 2,250 | 500 | 1,750 |
| Sep. 23, 2006 | 2,000 | 625 | 1,475 |
| Sep. 24, 2006 | 2,500 | 1,700 | 800 |
| Sep. 24, 2006 | 2,050 | 650 | 1,400 |
| Sep. 24, 2006 | 2,250 | 625 | 1,625 |
| Sep. 24, 2006 | 1,500 | 375 | 1,125 |
| Sep. 25, 2006 | 1,250 | 125 | 1,125 |
| Sep. 25, 2006 | 1,250 | 100 | 1,150 |
| Sep. 25, 2006 | 1,550 | 150 | 1,400 |
| Sep. 25, 2006 | 1,900 | 625 | 1,275 |
| Sep. 26, 2006 | 1,625 | 500 | 1,125 |
| Sep. 26, 2006 | 1,625 | 500 | 1,125 |
| Sep. 26, 2006 | 1,750 | 450 | 1,300 |
| Sep. 26, 2006 | 1,625 | 375 | 1,250 |
| Sep. 26, 2006 | 1,625 | 380 | 1,245 |
| Sep. 26, 2006 | 1,625 | 500 | 1,125 |
| Sep. 26, 2006 | 1,600 | 425 | 1,175 |
| Sep. 26, 2006 | 1,600 | 1,100 | 300 |
| Sep. 27, 2006 | 1,250 | 500 | 750 |
| Sep. 27, 2006 | 1,250 | 250 | 1,000 |
| Sep. 27, 2006 | 1,375 | 375 | 1,000 |
| Sep. 27, 2006 | 1,375 | 375 | 1,000 |
| Sep. 27, 2006 | 1,250 | 375 | 875 |
| Sep. 29, 2006 | 1,375 | 250 | 1,125 |
| Sep. 29, 2006 | 1,375 | 375 | 1,000 |
| Sep. 29, 2006 | 1,375 | 250 | 1,125 |
| Sep. 29, 2006 | 1,250 | 375 | 875 |
| Sep. 30, 2006 | 1,375 | 300 | 1,075 |
| Sep. 30, 2006 | 1,625 | 500 | 1,125 |
| Sep. 30, 2006 | 1,625 | 625 | 1,000 |

As can be seen in Table 3, the volume of water consumed was measured each day and from day to day over a four-month growing period. For example, on May 25, 2006 the volume of water sent to the plant from the first irrigation event was 2,500 ml and the excess water drained from the plant container was measured at 1,250 ml, therefore the total volume of water consumed was 1,250 ml. In another example, in the first irrigation event on Jul. 1, 2006, 1,250 ml of water was measured from the irrigation line with 450 ml of excess water being measured draining from the plant container, therefore the total volume of water consumed was 800 ml. An additional example from the first irrigation on Aug. 1, 2006 shows that 1,625 ml of water was measured from the irrigation line and 1,125 ml of water was measured draining from the plant container, therefore the total volume of water consumed was 500 ml.

Table 3 also shows that the total volume of water consumed by the plant varied throughout the growing season. For example from Jun. 4, 2006 to Jun. 8, 2006 the total volume of water consumed varied between 2,775 ml to 4,900 ml whereas from Jul. 1, 2006 to Jul. 5, 2006 the total volume of water consumed varied between 5925 ml to 8000 ml. Additionally, from Aug. 1, 2006 to Aug. 6, 2006 the total volume of water consumed varied between 5,125 ml to 5,375 ml, whereas from Sep. 1, 2006 to Sep. 4, 2006 the total volume of water consumed varied between 5,875 ml to 6,305 ml.

Figure 6:
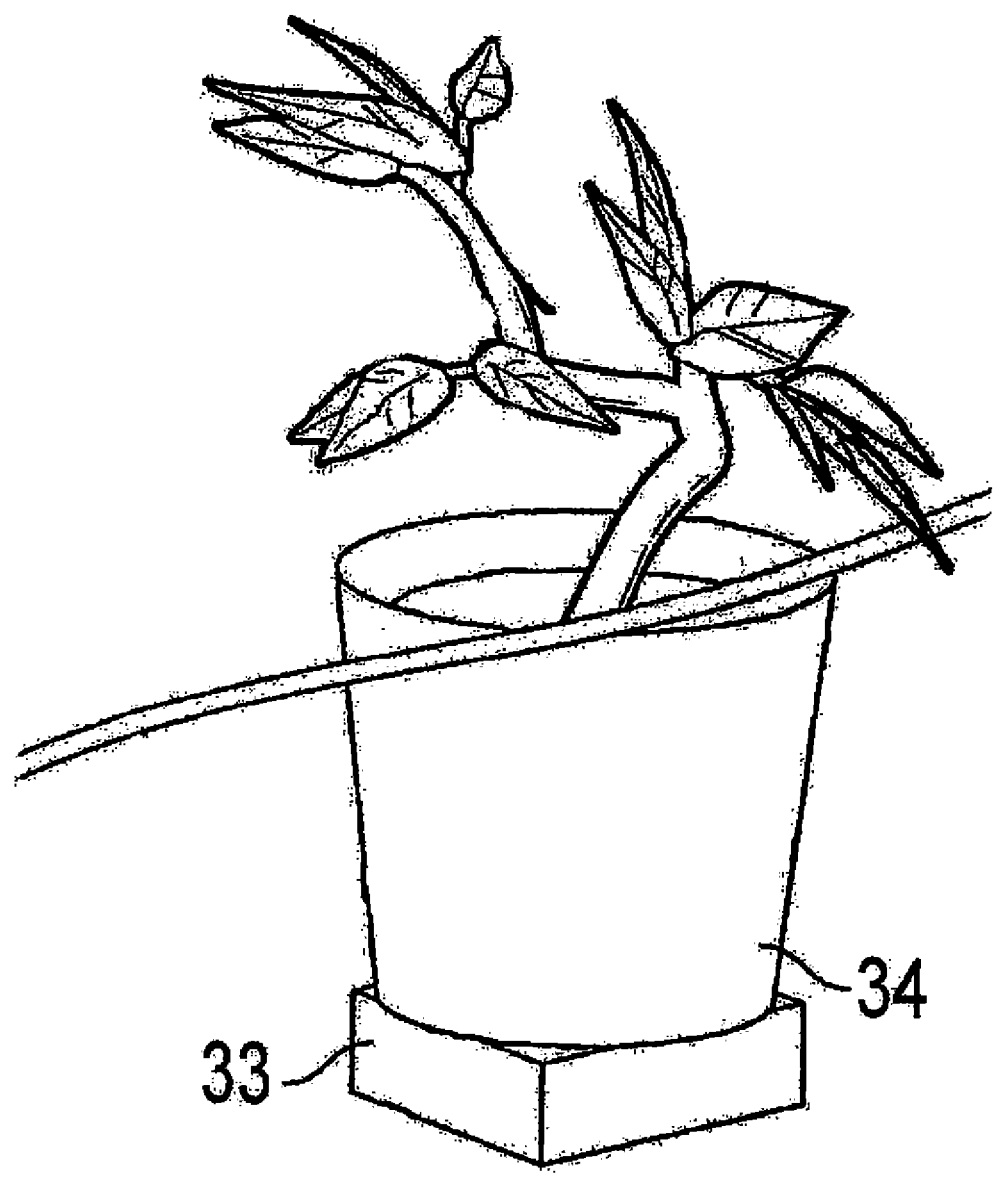
FIG. 6 shows a diagram depicting a plant in a plant container situated on a weighing scale where the weight of the plant container, including the plant, soil and water together, is continuously measured.

Next, the real-time measurement of the amount of water that was available to the plant was measured. To obtain the real-time measurement of water available to the plant, a scale (Rice Lake IQ 355 Digital Weight Indicator with a 4-20 mA analog output), as shown in FIG. 1, part 4, and FIG. 6, part 33 was placed under a plant container, FIG. 6, part 34. The scale provided the real-time mass of the water available to the plant by first weighing the container, the plant and water together. The weight was recorded just prior to the next watering event and served as a basis of comparison for subsequent readings. From that point forward, the sensor calculated weight readings of the water continuously available or uninterrupted, and not the plant container system.

Table 4 shows the overall mass of the plant and container as weighed over several hours. The changing weight of the plant and container system over time can be seen as a function of water being used by the plant and added during irrigation. Column 1 of Table 4 shows the date the weight of the plant container was taken, column 2 shows the weight of the plant and its container in kilograms.

TABLE 4

| Time | Weight of Plant and Container (Kg) |
| --- | --- |
| Feb. 26, 2007 7:36 AM | 46.04 |
| Feb. 26, 2007 7:43 AM | 46.09 |
| Feb. 26, 2007 7:50 AM | 46.05 |
| Feb. 26, 2007 7:57 AM | 46.04 |
| Feb. 26, 2007 8:04 AM | 46.06 |
| Feb. 26, 2007 8:11 AM | 46.15 |
| Feb. 26, 2007 8:18 AM | 46.2 |
| Feb. 26, 2007 8:25 AM | 46.21 |
| Feb. 26, 2007 8:32 AM | 46.15 |
| Feb. 26, 2007 8:39 AM | 46.2 |
| Feb. 26, 2007 8:49 AM | 46.09 |
| Feb. 26, 2007 8:56 AM | 45.95 |
| Feb. 26, 2007 9:03 AM | 45.91 |
| Feb. 26, 2007 9:10 AM | 45.87 |
| Feb. 26, 2007 9:17 AM | 45.7 |
| Feb. 26, 2007 9:24 AM | 45.7 |
| Feb. 26, 2007 9:31 AM | 45.75 |
| Feb. 26, 2007 9:38 AM | 45.71 |
| Feb. 26, 2007 9:45 AM | 45.65 |
| Feb. 26, 2007 9:52 AM | 46.11 |
| Feb. 26, 2007 9:59 AM | 46.66 |
| Feb. 26, 2007 10:06 AM | 47.94 |
| Feb. 26, 2007 10:13 AM | 48.49 |
| Feb. 26, 2007 10:20 AM | 49.07 |
| Feb. 26, 2007 10:27 AM | 48.86 |
| Feb. 26, 2007 10:34 AM | 48.83 |
| Feb. 26, 2007 10:41 AM | 48.78 |
| Feb. 26, 2007 10:48 AM | 49.13 |
| Feb. 26, 2007 10:55 AM | 49.03 |

Figure 8:
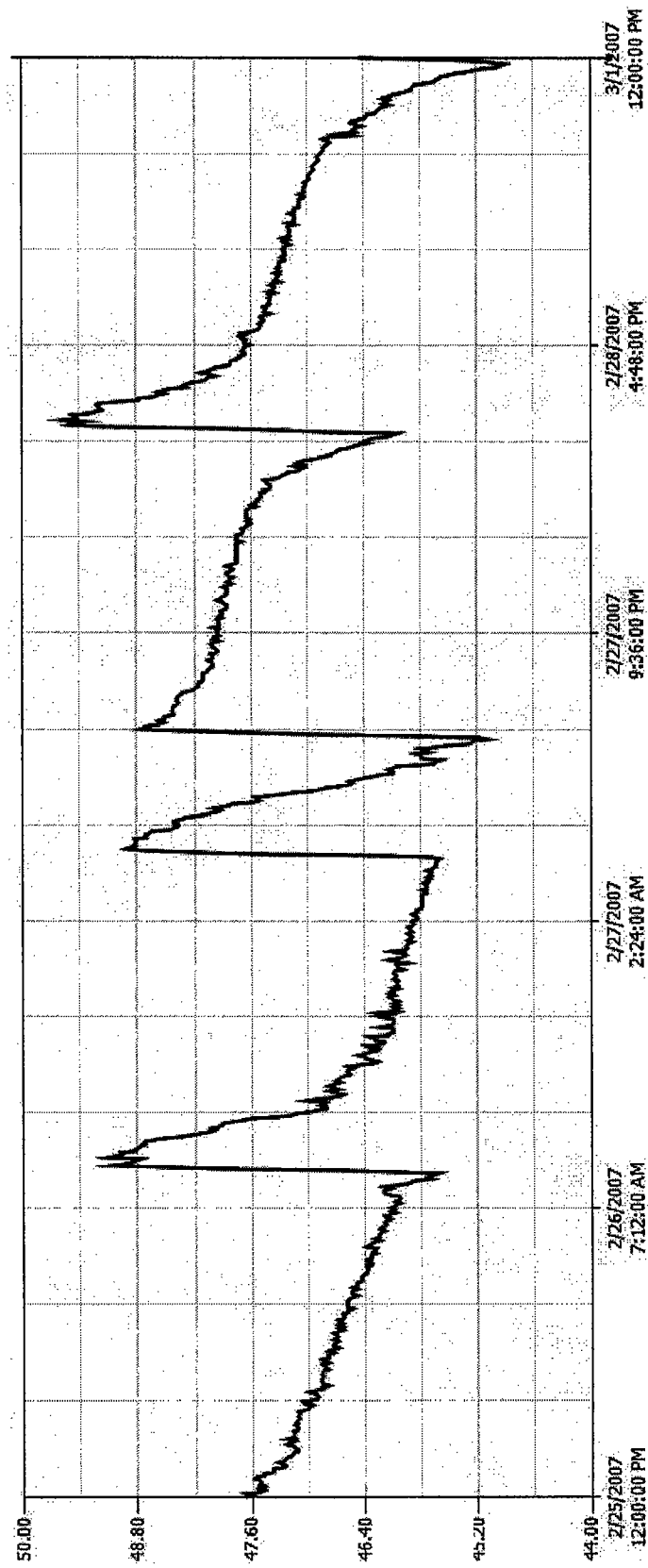
FIG. 8 shows a graph of continuous data from the weight scale over several days.

As can be seen in both Table 4 and FIG. 8, the real time mass of the plant and container can be measured on a continuous basis. The changing weight of the plant as well as the increased weight of the plant and container system can be seen as a function of the water available to the plant roots in the container. For example the weight of the plant container system slowly dropped on the morning of Feb. 26, 2007 as water was taken up by the plant. However, when the declining mass reached a predetermined level, an irrigation event was initiated after the 9:45 AM measurement when approximately 3.5 kg of water was added to plant's container.

Figure 7:
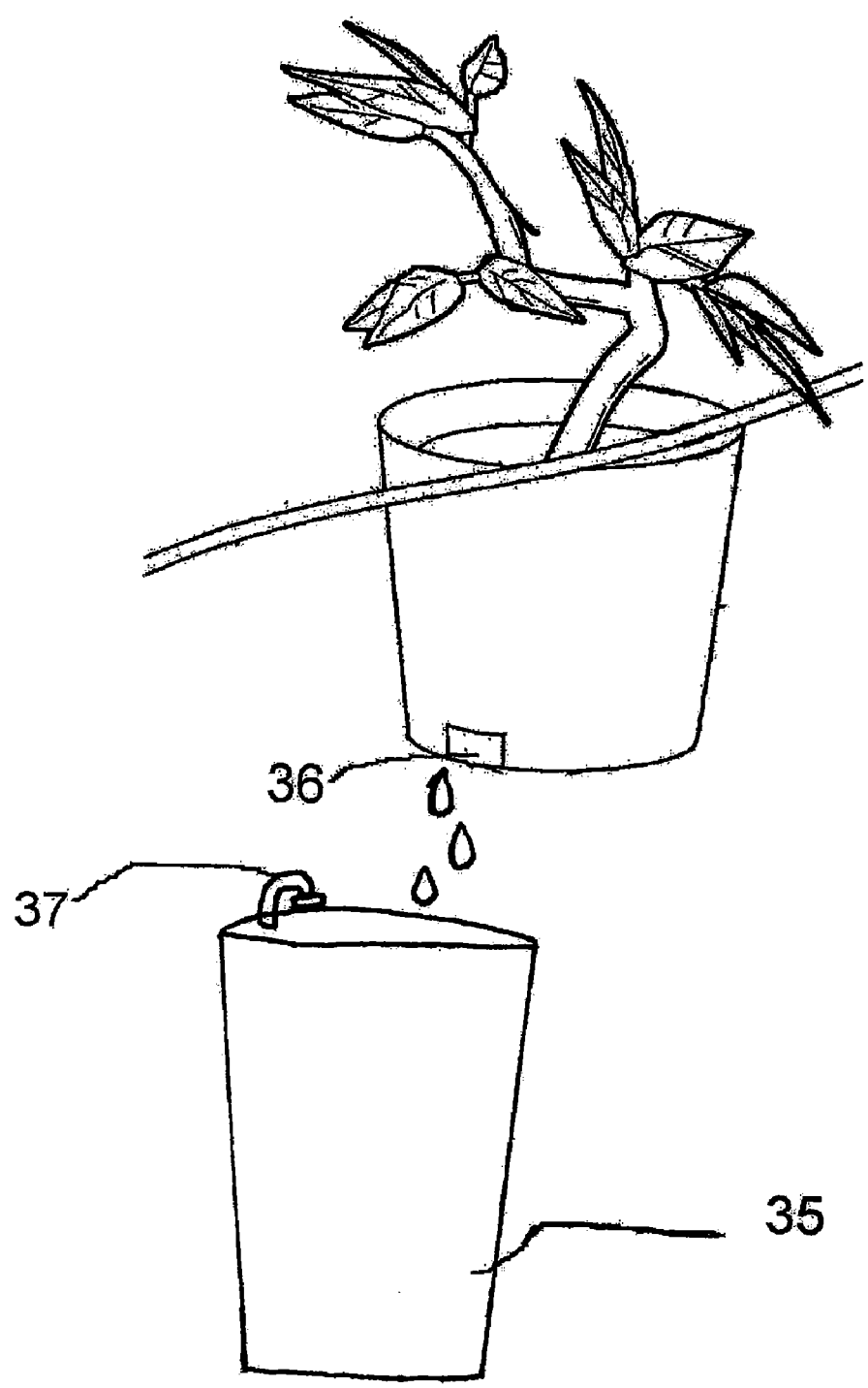
FIG. 7 shows a diagram depicting a plant in a plant container elevated above a collection container where excess water draining from the plant contained is collected in order for the chemical content of the excess water to be measured by a chemical sensor.

In order to accurately determine the amount of nutrients required by a plant, the amount of nutrients distributed in the irrigation water that were not taken up by the plant needed to be determined. To measure the nutrients another container, a collection container for receiving excess water from the plant container, was placed under a plant container, as can be seen in FIG. 7, part 35. The collection container, FIG. 1, part 5 under the plant container, FIG. 7, part 36 from the plant which allowed sensor, FIG. 7, part 37, to be placed in the collected water to measure the chemical content of the excess water. These sensors included 31 Series or 35 Series—sealed polycarbonate pH electrode, 02 Series—epoxy body conductivity electrode, or 35 Series—ion selective electrodes (Analytical Sensors and Instruments, LTD) which measure levels of ammonium, calcium, cupric, nitrate, nitrite, potassium, sulphide. Alternatively, the chemical content could also be determined through standard laboratory test procedures and entered into a computer manually.

Table 5 shows the data from chemical content sensors placed in the excess water from the plant container. Plants are extremely sensitive to both the pH and electroconductivity (EC) levels in the soil. Soil pH levels can easily be manipulated up or down by changing the acidic level of the irrigation water. Electroconductivity, however, is directly related to the amount of residual salts in the soil. The only way to remove the excess chemical content from the media in the container is to flush the soil with water. Consequently, high EC levels serve as the trigger to initiate subsequent leaching events. The date and time of the various irrigation events are also shown in table 5. Column 1 shows the date, column 2 shows the pH of the water measured from the irrigation line, column 3 shows the electroconductivity (EC) of the water measured from the irrigation line, column 4 shows the pH of the excess water drained from the plant container and column 5 shows the electroconductivity (EC) of the excess water drained from the plant container.

TABLE 5

| Date | pH of Water from Irrigation Line | EC of Water from Irrigation Line | pH of Excess Water from Plant Container | EC of Excess Water from Plant Container |
| --- | --- | --- | --- | --- |
| May 25, 2006 | 6.2 | 1070 | 4.9 | 1350 |
| May 25, 2006 | 6.2 | 1140 | 4.8 | 1460 |
| May 26, 2006 | 6.4 | 1030 | 4.9 | 1390 |
| May 26, 2006 | 6.4 | 1150 | 5.3 | 1340 |
| May 26, 2006 | 6.4 | 1150 | 5.3 | 1410 |
| May 27, 2006 | 6.4 | 1000 | 5.9 | 1320 |
| May 27, 2006 | 6.4 | 1110 | 5.0 | 1460 |
| May 28, 2006 | 6.4 | 1070 | 5.6 | 1460 |
| May 28, 2006 | 6.4 | 1120 | 5.1 | 1570 |
| May 28, 2006 | 6.4 | 1090 | 4.9 | 1660 |
| May 29, 2006 | 6.4 | 1330 | 5.0 | 1360 |
| May 29, 2006 | 6.4 | 1140 | 5.5 | 1660 |
| May 29, 2006 | 6.4 | 1320 | 4.6 | 1680 |
| May 30, 2006 | 6.4 | 1240 | 4.9 | 1690 |
| May 30, 2006 | 5.9 | 1360 | 4.6 | 1800 |
| May 30, 2006 | 6.3 | 1330 | 4.8 | 1840 |
| May 31, 2006 | 6.4 | 1300 | 4.4 | 1680 |
| May 31, 2006 | 6.5 | 1330 | 4.3 | 2100 |
| Jun. 02, 2006 | 6.2 | 1380 | 4.4 | 2150 |
| Jun. 04, 2006 | 6.7 | 1390 | 4.3 | 2275 |
| Jun. 04, 2006 | 4.9 | 1470 | 4.1 | 2450 |
| Jun. 04, 2006 | 6.5 | 1360 | 4.2 | 2510 |
| Jun. 05, 2006 | 6.2 | 1510 | 4.3 | 2100 |
| Jun. 05, 2006 | 6.7 | 1560 | 6.5 | 1470 |
| Jun. 05, 2006 | 7.0 | 1200 | 4.7 | 1740 |
| Jun. 06, 2006 | 7.1 | 1030 | 6.3 | 1930 |
| Jun. 06, 2006 | 6.6 | 1480 | 6.4 | 1660 |
| Jun. 06, 2006 | 6.9 | 1450 | 6.3 | 1660 |
| Jun. 06, 2006 | 7.0 | 1340 | 5.9 | 1790 |
| Jun. 07, 2006 | 6.9 | 1310 | 5.8 | 1980 |
| Jun. 07, 2006 | 6.6 | 1480 | 6.0 | 1700 |
| Jun. 07, 2006 | 6.6 | 1460 | 6.4 | 1720 |
| Jun. 07, 2006 | 6.7 | 1240 | 6.1 | 1040 |
| Jun. 08, 2006 | 6.8 | 1200 | 5.4 | 1730 |
| Jun. 08, 2006 | 6.5 | 1440 | 5.5 | 1800 |
| Jun. 08, 2006 | 6.5 | 1420 | 6.0 | 1700 |
| Jun. 08, 2006 | 6.8 | 1360 | 5.6 | 1760 |
| Jun. 09, 2006 | 6.8 | 1300 | 4.7 | 2040 |
| Jun. 09, 2006 | 6.4 | 1550 | 4.7 | 1890 |
| Jun. 09, 2006 | 6.3 | 1510 | 5.6 | 1410 |
| Jun. 09, 2006 | 6.4 | 1390 | 4.8 | 1550 |
| Jun. 10, 2006 | 6.6 | 1000 | 4.6 | 1950 |
| Jun. 10, 2006 | 6.4 | 1400 | 4.5 | 1990 |
| Jun. 10, 2006 | 6.5 | 1560 | 4.4 | 2080 |
| Jun. 11, 2006 | 6.5 | 1570 | 4.9 | 2100 |
| Jun. 11, 2006 | 6.1 | 1680 | 4.8 | 1550 |
| Jun. 11, 2006 | 6.5 | 1710 | 5.1 | 1510 |
| Jun. 11, 2006 | 6.4 | 1490 | 4.6 | 1590 |
| Jun. 12, 2006 | 6.6 | 1070 | 4.5 | 1640 |
| Jun. 12, 2006 | 6.8 | 1460 | 4.7 | 1610 |

TABLE 5-continued

| Date | pH of Water from Irrigation Line | EC of Water from Irrigation Line | pH of Excess Water from Plant Container | EC of Excess Water from Plant Container |
|---|---|---|---|---|
| Jun. 12, 2006 | 6.4 | 1170 | 4.6 | 1470 |
| Jun. 12, 2006 | 7.1 | 1150 | 4.6 | 1510 |
| Jun. 12, 2006 | 6.5 | 1140 | 4.3 | 1570 |
| Jun. 13, 2006 | 6.3 | 1330 | 4.6 | 1650 |
| Jun. 13, 2006 | 6.5 | 1380 | 4.7 | 1760 |
| Jun. 13, 2006 | 6.6 | 1390 | 4.4 | 1710 |
| Jun. 13, 2006 | 6.7 | 1310 | 4.2 | 1690 |
| Jun. 14, 2006 | 6.6 | 1330 | 4.2 | 1720 |
| Jun. 14, 2006 | 6.3 | 1430 | 4.4 | 1900 |
| Jun. 14, 2006 | 6.4 | 1370 | 4.1 | 2280 |
| Jun. 14, 2006 | 6.3 | 830 | 4.3 | 1920 |
| Jun. 15, 2006 | 6.0 | 1430 | 4.3 | 2040 |
| Jun. 15, 2006 | 6.4 | 1580 | 4.2 | 1900 |
| Jun. 15, 2006 | 6.7 | 1520 | 4.4 | 1780 |
| Jun. 15, 2006 | 6.9 | 1350 | 4.2 | 1710 |
| Jun. 16, 2006 | 6.5 | 1240 | 4.1 | 1800 |
| Jun. 16, 2006 | 6.5 | 1260 | 4.0 | 2000 |
| Jun. 16, 2006 | 6.4 | 1510 | 4.4 | 1910 |
| Jun. 16, 2006 | 7.0 | 1510 | 4.2 | 1660 |
| Jun. 16, 2006 | 7.2 | 1180 | 4.2 | 1790 |
| Jun. 17, 2006 | 6.9 | 1110 | 3.9 | 1960 |
| Jun. 17, 2006 | 6.3 | 1400 | 4.1 | 1980 |
| Jun. 17, 2006 | 6.4 | 1670 | 4.2 | 2000 |
| Jun. 17, 2006 | 7.0 | 1600 | 4.2 | 1880 |
| Jun. 17, 2006 | 6.4 | 1420 | 4.1 | 1830 |
| Jun. 18, 2006 | 7.1 | 1280 | 4.3 | 1810 |
| Jun. 18, 2006 | 7.2 | 1210 | 4.2 | 1850 |
| Jun. 18, 2006 | 6.6 | 1200 | 4.4 | 1740 |
| Jun. 18, 2006 | 6.4 | 1240 | 4.3 | 1820 |
| Jun. 18, 2006 | 6.5 | 1210 | 4.2 | 1750 |
| Jun. 19, 2006 | 6.4 | 1270 | 5.8 | 1810 |
| Jun. 19, 2006 | 6.2 | 1460 | 5.0 | 1870 |
| Jun. 19, 2006 | 6.7 | 1360 | 4.3 | 1870 |
| Jun. 19, 2006 | 7.0 | 1440 | 4.4 | 1710 |
| Jun. 19, 2006 | 6.4 | 1490 | 4.2 | 1790 |
| Jun. 20, 2006 | 6.3 | 1430 | 4.9 | 1910 |
| Jun. 20, 2006 | 6.2 | 1460 | 4.2 | 2080 |
| Jun. 20, 2006 | 6.9 | 1400 | 4.1 | 2020 |
| Jun. 20, 2006 | 6.8 | 1680 | 4.1 | 2040 |
| Jun. 20, 2006 | 6.5 | 1640 | 4.2 | 2080 |
| Jun. 21, 2006 | 7.1 | 1470 | 3.8 | 2200 |
| Jun. 21, 2006 | 6.2 | 1610 | 3.7 | 2260 |
| Jun. 21, 2006 | 6.9 | 1530 | 4.2 | 1950 |
| Jun. 21, 2006 | 7.0 | 1260 | 4.2 | 1630 |
| Jun. 21, 2006 | 7.2 | 1400 | 4.2 | 1630 |
| Jun. 22, 2006 | 6.3 | 1120 | 4.0 | 1610 |
| Jun. 22, 2006 | 6.6 | 1200 | 4.0 | 1700 |
| Jun. 22, 2006 | 6.2 | 1130 | 4.1 | 1760 |
| Jun. 22, 2006 | 6.3 | 1280 | 4.4 | 1470 |
| Jun. 22, 2006 | 6.7 | 1300 | 4.0 | 1560 |
| Jun. 23, 2006 | 6.5 | 1120 | 3.9 | 1590 |
| Jun. 23, 2006 | 6.2 | 1200 | 3.9 | 1680 |
| Jun. 23, 2006 | 6.3 | 1160 | 4.0 | 1770 |
| Jun. 23, 2006 | 6.4 | 1300 | 4.2 | 1490 |
| Jun. 23, 2006 | 6.3 | 1250 | 4.3 | 1340 |
| Jun. 24, 2006 | 6.3 | 1000 | 4.0 | 1400 |
| Jun. 24, 2006 | 6.1 | 1010 | 4.0 | 1410 |
| Jun. 24, 2006 | 6.1 | 1050 | 3.8 | 1520 |
| Jun. 24, 2006 | 6.0 | 1130 | 4.4 | 1300 |
| Jun. 24, 2006 | 6.1 | 1050 | 4.1 | 1230 |
| Jun. 25, 2006 | 6.5 | 900 | 4.4 | 1170 |
| Jun. 25, 2006 | 6.0 | 920 | 3.9 | 1250 |
| Jun. 25, 2006 | 6.2 | 990 | 4.0 | 1300 |
| Jun. 25, 2006 | 6.1 | 970 | 4.4 | 1010 |
| Jun. 25, 2006 | 6.4 | 890 | 4.5 | 990 |
| Jun. 26, 2006 | 6.4 | 1010 | 4.5 | 1130 |
| Jun. 26, 2006 | 6.4 | 1000 | 3.9 | 1240 |
| Jun. 26, 2006 | 6.3 | 1060 | 4.2 | 1250 |
| Jun. 26, 2006 | 6.4 | 990 | 4.9 | 1140 |
| Jun. 26, 2006 | 6.2 | 900 | 5.2 | 1020 |
| Jun. 27, 2006 | 6.8 | 740 | 4.4 | 1160 |
| Jun. 27, 2006 | 6.5 | 770 | 4.2 | 1260 |
| Jun. 27, 2006 | 6.4 | 990 | 4.4 | 1360 |
| Jun. 27, 2006 | 6.7 | 960 | 5.1 | 1460 |
| Jun. 27, 2006 | 6.4 | 1120 | 4.9 | 1510 |
| Jun. 29, 2006 | 6.4 | 880 | 4.2 | 1670 |
| Jun. 29, 2006 | 6.8 | 1110 | 4.4 | 1830 |
| Jun. 29, 2006 | 6.2 | 1020 | 4.4 | 1920 |
| Jun. 29, 2006 | 6.9 | 1040 | 5.0 | 1250 |
| Jun. 29, 2006 | 7.0 | 1000 | 4.7 | 1360 |
| Jun. 30, 2006 | 6.3 | 1060 | 4.5 | 1500 |
| Jun. 30, 2006 | 6.3 | 1080 | 4.9 | 1870 |
| Jun. 30, 2006 | 6.0 | 990 | 5.0 | 1860 |
| Jun. 30, 2006 | 6.7 | 1000 | 4.2 | 1830 |
| Jun. 30, 2006 | 7.1 | 1040 | 4.3 | 1670 |
| Jun. 30, 2006 | 7.1 | 1030 | 5.0 | 1370 |
| Jun. 30, 2006 | 6.8 | 900 | 4.5 | 1470 |
| Jul. 01, 2006 | 6.3 | 940 | 5.0 | 1370 |
| Jul. 01, 2006 | 6.6 | 1100 | 4.5 | 1470 |
| Jul. 01, 2006 | 6.0 | 1030 | 4.7 | 1520 |
| Jul. 01, 2006 | 6.6 | 1120 | 4.6 | 1720 |
| Jul. 01, 2006 | 7.1 | 950 | 4.9 | 1670 |
| Jul. 01, 2006 | 7.1 | 940 | 4.4 | 1760 |
| Jul. 01, 2006 | 6.6 | 870 | 4.5 | 1690 |
| Jul. 02, 2006 | 6.3 | 930 | 5.0 | 1520 |
| Jul. 02, 2006 | 6.3 | 930 | 4.1 | 1520 |
| Jul. 02, 2006 | 6.4 | 870 | 4.2 | 1440 |
| Jul. 02, 2006 | 6.5 | 770 | 4.9 | 1490 |
| Jul. 02, 2006 | 7.1 | 830 | 5.0 | 1360 |
| Jul. 02, 2006 | 6.8 | 960 | 4.5 | 1470 |
| Jul. 02, 2006 | 6.5 | 920 | 5.0 | 1460 |
| Jul. 02, 2006 | 6.5 | 910 | 4.9 | 1520 |
| Jul. 03, 2006 | 6.4 | 950 | 5.4 | 1220 |
| Jul. 03, 2006 | 7.1 | 1060 | 5.4 | 1450 |
| Jul. 03, 2006 | 6.9 | 880 | 4.9 | 1530 |
| Jul. 03, 2006 | 6.9 | 1020 | 4.9 | 1590 |
| Jul. 03, 2006 | 6.8 | 900 | 5.0 | 1660 |
| Jul. 03, 2006 | 7.2 | 940 | 6.8 | 1750 |
| Jul. 03, 2006 | 6.3 | 940 | 5.0 | 1770 |
| Jul. 04, 2006 | 6.1 | 910 | 5.0 | 1380 |
| Jul. 04, 2006 | 6.1 | 950 | 4.6 | 1400 |
| Jul. 04, 2006 | 6.4 | 800 | 4.5 | 1340 |
| Jul. 04, 2006 | 7.1 | 910 | 7.0 | 1470 |
| Jul. 04, 2006 | 6.5 | 970 | 6.0 | 1430 |
| Jul. 04, 2006 | 6.6 | 920 | 4.8 | 1700 |
| Jul. 04, 2006 | 6.6 | 1040 | 5.0 | 1680 |
| Jul. 04, 2006 | 6.4 | 1020 | 5.0 | 1530 |
| Jul. 05, 2006 | 7.1 | 930 | 5.5 | 1230 |
| Jul. 05, 2006 | 7.1 | 1150 | 5.4 | 1410 |
| Jul. 05, 2006 | 6.9 | 960 | 5.0 | 1420 |
| Jul. 05, 2006 | 6.9 | 1040 | 4.8 | 1560 |
| Jul. 05, 2006 | 7.0 | 990 | 4.7 | 1860 |
| Jul. 05, 2006 | 6.7 | 1040 | 4.5 | 1470 |
| Jul. 05, 2006 | 6.7 | 810 | 5.0 | 1630 |
| Jul. 05, 2006 | 6.1 | 850 | 4.7 | 1560 |
| Jul. 06, 2006 | 7.0 | 830 | 5.5 | 1150 |
| Jul. 06, 2006 | 7.1 | 1100 | 5.5 | 1280 |
| Jul. 06, 2006 | 6.8 | 1020 | 5.1 | 1350 |
| Jul. 06, 2006 | 6.8 | 1030 | 4.6 | 1500 |
| Jul. 06, 2006 | 7.1 | 1000 | 4.9 | 1840 |
| Jul. 06, 2006 | 7.0 | 1000 | 5.1 | 1640 |
| Jul. 06, 2006 | 6.7 | 900 | 5.3 | 1490 |
| Jul. 07, 2006 | 6.9 | 1280 | 5.5 | 1240 |
| Jul. 07, 2006 | 7.1 | 1110 | 5.8 | 1420 |
| Jul. 07, 2006 | 6.8 | 930 | 5.1 | 1580 |
| Jul. 07, 2006 | 6.9 | 970 | 4.8 | 1620 |
| Jul. 07, 2006 | 6.7 | 1220 | 4.6 | 1000 |
| Jul. 07, 2006 | 6.7 | 1000 | 4.5 | 1640 |
| Jul. 07, 2006 | 6.6 | 1010 | 5.3 | 1500 |
| Jul. 08, 2006 | 6.7 | 930 | 5.3 | 1510 |
| Jul. 08, 2006 | 6.9 | 1060 | 5.0 | 1760 |
| Jul. 08, 2006 | 6.9 | 860 | 5.4 | 1520 |
| Jul. 08, 2006 | 6.9 | 1070 | 5.2 | 1520 |
| Jul. 08, 2006 | 7.1 | 990 | 5.0 | 1560 |
| Jul. 08, 2006 | 7.0 | 990 | 4.9 | 1590 |
| Jul. 08, 2006 | 7.2 | 990 | 5.2 | 1560 |

TABLE 5-continued

| Date | pH of Water from Irrigation Line | EC of Water from Irrigation Line | pH of Excess Water from Plant Container | EC of Excess Water from Plant Container |
| --- | --- | --- | --- | --- |
| Jul. 08, 2006 | 6.8 | 1060 | 4.8 | 1630 |
| Jul. 09, 2006 | 6.9 | 920 | 5.6 | 1360 |
| Jul. 09, 2006 | 6.9 | 990 | 5.6 | 1430 |
| Jul. 09, 2006 | 6.9 | 1020 | 5.4 | 1440 |
| Jul. 09, 2006 | 6.9 | 1080 | 4.8 | 1520 |
| Jul. 09, 2006 | 7.0 | 1125 | 4.7 | 1720 |
| Jul. 09, 2006 | 6.3 | 1150 | 4.1 | 1800 |
| Jul. 09, 2006 | 6.9 | 1000 | 4.8 | 1820 |
| Jul. 09, 2006 | 6.3 | 1000 | 5.0 | 1830 |
| Jul. 10, 2006 | 6.6 | 960 | 4.9 | 1500 |
| Jul. 10, 2006 | 6.7 | 1120 | 4.8 | 1610 |
| Jul. 10, 2006 | 6.6 | 1130 | 4.8 | 1670 |
| Jul. 10, 2006 | 6.7 | 1140 | 4.6 | 1840 |
| Jul. 10, 2006 | 6.6 | 1090 | 4.4 | 2020 |
| Jul. 10, 2006 | 6.4 | 1250 | 4.3 | 2000 |
| Jul. 10, 2006 | 6.2 | 920 | 4.2 | 2020 |
| Jul. 10, 2006 | 6.5 | 900 | 5.6 | 1790 |
| Jul. 11, 2006 | 6.6 | 1040 | 5.1 | 1640 |
| Jul. 11, 2006 | 6.6 | 1120 | 5.1 | 1730 |
| Jul. 11, 2006 | 6.7 | 1020 | 4.6 | 1760 |
| Jul. 11, 2006 | 6.8 | 990 | 4.6 | 1790 |
| Jul. 11, 2006 | 6.8 | 1030 | 4.4 | 1950 |
| Jul. 11, 2006 | 6.6 | 970 | 4.3 | 2020 |
| Jul. 11, 2006 | 6.8 | 540 | 4.9 | 1850 |
| Jul. 12, 2006 | 6.8 | 640 | 5.1 | 1430 |
| Jul. 12, 2006 | 6.7 | 720 | 5.6 | 1340 |
| Jul. 12, 2006 | 6.8 | 1000 | 5.1 | 1300 |
| Jul. 12, 2006 | 6.8 | 900 | 4.6 | 1580 |
| Jul. 12, 2006 | 6.9 | 1140 | 4.3 | 1660 |
| Jul. 12, 2006 | 6.3 | 1150 | 4.6 | 1650 |
| Jul. 12, 2006 | 6.9 | 830 | 5.1 | 1680 |
| Jul. 13, 2006 | 6.6 | 930 | 5.0 | 1460 |
| Jul. 13, 2006 | 6.6 | 950 | 5.1 | 1480 |
| Jul. 13, 2006 | 6.7 | 610 | 4.8 | 1500 |
| Jul. 13, 2006 | 6.9 | 1730 | 5.1 | 1670 |
| Jul. 13, 2006 | 6.2 | 1150 | 4.4 | 1620 |
| Jul. 13, 2006 | 6.2 | 1180 | 4.9 | 1680 |
| Jul. 14, 2006 | 6.8 | 1090 | 5.3 | 1620 |
| Jul. 14, 2006 | 6.7 | 1080 | 5.4 | 1660 |
| Jul. 14, 2006 | 6.6 | 950 | 5.0 | 1710 |
| Jul. 14, 2006 | 6.9 | 1180 | 4.7 | 1920 |
| Jul. 14, 2006 | 6.4 | 1150 | 4.6 | 2020 |
| Jul. 14, 2006 | 6.3 | 1180 | 4.6 | 1930 |
| Jul. 14, 2006 | 7.1 | 1270 | 5.4 | 1050 |
| Jul. 15, 2006 | 6.7 | 960 | 4.9 | 1800 |
| Jul. 15, 2006 | 6.8 | 890 | 5.2 | 1810 |
| Jul. 15, 2006 | 6.7 | 950 | 4.8 | 1730 |
| Jul. 15, 2006 | 6.7 | 1030 | 6.7 | 1960 |
| Jul. 15, 2006 | 6.9 | 1050 | 5.9 | 1790 |
| Jul. 15, 2006 | 6.5 | 1070 | 4.5 | 2020 |
| Jul. 16, 2006 | 6.8 | 840 | 5.5 | 1740 |
| Jul. 16, 2006 | 6.7 | 1020 | 5.1 | 1590 |
| Jul. 16, 2006 | 6.7 | 960 | 5.2 | 1660 |
| Jul. 16, 2006 | 6.8 | 1040 | 4.9 | 1850 |
| Jul. 16, 2006 | 6.7 | 1040 | 4.1 | 2100 |
| Jul. 16, 2006 | 6.4 | 1040 | 4.6 | 1950 |
| Jul. 16, 2006 | 7.1 | 920 | 5.0 | 1030 |
| Jul. 17, 2006 | 6.7 | 820 | 5.0 | 1690 |
| Jul. 17, 2006 | 6.7 | 1000 | 5.3 | 1500 |
| Jul. 17, 2006 | 6.7 | 940 | 5.0 | 1740 |
| Jul. 17, 2006 | 6.7 | 1060 | 4.7 | 1730 |
| Jul. 17, 2006 | 6.7 | 1220 | 5.2 | 1830 |
| Jul. 17, 2006 | 6.5 | 990 | 5.0 | 2300 |
| Jul. 18, 2006 | 6.6 | 840 | 4.8 | 1930 |
| Jul. 18, 2006 | 6.6 | 950 | 4.8 | 1890 |
| Jul. 18, 2006 | 6.7 | 910 | 4.4 | 1870 |
| Jul. 18, 2006 | 6.6 | 960 | 4.6 | 1860 |
| Jul. 18, 2006 | 6.4 | 900 | 4.6 | 1840 |
| Jul. 19, 2006 | 6.6 | 880 | 4.6 | 1800 |
| Jul. 19, 2006 | 6.7 | 920 | 4.5 | 1680 |
| Jul. 19, 2006 | 6.7 | 920 | 4.5 | 1690 |
| Jul. 19, 2006 | 6.8 | 1010 | 4.7 | 1640 |
| Jul. 19, 2006 | 6.5 | 1090 | 4.4 | 1950 |
| Jul. 19, 2006 | 6.2 | 790 | 4.8 | 1980 |
| Jul. 20, 2006 | 6.7 | 910 | 4.6 | 1810 |
| Jul. 20, 2006 | 6.9 | 1010 | 4.6 | 1750 |
| Jul. 20, 2006 | 6.8 | 830 | 4.5 | 1640 |
| Jul. 20, 2006 | 6.9 | 1000 | 4.2 | 1690 |
| Jul. 20, 2006 | 6.8 | 1130 | 4.5 | 1700 |
| Jul. 20, 2006 | 6.8 | 950 | 4.9 | 1910 |
| Jul. 21, 2006 | 6.7 | 890 | 4.6 | 1920 |
| Jul. 21, 2006 | 6.6 | 970 | 4.3 | 1780 |
| Jul. 21, 2006 | 6.7 | 960 | 4.2 | 1980 |
| Jul. 21, 2006 | 6.8 | 960 | 4.2 | 2080 |
| Jul. 21, 2006 | 6.9 | 1110 | 5.5 | 2000 |
| Jul. 22, 2006 | 6.7 | 1010 | 4.7 | 1850 |
| Jul. 22, 2006 | 6.8 | 1000 | 5.0 | 1790 |
| Jul. 22, 2006 | 6.9 | 940 | 4.2 | 1850 |
| Jul. 22, 2006 | 6.9 | 1090 | 4.4 | 1920 |
| Jul. 22, 2006 | 6.8 | 1220 | 4.1 | 1040 |
| Jul. 22, 2006 | 6.8 | 1200 | 5.9 | 2060 |
| Jul. 24, 2006 | 6.9 | 870 | 4.8 | 1580 |
| Jul. 24, 2006 | 6.8 | 1080 | 5.3 | 1550 |
| Jul. 24, 2006 | 7.0 | 950 | 5.0 | 1550 |
| Jul. 24, 2006 | 7.0 | 1130 | 4.5 | 1640 |
| Jul. 24, 2006 | 6.9 | 1040 | 4.4 | 1830 |
| Jul. 24, 2006 | 6.9 | 1010 | 4.3 | 1590 |
| Jul. 24, 2006 | 7.0 | 1100 | 6.9 | 1830 |
| Jul. 25, 2006 | 6.8 | 1040 | 4.7 | 1640 |
| Jul. 25, 2006 | 6.9 | 1110 | 4.6 | 1640 |
| Jul. 25, 2006 | 6.6 | 1010 | 4.2 | 1770 |
| Jul. 25, 2006 | 6.7 | 1050 | 4.2 | 1850 |
| Jul. 25, 2006 | 6.9 | 1100 | 4.1 | 1890 |
| Jul. 25, 2006 | 6.8 | 1180 | 4.6 | 1950 |
| Jul. 25, 2006 | 6.3 | 1030 | 4.5 | 1940 |
| Jul. 26, 2006 | 6.9 | 980 | 5.6 | 1590 |
| Jul. 26, 2006 | 6.8 | 870 | 4.4 | 1640 |
| Jul. 26, 2006 | 6.7 | 930 | 4.3 | 1600 |
| Jul. 26, 2006 | 6.7 | 1000 | 4.5 | 1680 |
| Jul. 26, 2006 | 6.8 | 940 | 4.4 | 1790 |
| Jul. 26, 2006 | 6.8 | 920 | 5.3 | 1790 |
| Jul. 26, 2006 | 6.8 | 930 | 5.9 | 1100 |
| Jul. 27, 2006 | 6.9 | 840 | 4.9 | 1430 |
| Jul. 27, 2006 | 7.0 | 890 | 4.5 | 1420 |
| Jul. 27, 2006 | 6.8 | 920 | 4.4 | 1420 |
| Jul. 27, 2006 | 6.8 | 970 | 4.3 | 1480 |
| Jul. 27, 2006 | 6.8 | 980 | 4.2 | 1520 |
| Jul. 27, 2006 | 6.8 | 910 | 4.8 | 1530 |
| Jul. 28, 2006 | 6.9 | 870 | 4.8 | 1400 |
| Jul. 28, 2006 | 6.9 | 970 | 4.9 | 1330 |
| Jul. 28, 2006 | 6.7 | 1070 | 4.4 | 1410 |
| Jul. 28, 2006 | 7.0 | 880 | 4.2 | 1510 |
| Jul. 28, 2006 | 6.9 | 1010 | 4.6 | 1530 |
| Jul. 28, 2006 | 6.3 | 930 | 4.4 | 1620 |
| Jul. 28, 2006 | 6.3 | 650 | 5.1 | 1430 |
| Jul. 29, 2006 | 6.8 | 910 | 5.0 | 1220 |
| Jul. 29, 2006 | 7.0 | 980 | 4.7 | 1270 |
| Jul. 29, 2006 | 6.8 | 980 | 4.3 | 1340 |
| Jul. 29, 2006 | 6.9 | 920 | 4.7 | 1410 |
| Jul. 29, 2006 | 6.8 | 1010 | 4.3 | 1470 |
| Jul. 29, 2006 | 6.8 | 910 | 4.8 | 1500 |
| Jul. 29, 2006 | 6.3 | 760 | 5.7 | 1530 |
| Jul. 31, 2006 | 6.3 | 760 | 5.5 | 1060 |
| Jul. 31, 2006 | 6.3 | 760 | 4.4 | 1100 |
| Jul. 31, 2006 | 6.0 | 1040 | 4.3 | 1050 |
| Jul. 31, 2006 | 6.1 | 1020 | 5.6 | 1170 |
| Jul. 31, 2006 | 6.4 | 1100 | 5.1 | 1390 |
| Jul. 31, 2006 | 6.0 | 1070 | 4.5 | 1420 |
| Jul. 31, 2006 | 6.3 | 1130 | 4.8 | 1490 |
| Jul. 31, 2006 | 6.1 | 1160 | 5.0 | 1440 |
| Aug. 01, 2006 | 6.1 | 1060 | 4.4 | 1450 |
| Aug. 01, 2006 | 6.2 | 1020 | 4.5 | 1470 |
| Aug. 01, 2006 | 6.2 | 1070 | 4.3 | 1500 |
| Aug. 01, 2006 | 6.2 | 970 | 4.3 | 1570 |
| Aug. 01, 2006 | 6.5 | 1050 | 4.3 | 1510 |
| Aug. 01, 2006 | 5.8 | 1150 | 4.2 | 1670 |

TABLE 5-continued

| Date | pH of Water from Irrigation Line | EC of Water from Irrigation Line | pH of Excess Water from Plant Container | EC of Excess Water from Plant Container |
|---|---|---|---|---|
| Aug. 01, 2006 | 5.9 | 1010 | 4.5 | 1640 |
| Aug. 02, 2006 | 6.1 | 970 | 4.7 | 1620 |
| Aug. 02, 2006 | 6.2 | 1110 | 4.4 | 1530 |
| Aug. 02, 2006 | 6.1 | 1000 | 4.5 | 1660 |
| Aug. 02, 2006 | 6.0 | 1160 | 4.9 | 1740 |
| Aug. 02, 2006 | 6.6 | 1090 | 4.9 | 1600 |
| Aug. 02, 2006 | 6.5 | 1010 | 4.9 | 1710 |
| Aug. 03, 2006 | 6.4 | 1100 | 6.2 | 1390 |
| Aug. 03, 2006 | 6.3 | 1090 | 4.5 | 1640 |
| Aug. 03, 2006 | 6.2 | 1140 | 4.6 | 1700 |
| Aug. 03, 2006 | 6.4 | 1100 | 4.2 | 1540 |
| Aug. 03, 2006 | 6.1 | 1150 | 4.8 | 1810 |
| Aug. 03, 2006 | 6.1 | 1020 | 5.0 | 1090 |
| Aug. 04, 2006 | 6.4 | 1040 | 4.8 | 1820 |
| Aug. 04, 2006 | 6.2 | 1130 | 4.7 | 1610 |
| Aug. 04, 2006 | 6.4 | 1170 | 4.5 | 1660 |
| Aug. 04, 2006 | 6.4 | 1070 | 4.6 | 1870 |
| Aug. 04, 2006 | 6.2 | 1100 | 4.4 | 1530 |
| Aug. 04, 2006 | 6.1 | 1170 | 4.6 | 1690 |
| Aug. 04, 2006 | 5.8 | 1350 | 4.1 | 1760 |
| Aug. 04, 2006 | 6.8 | 1030 | 4.6 | 1790 |
| Aug. 05, 2006 | 6.3 | 1050 | 4.4 | 1570 |
| Aug. 05, 2006 | 6.3 | 1090 | 4.5 | 1570 |
| Aug. 05, 2006 | 5.8 | 1100 | 3.8 | 1570 |
| Aug. 05, 2006 | 6.2 | 990 | 4.1 | 1620 |
| Aug. 05, 2006 | 5.9 | 1130 | 3.6 | 1720 |
| Aug. 05, 2006 | 6.0 | 1110 | 4.6 | 1790 |
| Aug. 05, 2006 | 6.0 | 1080 | 4.1 | 1760 |
| Aug. 06, 2006 | 6.6 | 1160 | 4.8 | 1560 |
| Aug. 07, 2006 | 6.4 | 1040 | 4.6 | 1640 |
| Aug. 07, 2006 | 6.1 | 1140 | 4.0 | 1600 |
| Aug. 07, 2006 | 6.2 | 1130 | 4.0 | 1560 |
| Aug. 07, 2006 | 6.1 | 1170 | 4.5 | 1540 |
| Aug. 07, 2006 | 6.2 | 1210 | 4.4 | 1650 |
| Aug. 07, 2006 | 6.4 | 1190 | 4.8 | 1730 |
| Aug. 07, 2006 | 6.6 | 1230 | 4.6 | 1740 |
| Aug. 07, 2006 | 6.0 | 1090 | 4.5 | 1730 |
| Aug. 08, 2006 | 6.5 | 1110 | 5.4 | 1630 |
| Aug. 08, 2006 | 6.2 | 1050 | 4.4 | 1470 |
| Aug. 08, 2006 | 6.2 | 1050 | 4.4 | 1490 |
| Aug. 08, 2006 | 6.3 | 1070 | 4.5 | 1420 |
| Aug. 08, 2006 | 6.3 | 1060 | 4.8 | 1620 |
| Aug. 08, 2006 | 6.3 | 1100 | 4.7 | 1610 |
| Aug. 08, 2006 | 6.3 | 1000 | 4.8 | 1580 |
| Aug. 08, 2006 | 6.3 | 1060 | 4.5 | 1550 |
| Aug. 09, 2006 | 6.4 | 1000 | 4.7 | 1400 |
| Aug. 09, 2006 | 6.1 | 990 | 4.4 | 1320 |
| Aug. 09, 2006 | 6.3 | 970 | 4.4 | 1420 |
| Aug. 09, 2006 | 6.5 | 970 | 4.4 | 1430 |
| Aug. 09, 2006 | 6.0 | 1070 | 4.5 | 1450 |
| Aug. 09, 2006 | 6.2 | 1160 | 4.5 | 1530 |
| Aug. 10, 2006 | 6.3 | 1050 | 5.0 | 1330 |
| Aug. 10, 2006 | 6.4 | 980 | 4.1 | 1610 |
| Aug. 10, 2006 | 6.3 | 960 | 5.2 | 1970 |
| Aug. 10, 2006 | 6.4 | 960 | 4.9 | 1880 |
| Aug. 10, 2006 | 6.4 | 950 | 4.6 | 1870 |
| Aug. 10, 2006 | 6.4 | 950 | 5.1 | 1930 |
| Aug. 10, 2006 | 6.2 | 900 | 4.8 | 1950 |
| Aug. 11, 2006 | 6.1 | 860 | 5.0 | 1510 |
| Aug. 11, 2006 | 6.4 | 910 | 5.2 | 1470 |
| Aug. 11, 2006 | 6.0 | 910 | 4.2 | 1500 |
| Aug. 11, 2006 | 5.9 | 920 | 4.3 | 1520 |
| Aug. 11, 2006 | 6.1 | 870 | 4.5 | 1580 |
| Aug. 11, 2006 | 6.5 | 950 | 4.5 | 1560 |
| Aug. 11, 2006 | 6.1 | 860 | 4.2 | 1680 |
| Aug. 11, 2006 | 5.5 | 870 | 4.3 | 1360 |
| Aug. 11, 2006 | 5.9 | 890 | 4.9 | 1320 |
| Aug. 12, 2006 | 5.5 | 870 | 4.9 | 1360 |
| Aug. 12, 2006 | 5.9 | 890 | 4.9 | 1320 |
| Aug. 12, 2006 | 6.2 | 930 | 4.6 | 1320 |
| Aug. 12, 2006 | 6.3 | 870 | 4.6 | 1390 |
| Aug. 12, 2006 | 6.4 | 930 | 4.4 | 1410 |
| Aug. 12, 2006 | 6.4 | 920 | 4.6 | 1470 |
| Aug. 12, 2006 | 6.3 | 940 | 4.4 | 1480 |
| Aug. 13, 2006 | 6.3 | 790 | 5.0 | 1120 |
| Aug. 13, 2006 | 6.1 | 970 | 4.9 | 1170 |
| Aug. 13, 2006 | 6.4 | 1000 | 4.5 | 1340 |
| Aug. 13, 2006 | 6.4 | 900 | 4.9 | 1390 |
| Aug. 13, 2006 | 6.9 | 900 | 4.8 | 1450 |
| Aug. 13, 2006 | 6.0 | 940 | 4.4 | 1360 |
| Aug. 13, 2006 | 6.8 | 810 | 5.8 | 1410 |
| Aug. 13, 2006 | 5.9 | 940 | 4.2 | 1310 |
| Aug. 14, 2006 | 6.8 | 900 | 5.7 | 1080 |
| Aug. 14, 2006 | 6.5 | 890 | 4.9 | 1110 |
| Aug. 14, 2006 | 6.4 | 920 | 4.9 | 1180 |
| Aug. 14, 2006 | 6.1 | 900 | 4.3 | 1230 |
| Aug. 14, 2006 | 6.0 | 850 | 4.4 | 1330 |
| Aug. 14, 2006 | 6.1 | 940 | 4.5 | 1370 |
| Aug. 14, 2006 | 5.9 | 940 | 4.5 | 1370 |
| Aug. 15, 2006 | 6.3 | 850 | 5.0 | 1310 |
| Aug. 15, 2006 | 6.4 | 930 | 4.7 | 1270 |
| Aug. 15, 2006 | 4.9 | 880 | 3.0 | 1280 |
| Aug. 15, 2006 | 5.4 | 890 | 3.4 | 1270 |
| Aug. 15, 2006 | 5.9 | 940 | 3.7 | 1280 |
| Aug. 15, 2006 | 6.1 | 950 | 4.3 | 1380 |
| Aug. 15, 2006 | 6.3 | 810 | 4.3 | 1370 |
| Aug. 16, 2006 | 6.5 | 770 | 5.1 | 1100 |
| Aug. 16, 2006 | 6.4 | 990 | 5.4 | 1130 |
| Aug. 16, 2006 | 6.4 | 970 | 4.8 | 1190 |
| Aug. 16, 2006 | 6.6 | 880 | 4.7 | 1310 |
| Aug. 16, 2006 | 6.0 | 1010 | 4.1 | 1420 |
| Aug. 16, 2006 | 6.4 | 810 | 4.7 | 1450 |
| Aug. 16, 2006 | 6.4 | 800 | 5.0 | 1490 |
| Aug. 17, 2006 | 6.4 | 880 | 5.0 | 1150 |
| Aug. 17, 2006 | 6.4 | 900 | 4.9 | 1130 |
| Aug. 17, 2006 | 6.2 | 870 | 4.5 | 1140 |
| Aug. 17, 2006 | 6.7 | 790 | 4.5 | 1050 |
| Aug. 17, 2006 | 6.7 | 910 | 5.0 | 1250 |
| Aug. 17, 2006 | 6.7 | 820 | 5.1 | 1240 |
| Aug. 17, 2006 | 6.6 | 950 | 5.3 | 1380 |
| Aug. 18, 2006 | 6.5 | 780 | 5.3 | 1160 |
| Aug. 18, 2006 | 6.5 | 940 | 5.1 | 1140 |
| Aug. 18, 2006 | 6.1 | 850 | 4.6 | 1220 |
| Aug. 18, 2006 | 6.2 | 810 | 4.0 | 1330 |
| Aug. 18, 2006 | 6.3 | 400 | 4.7 | 1360 |
| Aug. 18, 2006 | 6.4 | 650 | 6.4 | 1370 |
| Aug. 19, 2006 | 6.4 | 880 | 4.9 | 1260 |
| Aug. 19, 2006 | 6.5 | 940 | 5.1 | 1260 |
| Aug. 19, 2006 | 6.1 | 950 | 4.1 | 1220 |
| Aug. 19, 2006 | 6.3 | 950 | 4.4 | 1420 |
| Aug. 19, 2006 | 6.4 | 960 | 4.6 | 1440 |
| Aug. 19, 2006 | 6.6 | 770 | 4.8 | 1580 |
| Aug. 20, 2006 | 6.4 | 800 | 3.4 | 1470 |
| Aug. 20, 2006 | 6.2 | 960 | 4.5 | 1340 |
| Aug. 20, 2006 | 6.3 | 1350 | 4.5 | 1470 |
| Aug. 20, 2006 | 6.4 | 1190 | 4.3 | 1690 |
| Aug. 20, 2006 | 6.5 | 990 | 4.2 | 1920 |
| Aug. 20, 2006 | 6.5 | 980 | 5.4 | 1910 |
| Aug. 21, 2006 | 6.5 | 830 | 5.8 | 1610 |
| Aug. 21, 2006 | 6.5 | 960 | 4.8 | 1290 |
| Aug. 21, 2006 | 6.6 | 1010 | 4.8 | 1380 |
| Aug. 21, 2006 | 6.1 | 820 | 3.6 | 1240 |
| Aug. 21, 2006 | 6.3 | 830 | 4.3 | 1390 |
| Aug. 21, 2006 | 6.3 | 910 | 4.1 | 1360 |
| Aug. 21, 2006 | 6.1 | 810 | 4.2 | 1520 |
| Aug. 22, 2006 | 5.8 | 790 | 4.2 | 1520 |
| Aug. 22, 2006 | 6.0 | 970 | 4.7 | 1310 |
| Aug. 22, 2006 | 5.8 | 980 | 3.9 | 1370 |
| Aug. 22, 2006 | 6.2 | 920 | 4.0 | 1400 |
| Aug. 22, 2006 | 6.0 | 1020 | 3.9 | 1650 |
| Aug. 22, 2006 | 6.1 | 940 | 3.5 | 1560 |
| Aug. 22, 2006 | 5.9 | 810 | 4.4 | 1710 |
| Aug. 23, 2006 | 5.7 | 840 | 3.9 | 1570 |
| Aug. 23, 2006 | 6.2 | 920 | 4.6 | 1300 |
| Aug. 23, 2006 | 5.9 | 910 | 3.9 | 1370 |
| Aug. 23, 2006 | 4.8 | 860 | 3.0 | 1450 |

TABLE 5-continued

| Date | pH of Water from Irrigation Line | EC of Water from Irrigation Line | pH of Excess Water from Plant Container | EC of Excess Water from Plant Container |
|---|---|---|---|---|
| Aug. 23, 2006 | 4.8 | 900 | 2.7 | 1450 |
| Aug. 23, 2006 | 4.4 | 930 | 2.6 | 1380 |
| Aug. 23, 2006 | 6.4 | 1130 | 5.3 | 1360 |
| Aug. 23, 2006 | 6.3 | 920 | 4.2 | 1360 |
| Aug. 24, 2006 | 6.7 | 820 | 5.3 | 1290 |
| Aug. 24, 2006 | 6.7 | 1100 | 5.5 | 1590 |
| Aug. 24, 2006 | 6.7 | 1050 | 4.9 | 1520 |
| Aug. 24, 2006 | 6.9 | 1000 | 5.0 | 1340 |
| Aug. 24, 2006 | 6.6 | 1000 | 4.5 | 1540 |
| Aug. 24, 2006 | 6.8 | 930 | 4.5 | 1630 |
| Aug. 24, 2006 | 7.0 | 1150 | 4.9 | 1660 |
| Aug. 24, 2006 | 6.7 | 1130 | 5.2 | 1770 |
| Aug. 25, 2006 | 6.5 | 1130 | 5.2 | 1610 |
| Aug. 25, 2006 | 6.4 | 1080 | 5.4 | 1500 |
| Aug. 25, 2006 | 6.6 | 980 | 4.9 | 1530 |
| Aug. 25, 2006 | 6.5 | 1010 | 5.0 | 1450 |
| Aug. 25, 2006 | 7.0 | 1040 | 4.8 | 1600 |
| Aug. 25, 2006 | 6.8 | 940 | 5.2 | 1640 |
| Aug. 26, 2006 | 6.8 | 890 | 5.5 | 1210 |
| Aug. 26, 2006 | 6.4 | 1090 | 4.6 | 1300 |
| Aug. 26, 2006 | 6.9 | 1050 | 4.9 | 1360 |
| Aug. 26, 2006 | 6.6 | 1140 | 4.9 | 1380 |
| Aug. 26, 2006 | 6.8 | 1020 | 4.9 | 1590 |
| Aug. 26, 2006 | 6.6 | 1190 | 4.7 | 1630 |
| Aug. 26, 2006 | 6.7 | 1020 | 5.0 | 1700 |
| Aug. 27, 2006 | 6.7 | 1040 | 5.4 | 1550 |
| Aug. 27, 2006 | 6.6 | 1060 | 4.9 | 1520 |
| Aug. 27, 2006 | 7.2 | 1070 | 4.6 | 1450 |
| Aug. 27, 2006 | 6.7 | 1200 | 4.5 | 1600 |
| Aug. 27, 2006 | 6.9 | 1060 | 4.9 | 1730 |
| Aug. 27, 2006 | 6.9 | 1000 | 4.9 | 1770 |
| Aug. 27, 2006 | 7.1 | 870 | 5.1 | 1830 |
| Aug. 28, 2006 | 6.6 | 930 | 5.0 | 1570 |
| Aug. 28, 2006 | 6.7 | 1010 | 4.7 | 1380 |
| Aug. 28, 2006 | 6.7 | 930 | 4.6 | 1430 |
| Aug. 28, 2006 | 6.8 | 1000 | 4.6 | 1520 |
| Aug. 28, 2006 | 6.8 | 1000 | 4.8 | 1640 |
| Aug. 28, 2006 | 7.1 | 980 | 4.8 | 1520 |
| Aug. 28, 2006 | 6.7 | 1120 | 4.7 | 1710 |
| Aug. 28, 2006 | 7.1 | 1050 | 5.4 | 1700 |
| Aug. 29, 2006 | 6.8 | 1060 | 5.0 | 1520 |
| Aug. 29, 2006 | 7.0 | 1080 | 5.1 | 1480 |
| Aug. 29, 2006 | 6.8 | 1180 | 5.0 | 1590 |
| Aug. 29, 2006 | 7.0 | 1090 | 4.8 | 1640 |
| Aug. 29, 2006 | 7.2 | 1120 | 4.9 | 1650 |
| Aug. 29, 2006 | 6.6 | 1170 | 4.7 | 1880 |
| Aug. 30, 2006 | 7.0 | 1010 | 4.8 | 1840 |
| Aug. 30, 2006 | 7.0 | 1120 | 5.0 | 1660 |
| Aug. 30, 2006 | 6.9 | 1140 | 4.7 | 1640 |
| Aug. 30, 2006 | 6.5 | 1230 | 4.5 | 1770 |
| Aug. 30, 2006 | 6.9 | 1140 | 4.6 | 1740 |
| Aug. 30, 2006 | 6.8 | 1250 | 4.8 | 1820 |
| Aug. 30, 2006 | 6.5 | 1210 | 4.8 | 1820 |
| Aug. 30, 2006 | 6.5 | 1150 | 5.2 | 1940 |
| Aug. 31, 2006 | 2.9 | 1160 | 4.5 | 1820 |
| Aug. 31, 2006 | 5.1 | 1110 | 3.6 | 1970 |
| Aug. 31, 2006 | 6.1 | 1220 | 4.1 | 1900 |
| Aug. 31, 2006 | 6.9 | 1180 | 4.6 | 1020 |
| Aug. 31, 2006 | 6.8 | 1100 | 4.1 | 1020 |
| Aug. 31, 2006 | 6.8 | 1060 | 4.7 | 2160 |
| Sep. 01, 2006 | 6.7 | 1050 | 4.8 | 2060 |
| Sep. 01, 2006 | 6.7 | 1180 | 4.3 | 1740 |
| Sep. 01, 2006 | 6.1 | 1170 | 3.9 | 1780 |
| Sep. 01, 2006 | 6.0 | 1180 | 4.3 | 1830 |
| Sep. 01, 2006 | 6.1 | 1310 | 4.8 | 1920 |
| Sep. 01, 2006 | 7.0 | 1240 | 4.4 | 1880 |
| Sep. 01, 2006 | 6.5 | 1260 | 4.4 | 2260 |
| Sep. 02, 2006 | 7.1 | 1100 | 4.6 | 1110 |
| Sep. 02, 2006 | 6.6 | 1150 | 4.5 | 1950 |
| Sep. 02, 2006 | 6.5 | 1250 | 4.5 | 1690 |
| Sep. 02, 2006 | 6.5 | 1180 | 4.1 | 1930 |
| Sep. 02, 2006 | 6.2 | 1170 | 4.7 | 1820 |
| Sep. 02, 2006 | 6.7 | 1440 | 4.8 | 2200 |
| Sep. 02, 2006 | 6.8 | 1380 | 4.1 | 2260 |
| Sep. 02, 2006 | 6.8 | 1250 | 5.2 | 2380 |
| Sep. 03, 2006 | 6.7 | 1160 | 4.5 | 2000 |
| Sep. 03, 2006 | 6.6 | 1070 | 4.3 | 1830 |
| Sep. 03, 2006 | 6.3 | 590 | 4.3 | 1780 |
| Sep. 03, 2006 | 7.5 | 560 | 4.8 | 1450 |
| Sep. 03, 2006 | 6.5 | 540 | 4.7 | 1290 |
| Sep. 03, 2006 | 6.5 | 530 | 4.9 | 1080 |
| Sep. 03, 2006 | 6.9 | 950 | 4.8 | 1400 |
| Sep. 04, 2006 | 7.4 | 920 | 5.0 | 1270 |
| Sep. 04, 2006 | 6.5 | 840 | 4.6 | 1210 |
| Sep. 04, 2006 | 7.2 | 890 | 4.5 | 1170 |
| Sep. 04, 2006 | 6.1 | 1140 | 3.6 | 1310 |
| Sep. 04, 2006 | 7.2 | 1030 | 4.3 | 1430 |
| Sep. 04, 2006 | 6.5 | 1070 | 4.7 | 1480 |
| Sep. 04, 2006 | 6.6 | 940 | 5.0 | 1600 |
| Sep. 06, 2006 | 6.6 | 990 | 4.5 | 1650 |
| Sep. 06, 2006 | 6.3 | 1000 | 4.1 | 1560 |
| Sep. 06, 2006 | 6.9 | 1010 | 4.0 | 1590 |
| Sep. 06, 2006 | 6.2 | 1070 | 4.2 | 1450 |
| Sep. 06, 2006 | 6.2 | 1240 | 4.4 | 1580 |
| Sep. 06, 2006 | 6.4 | 1090 | 4.5 | 1660 |
| Sep. 06, 2006 | 6.1 | 1080 | 4.3 | 1660 |
| Sep. 06, 2006 | 6.3 | 950 | 4.4 | 1690 |
| Sep. 07, 2006 | 6.5 | 950 | 4.4 | 1600 |
| Sep. 07, 2006 | 6.7 | 1050 | 4.6 | 1570 |
| Sep. 07, 2006 | 7.1 | 1070 | 4.6 | 1460 |
| Sep. 07, 2006 | 7.1 | 1050 | 3.6 | 1490 |
| Sep. 07, 2006 | 7.0 | 1140 | 4.4 | 1520 |
| Sep. 07, 2006 | 7.2 | 1100 | 4.3 | 1620 |
| Sep. 07, 2006 | 6.4 | 1100 | 4.3 | 1680 |
| Sep. 07, 2006 | 6.6 | 1060 | 4.7 | 1790 |
| Sep. 08, 2006 | 6.9 | 960 | 4.5 | 1680 |
| Sep. 08, 2006 | 6.9 | 1030 | 4.6 | 1490 |
| Sep. 08, 2006 | 6.8 | 1120 | 4.5 | 1540 |
| Sep. 08, 2006 | 7.0 | 1050 | 4.5 | 1500 |
| Sep. 08, 2006 | 6.7 | 1080 | 4.3 | 1520 |
| Sep. 08, 2006 | 6.8 | 980 | 4.2 | 1560 |
| Sep. 08, 2006 | 7.1 | 980 | 4.3 | 1520 |
| Sep. 08, 2006 | 6.8 | 1000 | 4.4 | 1520 |
| Sep. 08, 2006 | 6.8 | 1040 | 4.8 | 1610 |
| Sep. 09, 2006 | 6.6 | 950 | 4.9 | 1580 |
| Sep. 09, 2006 | 7.1 | 1080 | 4.5 | 1460 |
| Sep. 09, 2006 | 6.9 | 1010 | 4.4 | 1450 |
| Sep. 09, 2006 | 6.8 | 1210 | 4.6 | 1520 |
| Sep. 09, 2006 | 6.9 | 1100 | 4.4 | 1570 |
| Sep. 09, 2006 | 6.6 | 900 | 4.9 | 1670 |
| Sep. 10, 2006 | 6.1 | 990 | 4.4 | 1380 |
| Sep. 10, 2006 | 7.0 | 970 | 4.6 | 1460 |
| Sep. 10, 2006 | 6.8 | 1050 | 4.7 | 1490 |
| Sep. 10, 2006 | 6.4 | 1010 | 4.4 | 1530 |
| Sep. 10, 2006 | 6.5 | 950 | 5.0 | 1630 |
| Sep. 11, 2006 | 5.5 | 970 | 3.9 | 1550 |
| Sep. 11, 2006 | 6.1 | 1120 | 4.3 | 1440 |
| Sep. 11, 2006 | 6.9 | 1050 | 4.6 | 1440 |
| Sep. 11, 2006 | 6.4 | 1030 | 4.6 | 1450 |
| Sep. 11, 2006 | 6.2 | 990 | 4.8 | 1090 |
| Sep. 12, 2006 | 6.6 | 870 | 3.6 | 1590 |
| Sep. 12, 2006 | 5.9 | 1030 | 3.6 | 1460 |
| Sep. 12, 2006 | 6.8 | 1060 | 4.5 | 1440 |
| Sep. 12, 2006 | 7.2 | 950 | 4.5 | 1650 |
| Sep. 12, 2006 | 6.5 | 880 | 4.8 | 1360 |
| Sep. 12, 2006 | 6.2 | 500 | 4.8 | 1380 |
| Sep. 13, 2006 | 6.5 | 1100 | 4.9 | 1220 |
| Sep. 13, 2006 | 6.4 | 740 | 4.8 | 880 |
| Sep. 13, 2006 | 6.6 | 970 | 5.0 | 901 |
| Sep. 13, 2006 | 7.1 | 930 | 5.0 | 1060 |
| Sep. 13, 2006 | 7.1 | 910 | 4.8 | 1180 |
| Sep. 13, 2006 | 7.2 | 930 | 4.8 | 1330 |
| Sep. 14, 2006 | 7.0 | 840 | 5.4 | 1180 |
| Sep. 14, 2006 | 6.8 | 980 | 4.6 | 1350 |
| Sep. 14, 2006 | 7.2 | 990 | 4.6 | 1340 |
| Sep. 14, 2006 | 6.5 | 1030 | 4.4 | 1520 |

TABLE 5-continued

| Date | pH of Water from Irrigation Line | EC of Water from Irrigation Line | pH of Excess Water from Plant Container | EC of Excess Water from Plant Container |
|---|---|---|---|---|
| Sep. 14, 2006 | 6.4 | 1040 | 4.5 | 1500 |
| Sep. 14, 2006 | 6.4 | 930 | 4.7 | 1690 |
| Sep. 15, 2006 | 6.4 | 860 | 3.7 | 1770 |
| Sep. 15, 2006 | 7.3 | 1070 | 4.5 | 1250 |
| Sep. 15, 2006 | 6.3 | 1110 | 4.5 | 1610 |
| Sep. 15, 2006 | 6.4 | 1060 | 4.7 | 1630 |
| Sep. 16, 2006 | 6.4 | 970 | 4.8 | 1790 |
| Sep. 16, 2006 | 6.7 | 1110 | 4.8 | 1470 |
| Sep. 16, 2006 | 5.6 | 1040 | 4.1 | 1740 |
| Sep. 17, 2006 | 7.1 | 750 | 5.8 | 1470 |
| Sep. 17, 2006 | 6.9 | 1130 | 7.3 | 1410 |
| Sep. 17, 2006 | 6.5 | 1050 | 6.1 | 1710 |
| Sep. 18, 2006 | 6.4 | 960 | 5.6 | 1630 |
| Sep. 18, 2006 | 5.7 | 1110 | 4.0 | 1740 |
| Sep. 18, 2006 | 5.7 | 1040 | 4.6 | 1810 |
| Sep. 19, 2006 | 5.7 | 1050 | 4.2 | 1560 |
| Sep. 19, 2006 | 5.6 | 1070 | 4.7 | 1620 |
| Sep. 19, 2006 | 6.6 | 1060 | 4.1 | 1680 |
| Sep. 19, 2006 | 6.7 | 1000 | 4.1 | 1800 |
| Sep. 20, 2006 | 6.4 | 950 | 4.3 | 1670 |
| Sep. 20, 2006 | 6.6 | 1050 | 4.1 | 1750 |
| Sep. 20, 2006 | 6.0 | 600 | 4.7 | 2100 |
| Sep. 21, 2006 | 5.6 | 1010 | 4.5 | 1640 |
| Sep. 21, 2006 | 5.9 | 1140 | 4.7 | 1700 |
| Sep. 21, 2006 | 5.9 | 1100 | 3.8 | 1720 |
| Sep. 21, 2006 | 5.6 | 1650 | 4.0 | 1940 |
| Sep. 22, 2006 | 5.8 | 1350 | 4.9 | 1870 |
| Sep. 22, 2006 | 6.6 | 1140 | 4.1 | 2140 |
| Sep. 22, 2006 | 5.9 | 1110 | 4.5 | 2160 |
| Sep. 23, 2006 | 5.7 | 1040 | 4.1 | 2740 |
| Sep. 23, 2006 | 6.5 | 1060 | 4.7 | 1900 |
| Sep. 23, 2006 | 5.9 | 1060 | 4.0 | 2360 |
| Sep. 24, 2006 | 6.0 | 1060 | 4.4 | 2840 |
| Sep. 24, 2006 | 5.8 | 860 | 4.1 | 2120 |
| Sep. 24, 2006 | 6.2 | 560 | 4.1 | 1770 |
| Sep. 24, 2006 | 6.7 | 510 | 5.1 | 1330 |
| Sep. 25, 2006 | 7.3 | 520 | 7.0 | 630 |
| Sep. 25, 2006 | 7.2 | 630 | 6.4 | 610 |
| Sep. 25, 2006 | 6.9 | 620 | 6.6 | 750 |
| Sep. 25, 2006 | 7.5 | 520 | 5.8 | 1180 |
| Sep. 26, 2006 | 7.0 | 530 | 6.1 | 1270 |
| Sep. 26, 2006 | 7.4 | 620 | 6.7 | 920 |
| Sep. 26, 2006 | 7.2 | 570 | 6.6 | 950 |
| Sep. 26, 2006 | 7.2 | 520 | 6.2 | 780 |
| Sep. 26, 2006 | 7.4 | 520 | 6.5 | 800 |
| Sep. 26, 2006 | 7.3 | 590 | 6.0 | 940 |
| Sep. 26, 2006 | 7.3 | 570 | 6.4 | 940 |
| Sep. 26, 2006 | 6.7 | 530 | 6.0 | 1870 |
| Sep. 27, 2006 | 7.1 | 520 | 6.9 | 1040 |
| Sep. 27, 2006 | 7.6 | 540 | 7.0 | 830 |
| Sep. 27, 2006 | 7.3 | 600 | 6.8 | 660 |
| Sep. 27, 2006 | 7.4 | 620 | 6.8 | 620 |
| Sep. 27, 2006 | 7.3 | 590 | 7.1 | 860 |
| Sep. 29, 2006 | 7.3 | 520 | 6.8 | 540 |
| Sep. 29, 2006 | 6.9 | 630 | 6.9 | 750 |
| Sep. 29, 2006 | 6.7 | 600 | 6.7 | 770 |
| Sep. 29, 2006 | 6.8 | 650 | 6.9 | 880 |
| Sep. 30, 2006 | 6.9 | 600 | 6.6 | 830 |
| Sep. 30, 2006 | 6.6 | 630 | 6.3 | 910 |
| Sep. 30, 2006 | 6.5 | 630 | 6.3 | 1040 |

Once the data from sensors 1, 2, 3 and 4 were collected, as shown in FIG. 1, the data was then transferred to the computer fertigation controller, as shown in FIG. 1, part 6. Transferring the data from the sensors to the computer fertigation controller can be accomplished in a number of ways, either wireless or hard wired. Although SCADALink 900-MB Wireless RTU/Radiomodem (Bentek Systems) was used in this instance, any type of telemetry system that allows for the delivery of sensor-derived information from the field to a central computer or by way of fixed wires or optical cables is acceptable.

The computer fertigation controller, as shown in FIG. 1, part 7, was used to: 1) stop and start irrigation events, 2) adjust the injection rates of the various nutritional components that were added to the water, 3) test the physical and nutritional characteristics of the water being sent to the irrigation system, and 4) keep a digital record of all the information and parameters. Although the software that was used to manage this process was Wonderware (Invensys), any data analysis software could be used in this process.

Figure 2:
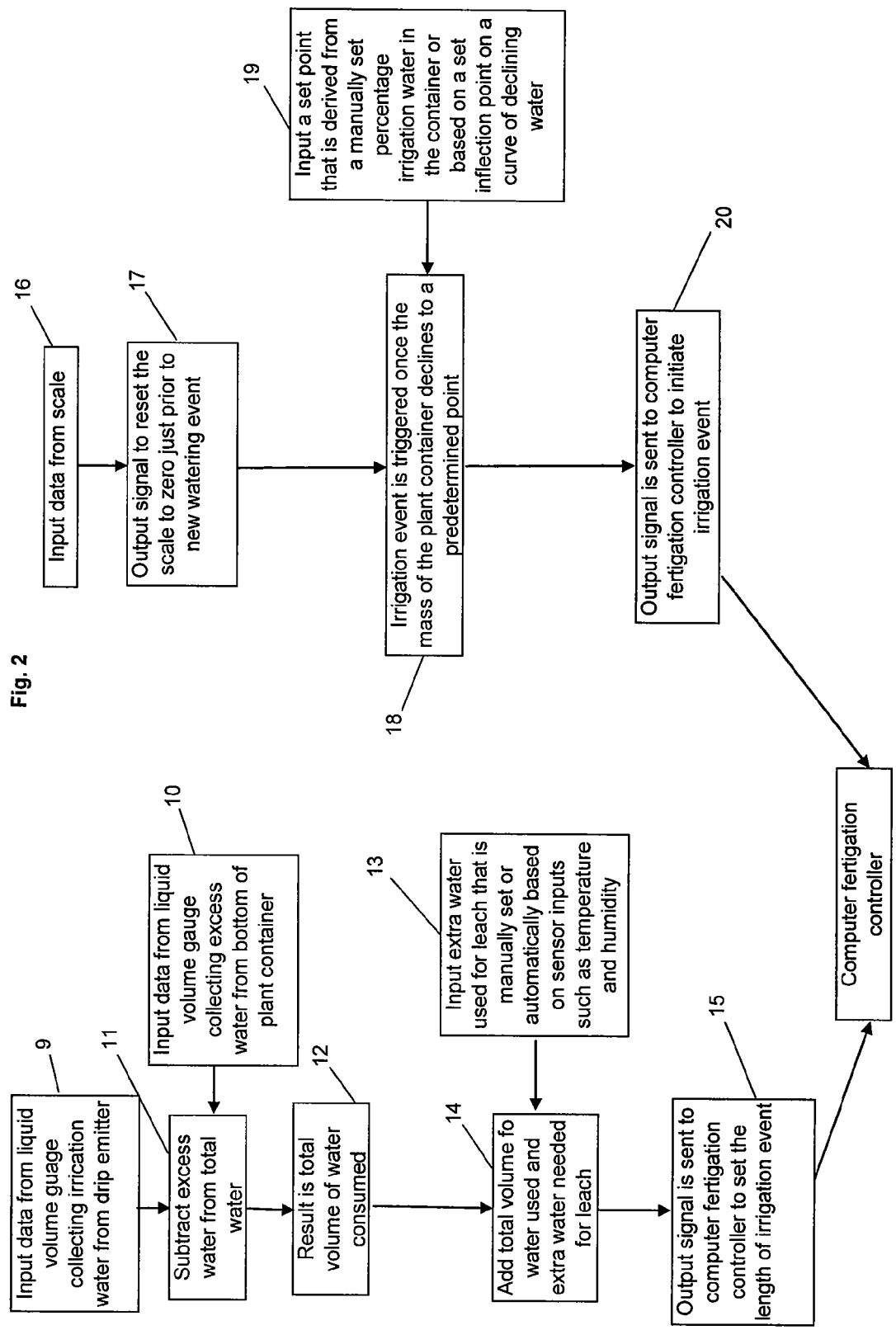
FIG. 2 shows a diagram depicting the process of analysis by a software program of data sent from the field sensors in determining water and nutrient amounts as well as timing for the next irrigation event.
Figure 3:
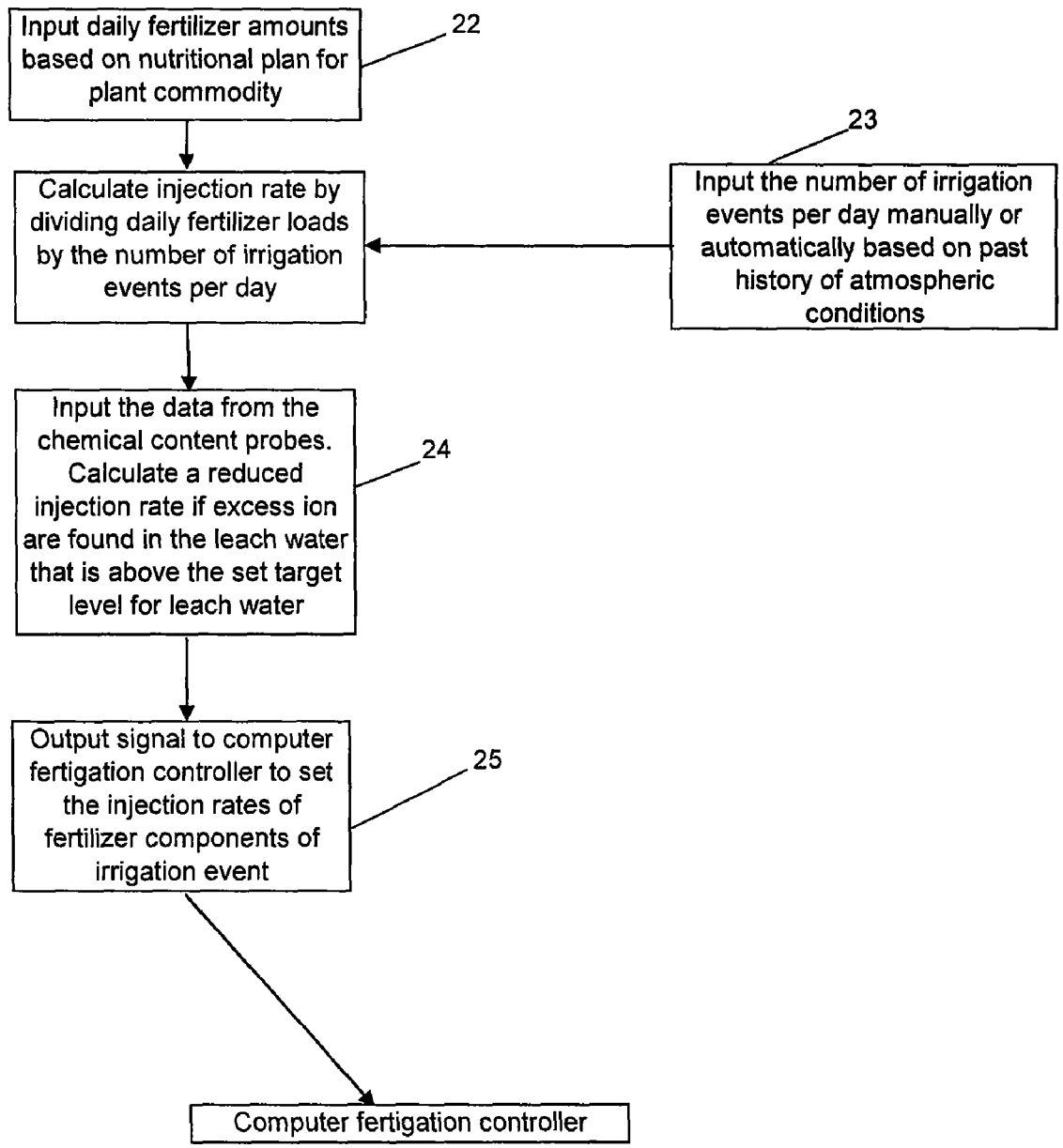
FIG. 3 shows a diagram depicting the process of analysis by a software program of data sent from the field sensors analyzing chemical content concentrations in determining water and nutrient amounts as well as timing for the next irrigation event.

Once the data was sent to the computer fertigation controller, the computer fertigation controller software analyzed the data from the sensor that collected irrigation water from the drip emitter, as can be seen in FIG. 2, step 9 and the data from the sensor that collected excess water from the bottom of the container holding the plant, as shown in FIG. 3, step 10 by subtracting the excess water data from the irrigation water, as shown in FIG. 2, step 11. The result was the volume of water that was consumed by the plant, as shown in FIG. 2, step 12. The amount of water that was necessary to flush or leach out excess salts from the plant's container was then added to the analysis of the total amount of water used, as shown in FIG. 2, step 13. The amount of water used to flush or leach excess salts varies from crop to crop and by the season. When the amount of water used to flush or leach was added to the total volume consumed, as shown in FIG. 2, step 14, a signal was then sent from the computer fertigation controller to finalize the length of the next irrigation event, as shown in FIG. 2, step 15.

The data from the weighing scale measuring the amount of water that was available to the plant by measuring the real-time mass of the container, plant and water together was sent to the computer fertigation controller where the remaining water in the system was continuously measured, as shown in FIG. 3, step 20. The weighing scale provided the real-time mass of the water available to the plant by first weighing the container, the plant and water system, as shown in FIG. 2, step 16. The scale was then reset to zero prior to the next watering event, as shown in FIG. 2, step 17. From that point forward, the continuous mass readings from the scale were therefore only the mass of the water and not the mass of the container, plant and soil together. The computer fertigation controller was triggered to initiate an irrigation event by either 1) a predetermined trigger point, as shown in FIG. 2, step 18, based on a manually set percentage of irrigation water or 2) automatically based on a set inflection point on a curve of declining water, as shown in FIG. 2, step 19.

The nutritional components that were distributed by the computer fertigation controller were determined based on one or more seasonal nutritional plans for the selected crop, as can be shown in FIG. 3, step 22, along with the number of irrigation events per day based on past historical data of local temperature, humidity and other environmental factors, as shown in FIG. 3, step 23. Data from monitoring excess fertilizer amounts from chemical content sensors, as shown in FIG. 1, step 5, in water collection containers, as shown in FIG. 3, step 24, after each irrigation event was input into the software and used, along with the seasonal nutritional plan and the daily irrigation events, to calculate future nutrient levels for irrigation events. A signal was then sent to the computer fertigation controller to set the injection rates of fertilizer components for the next irrigation event, as shown in FIG. 3, step 25.

Once the data from the water and nutrient consumption sensors was analyzed the computer fertigation controller determined the amount of nutrients to be used in the next irrigation event. When needed, fertilizers were then transferred from holding tanks to various feeder and mixing tanks using variable rate injectors. In the fertigation room, as can be seen in FIG. 1, part 8, a feed tank supplied fertilizer and nutrients to a mixing tank in which the fertilizer was mixed with water from a water supply. Water for the fertigation controller was first run through a filter to remove particulates that may clog the irrigation system (e.g. Arkal Filtration Systems).

Analysis from the computer fertigation controller was used to determine the amount of fertilizers and nutrients from various containers to be injected into open top mixing containers directly into distribution lines. The open top containers were used to allow for optional hand mixing of additional materials that were not part of the standard fertilizer configuration. The containers were in communication with the computer fertigation controller in order to receive various solutions of feed formulas. The computer fertigation controller, in conjunction with the watering control system, used variable rate injectors (e.g. Walchem LK series metering pumps, Grundfos DME series diaphragm dosing pump, Vaccon venturi vacuum pumps, Netafim Fertijet) linked by a computer to deliver the desired levels of the additives to the water. Thus, the main water feed to the irrigation system was mixed with the calculated desired levels of fertilizers and nutrients needed by the plants. This variable rate injector was used to mix the calculated desired levels of fertilizers and nutrients as regulated by the computer fertigation controller. The use of stainless steel for components of the fertigation system is preferred but plastic or ceramic components can be substituted.

In addition to adding nutritional components into the water the computer fertigation controller sent signals to cause air to be directly injected into the irrigation water (e.g. Mazzie or SWT air injectors). The added air has the beneficial effect of increasing the rate of chemical activity in the root zone and also making more oxygen directly available to the roots.

Drip emitters were situated along the irrigation, line which is a pipe, hose or conduit which delivers water and/or nutrient from the fertigation system to the base of plants under cultivation, as shown in FIG. 1, 1 and FIG. 4, part 27. Preferably a drip emitter was located at the base of a plant and to each side of the inside of the plant container. For example, for use with fruit trees, a drip emitter was placed at the base of the tree and to either side of the plant container in which the tree is planted. Alternatively, several drip emitters may surround the plant at various locations over the plant container. The drip emitter may simply be a small hole in the conduit through which liquid may slowly escape or a small tube running from the conduit and into the container.

While the present invention is directed to a computer controlled fertigation method, the fertigation may also be manually controlled. For instance, all of the data from the sensors may be manually recorded and then analyzed by hand. After the data from the sensors was analyzed the water and nutrients may then be mixed by hand in the open mixing tanks. The next irrigation event may then be started and stopped manually.

While the present invention is directed to a computer controlled fertigation method, the fertigation may also be manually controlled. For instance, all of the data from the sensors may be manually recorded and then analyzed by hand. After the data from the sensors is analyzed the water and nutrients may then be mixed by hand in the open mixing tanks. The next irrigation event may then be started and stopped manually.

Example 2

Soil Moisture Sensor

In a second embodiment of the current invention, soil moisture sensors were used along with the sensors for measuring water and nutrient consumption to provide data for the computer fertigation controller. Any soil moisture sensor can be used in this system. EasyAG soil moisture sensors, including Voltage Probe or EasyAG MA2-30 3 Sensor, which utilized Frequency Domain Reflectometry (FDR) were used to measure soil water. Depending on the size of the container there may either be a single sensor or multiple sensors placed at varying depths in order to sample the different portions of the active root zones. The soil moisture sensor provided two different perspectives on the soil, root, and water interactions. The first provided a real-time picture of how much water was being applied to the various root zones during irrigation. After the irrigation event has ended, the sensors also provided a real-time view of water use and availability.

Soil moisture sensors could be used either in place of the weighing scale or to supplement it. Rather than tracking the declining mass of water in a plant's container with a scale, this system charts the volume of water in the soil indirectly through changes in the physical property of the soil and water mix. When the soil moisture level reached a predetermined threshold, which was determined through past experience, the computer sent out the command to initiate the next watering event.

The data from the soil moisture sensor is used in the same manner as the data from the scale and can be used as a supplement to the soil moisture data by providing secondary input to the data from the scale. This serves as a backup system that ensures that there is always good data being sent to the control computer on the available plant water.

While this could be a very reasonable alternative method of obtaining real-time information on plant water usage, there is a slight drawback. The values of water volume derived from this sensor are relatively accurate, but still are a calculated value derived from an equation applied to data on the dielectric properties of soil and moisture.

Table 6 shows the soil moisture content at various times during a single day. Table 6 shows that the moisture content of the soil is kept relatively constant throughout the day due to the regularity of the irrigation events. Column 1 of Table 6 shows the date, column 2 shows the time of the irrigation event and column 3 shows soil moisture content in percent water in the soil matrix.

TABLE 6

| Date | Time | Soil moisture in percent water in soil matrix |
|---|---|---|
| Feb. 27, 2007 | 7:43 AM | 26.27 |
| Feb. 27, 2007 | 7:54 AM | 26.15 |
| Feb. 27, 2007 | 8:07 AM | 26.29 |
| Feb. 27, 2007 | 8:19 AM | 26.28 |
| Feb. 27, 2007 | 8:30 AM | 26.09 |
| Feb. 27, 2007 | 8:42 AM | 26.13 |
| Feb. 27, 2007 | 8:54 AM | 26.12 |
| Feb. 27, 2007 | 9:06 AM | 28.11 |
| Feb. 27, 2007 | 9:18 AM | 32.32 |
| Feb. 27, 2007 | 9:30 AM | 35.96 |
| Feb. 27, 2007 | 9:41 AM | 38.18 |
| Feb. 27, 2007 | 9:53 AM | 37.20 |

TABLE 6-continued

| Date | Time | Soil moisture in percent water in soil matrix |
|---|---|---|
| Feb. 27, 2007 | 10:05 AM | 36.39 |
| Feb. 27, 2007 | 10:17 AM | 36.11 |
| Feb. 27, 2007 | 10:29 AM | 35.69 |
| Feb. 27, 2007 | 10:41 AM | 35.28 |
| Feb. 27, 2007 | 10:52 AM | 35.15 |
| Feb. 27, 2007 | 11:04 AM | 34.86 |
| Feb. 27, 2007 | 11:16 AM | 34.43 |
| Feb. 27, 2007 | 11:28 AM | 34.31 |
| Feb. 27, 2007 | 11:40 AM | 34.16 |
| Feb. 27, 2007 | 11:52 AM | 33.88 |
| Feb. 27, 2007 | 12:03 AM | 33.61 |
| Feb. 27, 2007 | 12:15 AM | 33.35 |
| Feb. 27, 2007 | 12:27 AM | 33.20 |
| Feb. 27, 2007 | 12:39 AM | 33.06 |
| Feb. 27, 2007 | 12:51 AM | 33.64 |
| Feb. 27, 2007 | 1:03 AM | 33.61 |

Table 6 shows that an irrigation event was initiated at 8:54 am and continued until 9:41 am. After the irrigation event ended the percentage of waste in the soil matrix begin to steadily drop.

Sensors were also positioned in order to quantify the amount of water and/or nutrients that the plant consumed. The sensors were used to measure: 1) the amount of water delivered to the plant; 2) the volume of excess water exiting from the plant; 3) the chemical content of the excess water from the plant; and 4) the total amount of water continuously available to the plant.

To measure the amount of water delivered to the plant, a sensor (for example, TB4-L Hydrological Services 8" Tipping Bucket Rain Gauge), as shown in FIG. 1, part 2 and FIG. 4, part 28, was stationed under a single set of drip emitters that deliver water to a single plant container. Alternatively, an in-line flow sensor could also be employed. A drip emitter is a device that is used on an irrigation line to transfer water to the area to be irrigated, as shown in FIG. 4, part 26, next to the plant container in FIG. 4 part 29. Netafim integrated drippers, pressure compensated on-line drippers or arrow drippers were used depending on the crop type grown. The sensor collected and measured the amount of water distributed from the drip emitter during watering events that provide water and/or nutrients to the neighboring plant.

Drip emitters were situated along the irrigation line which is a pipe, hose or conduit which delivers water and/or nutrient from the fertigation system to the base of plants under cultivation, as shown in FIG. 1, part 1 and FIG. 4, part 27. Preferably a drip emitter was located at the base of a plant and to each side of the plant. For example, for use with fruit trees, a drip emitter was placed at the base of the tree and to either side of the container in which the tree is planted. Alternatively, several drip emitters may surround the plant at various locations over the plant container. The drip emitter may simply be a small hole in the conduit through which liquid may slowly escape or a small tube running from the conduit and into the container.

Once it was determined how much water was being delivered to the plant, it was then determined how much water was actually being used by the plant. This was done by measuring the excess water or outflow of water from a plant container. The excess water, as shown in FIG. 5, part 30 was measured using a sensor, as shown in FIG. 1, part 3 and FIG. 5, part 31 that was placed under the container, FIG. 5, part 32. The sensor continuously collected water that was being emitted from the plant container.

Next, the real-time measurement of the amount of water that was available to the plant was measured. To obtain the real-time measurement of water available to the plant, a scale (Rice Lake IQ 355 Digital Weight Indicator with a 4-20 mA analog output), as shown in FIG. 1, part 4, and FIG. 6, part 33 was placed under a plant container, FIG. 6, part 34. The scale provided the real-time mass of the water available to the plant by first weighing the container, the plant and water together. The scale was recorded just prior to the next watering event and served as a basis of comparison for subsequent readings. From that point forward, the sensor calculated weight readings of the water continuously available or uninterrupted, and not the plant container system.

In order to accurately determine the amount of nutrients required by a plant, the amount of nutrients distributed in the irrigation water that were not taken up by the plant needed to be determined. To measure the nutrients another container, a collection container for receiving excess water from the plant container, was placed under a plant container, as can be seen in FIG. 7, part 35. The collection container, FIG. 1, part 5 under the plant container, FIG. 7, part 36 from the plant which allowed sensors, FIG. 7, part 37, to be placed in the collected water to measure the chemical content of the excess water. These sensors included including 31 Series or 35 Series— sealed polycarbonate pH electrode, 02 Series—epoxy body conductivity electrode, or 35 Series—ion selective electrodes (Analytical Sensors and Instruments, LTD) which measure levels of ammonium, calcium, cupric, nitrate, nitrite, potassium, sulphide. Alternatively, the chemical content could also be determined through standard laboratory test procedures and entered into a computer manually.

Once the data from sensors 1, 2, 3 and 4 were collected, as shown in FIG. 1, the data was then transferred to the computer fertigation controller, as shown in FIG. 1, part 6. Transferring the data from the sensors to the computer fertigation controller can be accomplished in a number of ways, either wireless or hard wired. Although SCADALink 900-MB Wireless RTU/Radiomodem (Bentek Systems) was used in this instance, any type of telemetry system that allows for the delivery of sensor-derived information from the field to a central computer or by way of fixed wires or optical cables is acceptable.

The computer fertigation controller, as shown in FIG. 1, part 7 was used to: 1) stop and start irrigation events, 2) adjust the injection rates of the various nutritional components that were added to the water, 3) test the physical and nutritional characteristics of the water being sent to the irrigation system, and 4) keep a digital record of all the information and parameters. Although the software that was used to manage this process was Wonderware (Invensys), any human-machine interaction software could be used in this process.

Once the data was sent to the computer fertigation controller, the computer fertigation controller software analyzed the data from the sensor that collected irrigation water from the drip emitter, as can be seen in FIG. 2, step 9 and the data from the sensor that collected excess water from the bottom of the container holding the plant, as shown in FIG. 3, step 10 by subtracting the excess water data from the irrigation water, as shown in FIG. 2, step 11. The result was the volume of water that was consumed by the plant, as shown in FIG. 2, step 12. The amount of water that was necessary to flush or leach out excess salts from the plant's container was then added to the analysis of the total amount of water used, as shown in FIG. 2, step 13. The amount of water used to flush or leach excess salts varies from crop to crop and by the season. When the amount of water used to flush or leach was added to the total volume consumed, as shown in FIG. 2, step 14, a signal was then sent from the computer fertigation controller to finalize the length of the next irrigation event, as shown in FIG. 2, step 15.

The data from the weighing scale measuring the amount of water that was available to the plant by measuring the real-time mass of the container, plant and water together was sent to the computer fertigation controller where the remaining water in the system was continuously measured, as shown in FIG. 3, step 20. The weighing scale provided the real-time mass of the water available to the plant by first weighing the container, the plant and water system, as shown in FIG. 2, step 16. The scale was then reset to zero prior to the next watering event, as shown in FIG. 2, step 17. From that point forward, the continuous mass readings from the scale were therefore only the mass of the water and not the mass of the container, plant and soil together. The computer fertigation controller was triggered to initiate an irrigation event by either 1) a predetermined trigger point, as shown in FIG. 2, step 18, based on a manually set percentage of irrigation water or 2) automatically based on a set inflection point on a curve of declining water, as shown in FIG. 2, step 19.

The nutritional components that were distributed by the computer fertigation controller were determined based on one or more seasonal nutritional plans for the selected crop, as can be shown in FIG. 3, step 22, along with the number of irrigation events per day based on past historical data of local temperature, humidity and other environmental factors, as shown in FIG. 3, step 23. Data from monitoring excess fertilizer amounts from chemical content sensors, as shown in FIG. 1, step 5, in water collection containers, as shown in FIG. 3, step 24, after each irrigation event was input into the software and used, along with the seasonal nutritional plan and the daily irrigation events, to calculate future nutrient levels for irrigation events. A signal was then sent to the computer fertigation controller to set the injection rates of fertilizer components for the next irrigation event, as shown in FIG. 3, step 25.

Once the data from the water and nutrient consumption sensors was analyzed the computer fertigation controller determined the amount of nutrients to be used in the next irrigation event. When needed, fertilizers were then transferred from holding tanks to various feeder and mixing tanks using variable rate injectors. In the fertigation room, as can be seen in FIG. 1, part 8, a feed tank supplied fertilizer and nutrients to a mixing tank in which the fertilizer was mixed with water from a water supply. Water for the fertigation controller was first run through a filter to remove particulates that may clog the irrigation system (e.g. Arkal Filtration Systems).

Analysis from the computer fertigation controller was used to determine the amount of fertilizers and nutrients from various containers to be injected into open top mixing containers directly into distribution lines. The open top containers were used to allow for optional hand mixing of additional materials that were not part of the standard fertilizer configuration. The containers were in communication with the computer fertigation controller in order to receive various solutions of feed formulas. The computer fertigation controller, in conjunction with the watering control system, used variable rate injectors (e.g. Walchem LK series metering pumps, Grundfos DME series diaphragm dosing pump, Vaccon venturi vacuum pumps, Netafim Fertijet) linked by a computer to deliver the desired levels of the additives to the water. Thus, the main water feed to the irrigation system was mixed with the calculated desired levels of fertilizers and nutrients needed by the plants. This variable rate injector was used to mix the calculated desired levels of fertilizers and nutrients as regulated by the computer fertigation controller. The use of stainless steel for components of the fertigation system is preferred but plastic components can be substituted.

In addition to adding nutritional components into the water the computer fertigation controller sent signals to cause air to be directly injected into the irrigation water. The added air has the beneficial effect of increasing the rate of chemical activity in the root zone and also making more oxygen directly available to the roots.

Drip emitters were situated along the irrigation, line which is a pipe, hose or conduit which delivers water and/or nutrient from the fertigation system to the base of plants under cultivation, as shown in FIG. 1, 1 and FIG. 4, part 27. Preferably a drip emitter was located at the base of a plant and to each side of the inside of the plant container. For example, for use with fruit trees, a drip emitter was placed at the base of the tree and to either side of the plant container in which the tree is planted. Alternatively, several drip emitters may surround the plant at various locations over the plant container. The drip emitter may simply be a small hole in the conduit through which liquid may slowly escape or a small tube running from the conduit and into the container.

While the present invention is directed to a computer controlled fertigation method, the fertigation may also be manually controlled. For instance, all of the data from the sensors may be manually recorded and then analyzed by hand. After the data from the sensors is analyzed the water and nutrients may then be mixed by hand in the open mixing tanks. The next irrigation event may then be started and stopped manually.

Example 3

Soil Moisture and Ion Level Sensor

In another embodiment of the current invention, a soil moisture sensor, the RS232 TriSCAN Probe, Easy AG TA2-30 3 Sensor from Sentek, is used to determine the volumetric ion content of the soil. The sensor provides real-time information on the total accumulated salts in the plant's container. This information is then used by the computer fertigation controller to determine how much additional water should be applied to the plant in order to flush out the excess salts. The soil moisture sensor tracks the volumetric ion content during irrigation events and stops the event when the ion levels drop to a certain level. Alternatively, a set of manual inputs can be made to set the level of additional water needed to perform the leach for specific ranges of observed light metric ion content.

Four sensors were also positioned in order to quantify the amount of water and/or nutrients that the plant consumed. The four sensors were used to measure: 1) the amount of water delivered to the plant; 2) the volume of excess water exiting from the plant; 3) the chemical content of the excess water from the plant; and 4) the total amount of water continuously available to the plant.

To measure the amount of water delivered to the plant, a sensor (for example, TB4-L Hydrological Services 8" Tipping Bucket Rain Gauge), as shown in FIG. 1, part 2 and FIG. 4, part 28, was stationed under a single set of drip emitters that deliver water to a single plant container. Alternatively, an in-line flow sensor could also be employed. The drip emitter is a device that is used on an irrigation line to transfer water to the area to be irrigated, as shown in FIG. 4, part 26, next to the plant container in FIG. 4 part 29. Netafim integrated drippers, pressure compensated on-line drippers or arrow drippers were used depending on the crop type grown. The sensor collected and measured the amount of water distributed from the drip emitter during watering events that provide water and/or nutrients to the neighboring plant.

Drip emitters were situated along the irrigation line which is a pipe, hose or conduit which delivers water and/or nutrient from the fertigation system to the base of plants under cultivation, as shown in FIG. 1, part 1 and FIG. 4, part 27. Preferably a drip emitter was located at the base of a plant and to each side of the plant. For example, for use with fruit trees, a drip emitter was placed at the base of the tree and to either side of the container in which the tree is planted. Alternatively, several drip emitters may surround the plant at various locations over the plant container. The drip emitter may simply be a small hole in the conduit through which liquid may slowly escape or a small tube running from the conduit and into the container.

Once it was determined how much water was being delivered to the plant, it was then determined how much water was actually being used by the plant. This was done by measuring the excess water or outflow of water from a plant container. The excess water, as shown in FIG. 5, part 30 was measured using a sensor, as shown in FIG. 1, part 3 and FIG. 5, part 31 that was placed under the container, FIG. 5, part 32. The sensor continuously collected water that was being emitted from the plant container.

Next, the real-time measurement of the amount of water that was available to the plant was measured. To obtain the real-time measurement of water available to the plant, a scale (Rice Lake IQ 355 Digital Weight Indicator with a 4-20 mA analog output), as shown in FIG. 1, part 4, and FIG. 6, part 33 was placed under a plant container, FIG. 6, part 34. The scale provided the real-time mass of the water available to the plant by first weighing the container, the plant and water together. The scale was recorded just prior to the next watering event and served as a basis of comparison for subsequent readings. From that point forward, the sensor calculated weight readings of the water continuously available or uninterrupted, and not the plant container system.

In order to accurately determine the amount of nutrients required by a plant, the amount of nutrients distributed in the irrigation water that were not taken up by the plant needed to be determined. To measure the nutrients another container, a collection container for receiving excess water from the plant container, was placed under a plant container, as can be seen in FIG. 7, part 35. The collection container, FIG. 1, part 5 under the plant container, FIG. 7, part 36 from the plant which allowed sensors, FIG. 7, part 37, to be placed in the collected water to measure the chemical content of the excess water. These sensors included including 31 Series or 35 Series— sealed polycarbonate pH electrode, 02 Series—epoxy body conductivity electrode, or 35 Series—ion selective electrodes (Analytical Sensors and Instruments, LTD) which measure levels of ammonium, calcium, cupric, nitrate, nitrite, potassium, sulphide. Alternatively, the chemical content could also be determined through standard laboratory test procedures and entered into a computer manually.

Once the data from sensors 1, 2, 3 and 4 were collected, as shown in FIG. 1, the data was then transferred to the computer fertigation controller, as shown in FIG. 1, part 6. Transferring the data from the sensors to the computer fertigation controller can be accomplished in a number of ways, either wireless or hard wired. Although SCADALink 900-MB Wireless RTU/Radiomodem (Bentek Systems) was used in this instance, any type of telemetry system that allows for the delivery of sensor-derived information from the field to a central computer or by way of fixed wires or optical cables is acceptable.

The computer fertigation controller, as shown in FIG. 1, part 7, was used to: 1) stop and start irrigation events, 2) adjust the injection rates of the various nutritional components that were added to the water, 3) test the physical and nutritional characteristics of the water being sent to the irrigation system, and 4) keep a digital record of all the information and parameters. Although the software that was used to manage this process was Wonderware (Invensys), any human-machine interaction software could be used in this process.

Once the data was sent to the computer fertigation controller, the computer fertigation controller software analyzed the data from the sensor that collected irrigation water from the drip emitter, as can be seen in FIG. 2, step 9 and the data from the sensor that collected excess water from the bottom of the container holding the plant, as shown in FIG. 3, step 10 by subtracting the excess water data from the irrigation water, as shown in FIG. 2, step 11. The result was the volume of water that was consumed by the plant, as shown in FIG. 2, step 12. The amount of water that was necessary to flush or leach out excess salts from the plant's container was then added to the analysis of the total amount of water used, as shown in FIG. 2, step 13. The amount of water used to flush or leach excess salts varies from crop to crop and by the season. When the amount of water used to flush or leach was added to the total volume consumed, as shown in FIG. 2, step 14, a signal was then sent from the computer fertigation controller to finalize the length of the next irrigation event, as shown in FIG. 2, step 15.

The data from the weighing scale measuring the amount of water that was available to the plant by measuring the real-time mass of the container, plant and water together was sent to the computer fertigation controller where the remaining water in the system was continuously measured, as shown in FIG. 3, step 20. The weighing scale provided the real-time mass of the water available to the plant by first weighing the container, the plant and water system, as shown in FIG. 2, step 16. The scale was then reset to zero prior to the next watering event, as shown in FIG. 2, step 17. From that point forward, the continuous mass readings from the scale were therefore only the mass of the water and not the mass of the container, plant and soil together. The computer fertigation controller was triggered to initiate an irrigation event by either 1) a predetermined trigger point, as shown in FIG. 2, step 18, based on a manually set percentage of irrigation water or 2) automatically based on a set inflection point on a curve of declining water, as shown in FIG. 2, step 19.

The nutritional components that were distributed by the computer fertigation controller were determined based on one or more seasonal nutritional plans for the selected crop, as can be shown in FIG. 3, step 22, along with the number of irrigation events per day based on past historical data of local temperature, humidity and other environmental factors, as shown in FIG. 3, step 23. Data from monitoring excess fertilizer amounts from chemical content sensors, as shown in FIG. 1, step 5, in water collection containers, as shown in FIG. 3, step 24, after each irrigation event was input into the software and used, along with the seasonal nutritional plan and the daily irrigation events, to calculate future nutrient levels for irrigation events. A signal was then sent to the computer fertigation controller to set the injection rates of fertilizer components for the next irrigation event, as shown in FIG. 3, step 25.

Once the data from the water and nutrient consumption sensors was analyzed the computer fertigation controller determined the amount of nutrients to be used in the next irrigation event. When needed, fertilizers were then transferred from holding tanks to various feeder and mixing tanks using variable rate injectors. In the fertigation room, as can be seen in FIG. 1, part 8, a feed tank supplied fertilizer and nutrients to a mixing tank in which the fertilizer was mixed with water from a water supply. Water for the fertigation controller was first run through a filter to remove particulates that may clog the irrigation system.

Analysis from the computer fertigation controller was used to determine the amount of fertilizers and nutrients from various containers to be injected into open top mixing containers directly into distribution lines. The open top containers were used to allow for optional hand mixing of additional materials that were not part of the standard fertilizer configuration. The containers were in communication with the computer fertigation controller in order to receive various solutions of feed formulas. The computer fertigation controller, in conjunction with the watering control system, used variable rate injectors (e.g. Walchem LK series metering pumps, Grundfos DME series diaphragm dosing pump, Vaccon venturi vacuum pumps, Netafim Fertijet) linked by a computer to deliver the desired levels of the additives to the water. Thus, the main water feed to the irrigation system was mixed with the calculated desired levels of fertilizers and nutrients needed by the plants. This variable rate injector was used to mix the calculated desired levels of fertilizers and nutrients as regulated by the computer fertigation controller. The use of stainless steel for components of the fertigation system is preferred but plastic components can be substituted.

In addition to adding nutritional components into the water the computer fertigation controller sent signals to cause air to be directly injected into the irrigation water. The added air has the beneficial effect of increasing the rate of chemical activity in the root zone and also making more oxygen directly available to the roots.

Drip emitters were situated along the irrigation, line which is a pipe, hose or conduit which delivers water and/or nutrient from the fertigation system to the base of plants under cultivation, as shown in FIG. 1, 1 and FIG. 4, part 27. Preferably a drip emitter was located at the base of a plant and to either side of the inside of the plant container. For example, for use with fruit trees, a drip emitter was placed at the base of the tree and to either side of the plant container in which the tree is planted. Alternatively, several drip emitters may surround the plant at various locations over the plant container. The drip emitter may simply be a small hole in the conduit through which liquid may slowly escape or a small tube running from the conduit and into the container.

While the present invention is directed to a computer controlled fertigation method, the fertigation may also be manually controlled. For instance, all of the data from the sensors may be manually recorded and then analyzed by hand. After the data from the sensors is analyzed the water and nutrients may then be mixed by hand in the open mixing tanks. The next irrigation event may then be started and stopped manually.

Example 4

Fruit and Stem Diameter Sensors

In another embodiment of the current invention, highly precise incremental sensors, such as the FI-XSM, FI-SM, FI-MM, FI-LM, SD-5M, SD-6M or the DE-1M from PhyTech, were used to monitor stem and fruit diameter along with the sensors for measuring water and nutrient consumption to provide an additional perspective on a plant's physiological response to available water.

Stem and fruit diameter sensors are used with additional sensors of the present invention or in place of the scale. In one embodiment, rather than tracking the declining mass of water in a plant's container with a scale, the computer fertigation controller charts the volume of water in the soil indirectly through changes in the physical response of the plant the availability of water to the root system. When the stem or fruit diameter starts to drop in response to a diminished water supply the computer sends out the signal to initiate the next watering event.

Data from the stem or fruit diameter sensor is used in the same manner as the data from the scale. The data from the stem or fruit diameter sensor is used as a supplement or serves as a secondary input to the data from the scale. The stem and fruit diameter sensors also serve as a backup system to ensure that good data is being sent to the computer fertigation controller on the available plant water.

Stem and fruit diameter sensors also provide data for graphs that are useful for detecting additional plant stresses along with loss of water. A drop in stem and fruit diameters has been associated with pest infestations, even before the pest issue was visible in the field.

Stem and fruit diameter sensors are a reasonable alternative method of obtaining real-time information on plant water usage. While there is a strong linear relationship between stem and fruit diameter and available water, there is also a time delay between the loss of water to the root system and the plant's response to the loss. This time delay increases as the distance from the root to the location of the sensor is increased, and also becomes dependent on the general transport characteristics of the plant.

Table 7 shows the plant trunk diameter measured in millimeters at various times during one day. Table 7 shows that the trunk diameter fluctuates based on the amount of water available to the plant. The table also shows that the trunk diameter steadily decreases as the amount of water available to the plant decreases. Column 1 of Table 7 shows the date, column 2 shows the time and column 3 shows the diameter of the plant trunk in millimeters.

TABLE 7

| Date | Time | Plant trunk diameter (mm) |
| --- | --- | --- |
| Jan. 20, 2007 | 8:25 AM | 2.6698 |
| Jan. 20, 2007 | 8:37 AM | 2.6751 |
| Jan. 20, 2007 | 8:49 AM | 2.6789 |
| Jan. 20, 2007 | 9:01 AM | 2.6808 |
| Jan. 20, 2007 | 9:13 AM | 2.6823 |
| Jan. 20, 2007 | 9:25 AM | 2.6827 |
| Jan. 20, 2007 | 9:36 AM | 2.68 |
| Jan. 20, 2007 | 9:48 AM | 2.6789 |
| Jan. 20, 2007 | 10:00 AM | 2.6728 |
| Jan. 20, 2007 | 10:12 AM | 2.6698 |
| Jan. 20, 2007 | 10:24 AM | 2.666 |
| Jan. 20, 2007 | 10:35 AM | 2.661 |
| Jan. 20, 2007 | 10:48 AM | 2.6607 |
| Jan. 20, 2007 | 10:59 AM | 2.6588 |
| Jan. 20, 2007 | 11:11 AM | 2.6535 |
| Jan. 20, 2007 | 11:23 AM | 2.6516 |
| Jan. 20, 2007 | 11:35 AM | 2.647 |
| Jan. 20, 2007 | 11:46 AM | 2.6443 |
| Jan. 20, 2007 | 11:58 AM | 2.6417 |
| Jan. 20, 2007 | 12:10 AM | 2.6409 |
| Jan. 20, 2007 | 12:22 AM | 2.6394 |
| Jan. 20, 2007 | 12:34 AM | 2.6387 |
| Jan. 20, 2007 | 12:46 AM | 2.6364 |
| Jan. 20, 2007 | 12:57 AM | 2.6356 |
| Jan. 20, 2007 | 1:09 PM | 2.6352 |
| Jan. 20, 2007 | 1:21 PM | 2.6326 |
| Jan. 20, 2007 | 1:33 PM | 2.633 |
| Jan. 20, 2007 | 1:45 PM | 2.6333 |
| Jan. 20, 2007 | 1:57 PM | 2.633 |
| Jan. 20, 2007 | 2:08 PM | 2.6303 |

TABLE 7-continued

| Date | Time | Plant trunk diameter (mm) |
| --- | --- | --- |
| Jan. 20, 2007 | 2:20 PM | 2.628 |
| Jan. 20, 2007 | 2:32 PM | 2.6276 |

Four sensors were also positioned in order to quantify the amount of water and/or nutrients that the plant consumed. The four sensors were used to measure: 1) the amount of water delivered to the plant; 2) the volume of excess water exiting from the plant; 3) the chemical content of the excess water from the plant; and 4) the total amount of water continuously available to the plant.

To measure the amount of water delivered to the plant, a sensor (for example, TB4-L Hydrological Services 8" Tipping Bucket Rain Gauge), as shown in FIG. 1, part 2 and FIG. 4, part 28, was stationed under a single set of drip emitters that deliver water to a single plant container. Alternatively, an in-line flow sensor could also be employed. The drip emitter is a device that is used on an irrigation line to transfer water to the area to be irrigated, as shown in FIG. 4, part 26, next to the plant container in FIG. 4 part 29. Netafim integrated drippers, pressure compensated on-line drippers or arrow drippers were used depending on the crop type grown. The sensor collected and measured the amount of water distributed from the drip emitter during watering events that provide water and/or nutrients to the neighboring plant.

Drip emitters were situated along the irrigation line which is a pipe, hose or conduit which delivers water and/or nutrient from the fertigation system to the base of plants under cultivation, as shown in FIG. 1, part 1 and FIG. 4, part 27. Preferably a drip emitter was located at the base of a plant and to each side of the plant. For example, for use with fruit trees, a drip emitter was placed at the base of the tree and to either side of the container in which the tree is planted. Alternatively, several drip emitters may surround the plant at various locations over the plant container. The drip emitter may simply be a small hole in the conduit through which liquid may slowly escape or a small tube running from the conduit and into the container.

Once it was determined how much water was being delivered to the plant, it was then determined how much water was actually being used by the plant. This was done by measuring the excess water or outflow of water from a plant container. The excess water, as shown in FIG. 5, part 30 was measured using a sensor, as shown in FIG. 1, part 3 and FIG. 5, part 31 that was placed under the container, FIG. 5, part 32. The sensor continuously collected water that was being emitted from the plant container.

Next, the real-time measurement of the amount of water that was available to the plant was measured. To obtain the real-time measurement of water available to the plant, a scale (Rice Lake IQ 355 Digital Weight Indicator with a 4-20 mA analog output), as shown in FIG. 1, part 4, and FIG. 6, part 33 was placed under a plant container, FIG. 6, part 34. The scale provided the real-time mass of the water available to the plant by first weighing the container, the plant and water system together. The scale was recorded just prior to the next watering event and served as a basis of comparison for subsequent readings. From that point forward, the sensor calculated weight readings of the water continuously available or uninterrupted, and not the plant container system.

In order to accurately determine the amount of nutrients required by a plant, the amount of nutrients distributed in the irrigation water that were not taken up by the plant needed to be determined. To measure the nutrients another container, a collection container for receiving excess water from the plant container, was placed under a plant container, as can be seen in FIG. 7, part 35. The collection container, FIG. 1, part 5 under the plant container, FIG. 7, part 36 from the plant which allowed sensors, FIG. 7, part 37, to be placed in the collected water to measure the chemical content of the excess water. These sensors included including 31 Series or 35 Series—sealed polycarbonate pH electrode, 02 Series—epoxy body conductivity electrode, or 35 Series—ion selective electrodes (Analytical Sensors and Instruments, LTD) which measure levels of ammonium, calcium, cupric, nitrate, nitrite, potassium, sulphide. Alternatively, the chemical content could also be determined through standard laboratory test procedures and entered into a computer manually.

Once the data from sensors 1, 2, 3 and 4 were collected, as shown in FIG. 1, the data was then transferred to the computer fertigation controller, as shown in FIG. 1, part 6. Transferring the data from the sensors to the computer fertigation controller can be accomplished in a number of ways, either wireless or hard wired. Although SCADALink 900-MB Wireless RTU/Radiomodem (Bentek Systems) was used in this instance, any type of telemetry system that allows for the delivery of sensor-derived information from the field to a central computer or by way of fixed wires or optical cables is acceptable.

The computer fertigation controller, as shown in FIG. 1, part 7, was used to: 1) stop and start irrigation events, 2) adjust the injection rates of the various nutritional components that were added to the water, 3) test the physical and nutritional characteristics of the water being sent to the irrigation system, and 4) keep a digital record of all the information and parameters. Although the software that was used to manage this process was Wonderware (Invensys), any human-machine interaction software could be used in this process.

Once the data was sent to the computer fertigation controller, the computer fertigation controller software analyzed the data from the sensor that collected irrigation water from the drip emitter, as can be seen in FIG. 2, step 9 and the data from the sensor that collected excess water from the bottom of the container holding the plant, as shown in FIG. 3, step 10 by subtracting the excess water data from the irrigation water, as shown in FIG. 2, step 11. The result was the volume of water that was consumed by the plant, as shown in FIG. 2, step 12. The amount of water that was necessary to flush or leach out excess salts from the plant's container was then added to the analysis of the total amount of water used, as shown in FIG. 2, step 13. The amount of water used to flush or leach excess salts varies from crop to crop and by the season. When the amount of water used to flush or leach was added to the total volume consumed, as shown in FIG. 2, step 14, a signal was then sent from the computer fertigation controller to finalize the length of the next irrigation event, as shown in FIG. 2, step 15.

The data from the weighing scale measuring the amount of water that was available to the plant by measuring the real-time mass of the container, plant and water together was sent to the computer fertigation controller where the remaining water in the system was continuously measured, as shown in FIG. 3, step 20. The weighing scale provided the real-time mass of the water available to the plant by first weighing the container, the plant and water system, as shown in FIG. 2, step 16. The digital scale was then reset to zero prior to the next watering event, as shown in FIG. 2, step 17. From that point forward, the continuous mass readings from the scale were therefore only the mass of the water and not the mass of the container, plant and soil together. The computer fertigation controller was triggered to initiate an irrigation event by either 1) a predetermined trigger point, as shown in FIG. 2, step 18, based on a manually set percentage of irrigation water or 2) automatically based on a set inflection point on a curve of declining water, as shown in FIG. 2, step 19.

The nutritional components that were distributed by the computer fertigation controller were determined based on one or more seasonal nutritional plans for the selected crop, as can be shown in FIG. 3, step 22, along with the number of irrigation events per day based on past historical data of local temperature, humidity and other environmental factors, as shown in FIG. 3, step 23. Data from monitoring excess fertilizer amounts from chemical content sensors, as shown in FIG. 1, step 5, in water collection containers, as shown in FIG. 3, step 24, after each irrigation event was input into the software and used, along with the seasonal nutritional plan and the daily irrigation events, to calculate future nutrient levels for irrigation events. A signal was then sent to the computer fertigation controller to set the injection rates of fertilizer components for the next irrigation event, as shown in FIG. 3, step 25.

Once the data from the water and nutrient consumption sensors was analyzed the computer fertigation controller determined the amount of nutrients to be used in the next irrigation event. When needed, fertilizers were then transferred from holding tanks to various feeder and mixing tanks using variable rate injectors. In the fertigation room, as can be seen in FIG. 1, part 8, a feed tank supplied fertilizer and nutrients to a mixing tank in which the fertilizer was mixed with water from a water supply. Water for the fertigation controller was first run through a filter to remove particulates that may clog the irrigation system (e.g. Arkal Filtration Systems).

Analysis from the computer fertigation controller was used to determine the amount of fertilizers and nutrients from various containers to be injected into open top mixing containers directly into distribution lines. The open top containers were used to allow for optional hand mixing of additional materials that were not part of the standard fertilizer configuration. The containers were in communication with the computer fertigation controller in order to receive various solutions of feed formulas. The computer fertigation controller, in conjunction with the watering control system, used variable rate injectors (e.g. Walchem LK series metering pumps, Grundfos DME series diaphragm dosing pump, Vaccon venturi vacuum pumps, Netafim Fertijet) linked by a computer to deliver the desired levels of the additives to the water. Thus, the main water feed to the irrigation system was mixed with the calculated desired levels of fertilizers and nutrients needed by the plants. This variable rate injector was used to mix the calculated desired levels of fertilizers and nutrients as regulated by the computer fertigation controller. The use of stainless steel for components of the fertigation system is preferred but plastic components can be substituted.

In addition to adding nutritional components into the water the computer fertigation controller sent signals to cause air to be directly injected into the irrigation water. The added air has the beneficial effect of increasing the rate of chemical activity in the root zone and also making more oxygen directly available to the roots.

Drip emitters were situated along the irrigation, line which is a pipe, hose or conduit which delivers water and/or nutrient from the fertigation system to the base of plants under cultivation, as shown in FIG. 1, 1 and FIG. 4, part 27. Preferably a drip emitter was located at the base of a plant and to each side of the inside of the plant container. For example, for use with fruit trees, a drip emitter was placed at the base of the tree and to either side of the plant container in which the tree is planted. Alternatively, several drip emitters may surround the plant at various locations over the plant container. The drip emitter may simply be a small hole in the conduit through which liquid may slowly escape or a small tube running from the conduit and into the container.

While the present invention is directed to a computer controlled fertigation method, the fertigation may also be manually controlled. For instance, all of the data from the sensors may be manually recorded and then analyzed by hand. After the data from the sensors is analyzed the water and nutrients may then be mixed by hand in the open mixing tanks. The next irrigation event may then be started and stopped manually.

Example 5

Leaf Temperature Sensors

In another embodiment of the current invention, leaf temperature sensors, (For example, LT-2M sensors from PhyTech), were used along with the sensors for measuring water and nutrient consumption to provide an additional perspective on a plant's physiological response to available water.

Plant transpiration is primarily a function of water evaporating through the stomata located on the lower surfaces of leaves. As water evaporates through the stomata it also has the effect of slightly lowering the temperature of the underside of the leaf. Leaf temperature sensors located on the upper and lower surfaces of a leaf provide highly accurate temperature readings with minimal influence to the thermal conditions of a leaf. As the amount of water available to a plant decreases, the smaller the temperature difference between the upper and lower surfaces of the leaf which indicates a water deficiency in the plant.

The leaf temperature sensors are used with additional sensors of the present invention or are used in place of the weighing scale. Rather than tracking the declining mass of water in a plant's container with a scale, the computer fertigation controller can use the data from the leaf temperature sensors to chart the decreasing temperature difference between the upper and lower surfaces of a leaf. When the temperature differences reach a predetermined threshold for a given crop the computer sends out the command to initiate the next watering event.

Leaf temperature sensors are used in the same manner as the data from the scale. When used as a supplemental sensor the leaf temperature data serves as a secondary input to the data from the scale. This serves as a backup system to ensure that good data is always available to the computer fertigation controller on available plant water.

The method of using leaf temperature sensors is a less costly method than other methods of obtaining real-time information on plant water. The drop in temperature due to decreasing transpiration creates a real time delay between loss of water at the roots and the subsequent physiological response at the leaves. The real time delay is enhanced as the distance from the root to leaf increases as well as the general transport characteristics of the plant.

Table 8 shows the leaf temperature of the upper and lower surface of the leaf in degrees Fahrenheit. Column 1 of Table 8 shows the date of the measurement, column 2 shows the time of the temperature measurement, column 3 shows the temperature of the upper surface of the leaf in degrees Fahrenheit, column 4 shows the temperature of the lower surface of the leaf in degrees Fahrenheit and column 5 shows the temperature difference between the upper and lower surfaces.

TABLE 8

LEAF TEMPERATURE

| Date | Time | Upper Surface Leaf temperature (F.) | Lower Surface Leaf temperature (F.) | Temperature Difference |
|---|---|---|---|---|
| Oct. 9, 2006 | 6:19 AM | 63.8 | 63.7 | 0.1 |
| Oct. 9, 2006 | 6:34 AM | 64.2 | 64.1 | 0.1 |
| Oct. 9, 2006 | 6:49 AM | 65.0 | 64.0 | 1.0 |
| Oct. 9, 2006 | 7:05 AM | 65.0 | 64.2 | 0.8 |
| Oct. 9, 2006 | 7:20 AM | 67.1 | 66.8 | 0.3 |
| Oct. 9, 2006 | 7:35 AM | 69.3 | 69.0 | 0.3 |
| Oct. 9, 2006 | 7:50 AM | 71.3 | 71.2 | 0.1 |
| Oct. 9, 2006 | 8:06 AM | 75.7 | 75.4 | 0.3 |
| Oct. 9, 2006 | 8:21 AM | 77.8 | 77.5 | 0.3 |
| Oct. 9, 2006 | 8:36 AM | 80.5 | 80.3 | 0.2 |
| Oct. 9, 2006 | 8:51 AM | 85.0 | 84.6 | 0.4 |
| Oct. 9, 2006 | 9:06 AM | 85.1 | 84.9 | 0.2 |
| Oct. 9, 2006 | 9:22 AM | 87.8 | 86.7 | 1.1 |
| Oct. 9, 2006 | 9:37 AM | 103.4 | 102.8 | 0.6 |
| Oct. 9, 2006 | 9:52 AM | 94.3 | 91.8 | 2.5 |
| Oct. 9, 2006 | 10:07 AM | 96.8 | 92.7 | 4.1 |
| Oct. 9, 2006 | 10:22 AM | 99.0 | 94.8 | 4.2 |
| Oct. 9, 2006 | 10:38 AM | 103.5 | 99.2 | 4.3 |
| Oct. 9, 2006 | 10:53 AM | 96.0 | 93.7 | 2.3 |
| Oct. 9, 2006 | 11:08 AM | 92.7 | 92.7 | 0.0 |
| Oct. 9, 2006 | 11:23 AM | 94.9 | 94.6 | 0.3 |
| Oct. 9, 2006 | 11:38 AM | 95.1 | 94.5 | 0.6 |
| Oct. 9, 2006 | 11:54 AM | 96.4 | 95.9 | 0.5 |
| Oct. 9, 2006 | 12:09 PM | 97.2 | 96.6 | 0.6 |
| Oct. 9, 2006 | 12:24 PM | 96.2 | 96.1 | 0.1 |
| Oct. 9, 2006 | 12:39 PM | 96.8 | 96.5 | 0.3 |
| Oct. 9, 2006 | 12:55 PM | 98.0 | 97.6 | 0.4 |
| Oct. 9, 2006 | 1:10 PM | 98.5 | 97.9 | 0.6 |
| Oct. 9, 2006 | 1:25 PM | 99.8 | 99.4 | 0.4 |
| Oct. 9, 2006 | 1:40 PM | 100.0 | 99.4 | 0.6 |
| Oct. 9, 2006 | 1:55 PM | 99.5 | 99.4 | 0.1 |

Sensors were also positioned in order to quantify the amount of water and/or nutrients that the plant consumed. The sensors were used to measure: 1) the amount of water delivered to the plant; 2) the volume of excess water exiting from the plant; 3) the chemical content of the excess water from the plant; and 4) the total amount of water continuously available to the plant.

To measure the amount of water delivered to the plant, a sensor (for example, TB4-L Hydrological Services 8" Tipping Bucket Rain Gauge), as shown in FIG. 1, part 2 and FIG. 4, part 28, was stationed under a single set of drip emitters that deliver water to a single plant container. Alternatively, an in-line flow sensor could also be employed. The drip emitter is a device that is used on an irrigation line to transfer water to the area to be irrigated, as shown in FIG. 4, part 26, next to the plant container in FIG. 4 part 29. Netafim integrated drippers, pressure compensated on-line drippers or arrow drippers were used depending on the crop type grown. The sensor collected and measured the amount of water distributed from the drip emitter during watering events that provide water and/or nutrients to the neighboring plant.

Drip emitters were situated along the irrigation line which is a pipe, hose or conduit which delivers water and/or nutrient from the fertigation system to the base of plants under cultivation, as shown in FIG. 1, part 1 and FIG. 4, part 27. Preferably a drip emitter was located at the base of a plant and to each side of the plant. For example, for use with fruit trees, a drip emitter was placed at the base of the tree and to either side of the container in which the tree is planted. Alternatively, several drip emitters may surround the plant at various locations over the plant container. The drip emitter may simply be a small hole in the conduit through which liquid may slowly escape or a small tube running from the conduit and into the container.

Once it was determined how much water was being delivered to the plant, it was then determined how much water was actually being used by the plant. This was done by measuring the excess water or outflow of water from a plant container. The excess water, as shown in FIG. 5, part 30 was measured using a sensor, as shown in FIG. 1, part 3 and FIG. 5, part 31 that was placed under the container, FIG. 5, part 32. The sensor continuously collected water that was being emitted from the plant container.

Next, the real-time measurement of the amount of water that was available to the plant was measured. To obtain the real-time measurement of water available to the plant, a scale (Rice Lake IQ 355 Digital Weight Indicator with a 4-20 mA analog output), as shown in FIG. 1, part 4, and FIG. 6, part 33 was placed under a plant container, FIG. 6, part 34. The scale provided the real-time mass of the water available to the plant by first weighing the container, the plant and water system together. The scale was recorded just prior to the next watering event and served as a basis of comparison for subsequent readings. From that point forward, the sensor calculated weight readings of the water continuously available or uninterrupted, and not the plant container system.

In order to accurately determine the amount of nutrients required by a plant, the amount of nutrients distributed in the irrigation water that were not taken up by the plant needed to be determined. To measure the nutrients another container, a collection container for receiving excess water from the plant container, was placed under a plant container, as can be seen in FIG. 7, part 35. The collection container, FIG. 1, part 5 under the plant container, FIG. 7, part 36 from the plant which allowed sensors, FIG. 7, part 37, to be placed in the collected water to measure the chemical content of the excess water. These sensors included including 31 Series or 35 Series—sealed polycarbonate pH electrode, 02 Series—epoxy body conductivity electrode, or 35 Series—ion selective electrodes (Analytical Sensors and Instruments, LTD) which measure levels of ammonium, calcium, cupric, nitrate, nitrite, potassium, sulphide. Alternatively, the chemical content could also be determined through standard laboratory test procedures and entered into a computer manually.

Once the data from sensors 1, 2, 3 and 4 were collected, as shown in FIG. 1, the data was then transferred to the computer fertigation controller, as shown in FIG. 1, part 6. Transferring the data from the sensors to the computer fertigation controller can be accomplished in a number of ways, either wireless or hard wired. Although SCADALink 900-MB Wireless RTU/Radiomodem (Bentek Systems) was used in this instance, any type of telemetry system that allows for the delivery of sensor-derived information from the field to a central computer or by way of fixed wires or optical cables is acceptable.

The computer fertigation controller, as shown in FIG. 1, part 7, was used to: 1) stop and start irrigation events, 2) adjust the injection rates of the various nutritional components that were added to the water, 3) test the physical and nutritional characteristics of the water being sent to the irrigation system, and 4) keep a digital record of all the information and parameters. Although the software that was used to manage this process was Wonderware (Invensys), any human-machine interaction software could be used in this process.

Once the data was sent to the computer fertigation controller, the computer fertigation controller software analyzed the data from the sensor that collected irrigation water from the drip emitter, as can be seen in FIG. 2, step 9 and the data from the sensor that collected excess water from the bottom of the container holding the plant, as shown in FIG. 3, step 10 by subtracting the excess water data from the irrigation water, as shown in FIG. 2, step 11. The result was the volume of water that was consumed by the plant, as shown in FIG. 2, step 12. The amount of water that was necessary to flush or leach out excess salts from the plant's container was then added to the analysis of the total amount of water used, as shown in FIG. 2, step 13. The amount of water used to flush or leach excess salts varies from crop to crop and by the season. When the amount of water used to flush or leach was added to the total volume consumed, as shown in FIG. 2, step 14, a signal was then sent from the computer fertigation controller to finalize the length of the next irrigation event, as shown in FIG. 2, step 15.

The data from the weighing scale measuring the amount of water that was available to the plant by measuring the real-time mass of the container, plant and water together was sent to the computer fertigation controller where the remaining water in the system was continuously measured, as shown in FIG. 3, step 20. The weighing scale provided the real-time mass of the water available to the plant by first weighing the container, the plant and water system, as shown in FIG. 2, step 16. The scale was then reset to zero prior to the next watering event, as shown in FIG. 2, step 17. From that point forward, the continuous mass readings from the scale were therefore only the mass of the water and not the mass of the container, plant and soil together. The computer fertigation controller was triggered to initiate an irrigation event by either 1) a predetermined trigger point, as shown in FIG. 2, step 18, based on a manually set percentage of irrigation water or 2) automatically based on a set inflection point on a curve of declining water, as shown in FIG. 2, step 19.

The nutritional components that were distributed by the computer fertigation controller were determined based on one or more seasonal nutritional plans for the selected crop, as can be shown in FIG. 3, step 22, along with the number of irrigation events per day based on past historical data of local temperature, humidity and other environmental factors, as shown in FIG. 3, step 23. Data from monitoring excess fertilizer amounts from chemical content sensors, as shown in FIG. 1, step 5, in water collection containers, as shown in FIG. 3, step 24, after each irrigation event was input into the software and used, along with the seasonal nutritional plan and the daily irrigation events, to calculate future nutrient levels for irrigation events. A signal was then sent to the computer fertigation controller to set the injection rates of fertilizer components Once the data from the water and nutrient consumption sensors was analyzed the computer fertigation controller determined the amount of nutrients to be used in the next irrigation event. When needed, fertilizers were then transferred from holding tanks to various feeder and mixing tanks using variable rate injectors. In the fertigation room, as can be seen in FIG. 1, part 8, a feed tank supplied fertilizer and nutrients to a mixing tank in which the fertilizer was mixed with water from a water supply. Water for the fertigation controller was first run through a filter to remove particulates that may clog the irrigation system.

Analysis from the computer fertigation controller was used to determine the amount of fertilizers and nutrients from various containers to be injected into open top mixing containers directly into distribution lines. The open top containers were used to allow for optional hand mixing of additional materials that were not part of the standard fertilizer configuration. The containers were in communication with the computer fertigation controller in order to receive various solutions of feed formulas. The computer fertigation controller, in conjunction with the watering control system, used variable rate injectors (e.g. Walchem LK series metering pumps, Grundfos DME series diaphragm dosing pump, Vaccon venturi vacuum pumps, Netafim Fertijet) linked by a computer to deliver the desired levels of the additives to the water. Thus, the main water feed to the irrigation system was mixed with the calculated desired levels of fertilizers and nutrients needed by the plants. This variable rate injector was used to mix the calculated desired levels of fertilizers and nutrients as regulated by the computer fertigation controller. The use of stainless steel for components of the fertigation system is preferred but plastic components can be substituted.

In addition to adding nutritional components into the water the computer fertigation controller sent signals to cause air to be directly injected into the irrigation water. The added air has the beneficial effect of increasing the rate of chemical activity in the root zone and also making more oxygen directly available to the roots.

Drip emitters were situated along the irrigation, line which is a pipe, hose or conduit which delivers water and/or nutrient from the fertigation system to the base of plants under cultivation, as shown in FIG. 1, 1 and FIG. 4, part 27. Preferably a drip emitter was located at the base of a plant and to each side of the inside of the plant container. For example, for use with fruit trees, a drip emitter was placed at the base of the tree and to either side of the plant container in which the tree is planted. Alternatively, several drip emitters may surround the plant at various locations over the plant container. The drip emitter may simply be a small hole in the conduit through which liquid may slowly escape or a small tube running from the conduit and into the container.

While the present invention is directed to a computer controlled fertigation method, the fertigation may also be manually controlled. For instance, all of the data from the sensors may be manually recorded and then analyzed by hand. After the data from the sensors is analyzed the water and nutrients may then be mixed by hand in the open mixing tanks. The next irrigation event may then be started and stopped manually.

Example 6

Relative-Rate Sap Flow Sensors

In another embodiment of the current invention, a relative-rate sap flow sensor, specifically the SF8M, SF-4M or SF-5M sensor, was used to monitor a plant's physiological response to water along with the use of scales to measure water and nutrient consumption by the plant.

Relative-rate sap sensors apply an external heat pulse to a leaf petiole, stem or trunk, then use a sensitive thermometer placed at a fixed distance above the heat source. By measuring the length of time it takes for the heated sap inside the plant to reach the thermometer location, an accurate sap flow rate can be calculated. Since sapflow is highly correlated to water consumption this measure provides a very good indication of how much water is available to the plant from its root zone.

Relative-rate sap flow sensors are used with additional sensors of the present invention or are used in place of the weighing scale. Rather than tracking the declining mass of water in a plant's container with a scale as previously described, this system charts the changing volume of water moving through the plant in the form of sap. This movement is directly related to the availability of water to the root system. When the sensor detects that the relative-rate of the sap flow in the plant begins to decrease, the computer sends out a signal to initiate the next watering event.

Data from the relative-rate sap flow sensor is also used in the same manner as data from the scale. When used as a supplement, the relative-rate sap flow data serves as secondary input to the data from the scale. This serves as a backup system to ensure that there is always good data being sent to the computer fertigation controller on available plant water.

The relative-rate sap flow sensor is a valid backup to the scale to provide data concerning the amount of water available to the plant. There is a strong linear relationship between relative-rate sap flow and available water. However, there is also a time delay between the loss of water to the root system and the plant's response to the loss.

Sensors were also positioned in order to quantify the amount of water and/or nutrients that the plant consumed. The sensors were used to measure: 1) the amount of water delivered to the plant; 2) the volume of excess water exiting from the plant; 3) the chemical content of the excess water from the plant; and 4) the total amount of water continuously available to the plant.

To measure the amount of water delivered to the plant, a sensor (for example, TB4-L Hydrological Services 8" Tipping Bucket Rain Gauge), as shown in FIG. 1, part 2 and FIG. 4, part 28, was stationed under a single set of drip emitters that deliver water to a single plant container. Alternatively, an in-line flow sensor could also be employed. The drip emitter is a device that is used on an irrigation line to transfer water to the area to be irrigated, as shown in FIG. 4, part 26, next to the plant container in FIG. 4 part 29. Netafim integrated drippers, pressure compensated on-line drippers or arrow drippers were used depending on the crop type grown. The sensor collected and measured the amount of water distributed from the drip emitter during watering events that provide water and/or nutrients to the neighboring plant.

Drip emitters were situated along the irrigation line which is a pipe, hose or conduit which delivers water and/or nutrient from the fertigation system to the base of plants under cultivation, as shown in FIG. 1, part 1 and FIG. 4, part 27. Preferably a drip emitter was located at the base of a plant and to each side of the plant. For example, for use with fruit trees, a drip emitter was placed at the base of the tree and to either side of the container in which the tree is planted. Alternatively, several drip emitters may surround the plant at various locations over the plant container. The drip emitter may simply be a small hole in the conduit through which liquid may slowly escape or a small tube running from the conduit and into the container.

Once it was determined how much water was being delivered to the plant, it was then determined how much water was actually being used by the plant. This was done by measuring the excess water or outflow of water from a plant container. The excess water, as shown in FIG. 5, part 30 was measured using a sensor, as shown in FIG. 1, part 3 and FIG. 5, part 31 that was placed under the container, FIG. 5, part 32. The sensor continuously collected water that was being emitted from the plant container.

Next, the real-time measurement of the amount of water that was available to the plant was measured. To obtain the real-time measurement of water available to the plant, a scale (Rice Lake IQ 355 Digital Weight Indicator with a 4-20 mA analog output), as shown in FIG. 1, part 4, and FIG. 6, part 33 was placed under a plant container, FIG. 6, part 34. The scale provided the real-time mass of the water available to the plant by first weighing the container, the plant and water system together. The scale was recorded just prior to the next watering event and served as a basis of comparison for subsequent readings. From that point forward, the sensor calculated weight readings of the water continuously available or uninterrupted, and not the plant container system.

In order to accurately determine the amount of nutrients required by a plant, the amount of nutrients distributed in the irrigation water that were not taken up by the plant needed to be determined. To measure the nutrients another container, a collection container for receiving excess water from the plant container, was placed under a plant container, as can be seen in FIG. 7, part 35. The collection container, FIG. 1, part 5 under the plant container, FIG. 7, part 36 from the plant which allowed sensors, FIG. 7, part 37, to be placed in the collected water to measure the chemical content of the excess water. These sensors included including 31 Series or 35 Series—sealed polycarbonate pH electrode, 02 Series—epoxy body conductivity electrode, or 35 Series—ion selective electrodes (Analytical Sensors and Instruments, LTD) which measure levels of ammonium, calcium, cupric, nitrate, nitrite, potassium, sulphide. Alternatively, the chemical content could also be determined through standard laboratory test procedures and entered into a computer manually.

Once the data from sensors 1, 2, 3 and 4 were collected, as shown in FIG. 1, the data was then transferred to the computer fertigation controller, as shown in FIG. 1, part 6. Transferring the data from the sensors to the computer fertigation controller can be accomplished in a number of ways, either wireless or hard wired. Although SCADALink 900-MB Wireless RTU/Radiomodem (Bentek Systems) was used in this instance, any type of telemetry system that allows for the delivery of sensor-derived information from the field to a central computer or by way of fixed wires or optical cables is acceptable.

The computer fertigation controller, as shown in FIG. 1, part 7, was used to: 1) stop and start irrigation events, 2) adjust the injection rates of the various nutritional components that were added to the water, 3) test the physical and nutritional characteristics of the water being sent to the irrigation system, and 4) keep a digital record of all the information and parameters. Although the software that was used to manage this process was Wonderware (Invensys), any human-machine interaction software could be used in this process.

Once the data was sent to the computer fertigation controller, the computer fertigation controller software analyzed the data from the sensor that collected irrigation water from the drip emitter, as can be seen in FIG. 2, step 9 and the data from the sensor that collected excess water from the bottom of the container holding the plant, as shown in FIG. 3, step 10 by subtracting the excess water data from the irrigation water, as shown in FIG. 2, step 11. The result was the volume of water that was consumed by the plant, as shown in FIG. 2, step 12. The amount of water that was necessary to flush or leach out excess salts from the plant's container was then added to the analysis of the total amount of water used, as shown in FIG. 2, step 13. The amount of water used to flush or leach excess salts varies from crop to crop and by the season. When the amount of water used to flush or leach was added to the total volume consumed, as shown in FIG. 2, step 14, a signal was then sent from the computer fertigation controller to finalize the length of the next irrigation event, as shown in FIG. 2, step 15.

The data from the weighing scale measuring the amount of water that was available to the plant by measuring the real-time mass of the container, plant and water together was sent to the computer fertigation controller where the remaining water in the system was continuously measured, as shown in FIG. 3, step 20. The scale provided the real-time mass of the water available to the plant by first weighing the container, the plant and water system, as shown in FIG. 2, step 16. The scale was then reset to zero prior to the next watering event, as shown in FIG. 2, step 17. From that point forward, the continuous mass readings from the scale were therefore only the mass of the water and not the mass of the container, plant and soil together. The computer fertigation controller is triggered to initiate an irrigation event by either 1) a predetermined trigger point, as shown in FIG. 2, step 18, based on a manually set percentage of irrigation water or 2) automatically based on a set inflection point on a curve of declining water, as shown in FIG. 2, step 19.

The nutritional components that were distributed by the computer fertigation controller were determined based on one or more seasonal nutritional plans for the selected crop, as can be shown in FIG. 3, step 22, along with the number of irrigation events per day based on past historical data of local temperature, humidity and other environmental factors, as shown in FIG. 3, step 23. Data from monitoring excess fertilizer amounts from chemical content sensors, as shown in FIG. 1, step 5, in water collection containers, as shown in FIG. 3, step 24, after each irrigation event was input into the software and used, along with the seasonal nutritional plan and the daily irrigation events, to calculate future nutrient levels for irrigation events. A signal was then sent to the computer fertigation controller to set the injection rates of fertilizer components for the next irrigation event, as shown in FIG. 3, step 25.

Once the data from the water and nutrient consumption sensors was analyzed the computer fertigation controller determined the amount of nutrients to be used in the next irrigation event When needed, fertilizers were then transferred from holding tanks to various feeder and mixing tanks using variable rate injectors. In the fertigation room, as can be seen in FIG. 1, part 8, a feed tank supplied fertilizer and nutrients to a mixing tank in which the fertilizer was mixed with water from a water supply. Water for the fertigation controller was first run through a filter to remove particulates that may clog the irrigation system.

Analysis from the computer fertigation controller was used to determine the amount of fertilizers and nutrients from various containers to be injected into open top mixing containers directly into distribution lines. The open top containers were used to allow for optional hand mixing of additional materials that were not part of the standard fertilizer configuration. The containers were in communication with the computer fertigation controller in order to receive various solutions of feed formulas. The computer fertigation controller, in conjunction with the watering control system, used variable rate injectors (e.g. Walchem LK series metering pumps, Grundfos DME series diaphragm dosing pump, Vaccon venturi vacuum pumps, Netafim Fertijet) linked by a computer to deliver the desired levels of the additives to the water. Thus, the main water feed to the irrigation system was mixed with the calculated desired levels of fertilizers and nutrients needed by the plants. This variable rate injector was used to mix the calculated desired levels of fertilizers and nutrients as regulated by the computer fertigation controller. The use of stainless steel for components of the fertigation system is preferred but plastic components can be substituted.

In addition to adding nutritional components into the water the computer fertigation controller sent signals to cause air to be directly injected into the irrigation water. The added air has the beneficial effect of increasing the rate of chemical activity in the root zone and also making more oxygen directly available to the roots.

Drip emitters were situated along the irrigation, line which is a pipe, hose or conduit which delivers water and/or nutrient from the fertigation system to the base of plants under cultivation, as shown in FIG. 1, 1 and FIG. 4, part 27. Preferably a drip emitter was located at the base of a plant and to each side of the inside of the plant container. For example, for use with fruit trees, a drip emitter was placed at the base of the tree and to either side of the plant container in which the tree is planted. Alternatively, several drip emitters may surround the plant at various locations over the plant container. The drip emitter may simply be a small hole in the conduit through which liquid may slowly escape or a small tube running from the conduit and into the container.

While the present invention is directed to a computer controlled fertigation method, the fertigation may also be manually controlled. For instance, all of the data from the sensors may be manually recorded and then analyzed by hand. After the data from the sensors is analyzed the water and nutrients may then be mixed by hand in the open mixing tanks. The next irrigation event may then be started and stopped manually.

Example 7

Local Atmospheric Conditions

In another embodiment of the current invention, local atmospheric conditions were used along with the sensors for measuring water and nutrient consumption to provide data for the computer fertigation controller.

Water consumption by the plant increases with increased distance from wind barriers and low humidity. Water consumption also increases as wind speed increases. Rainfall supplements the amount of water applied to plants in the form of irrigation, and should be taken into consideration when determining the timing and duration of irrigation events. A number of commercial weather instruments for measuring temperature, humidity, precipitation, wind speed and insulation are readily available and all have the common attribute of being electronic sensors that are capable of delivering a signal to the computerized system.

Data from the atmospheric sensors were entered into the computer and helped anticipate the number of irrigations events that are necessary on a given day. The temperature, wind, humidity, light and rainfall data for any given time of day is compared to archived record of such data to provide best estimates as to how many times irrigation is needed on that day. For each irrigation event the computer calculates how much nutrition is added to the water by taking the remaining total target for the day and dividing that number by the predicted number of times that irrigation is needed. This results in a system in which plants are always getting a finely measured amount of fertilizer and micronutrients that would support it is daily and seasonal nutritional needs.

Farmers are constantly using similar data in an informal way to estimate watering needs. By collecting, archiving and continually analyzing this data, the computer is more efficient at anticipating the water needs of the plants and adjusting the chemical inputs to reflect the realities of the patterns.

Example 8

All of the Sensors Working Together

In another embodiment of the current invention, soil moisture sensors, highly precise incremental sensors to monitor stem and fruit diameter, leaf temperature sensors, relative-rate flow sensors and local atmospheric data were used along with the sensors for measuring water and nutrient consumption to provide data for the computer fertigation controller.

Any soil moisture sensor can be used in this system but EasyAG soil moisture sensors which utilized Frequency Domain Reflectometry (FDR) were the preferred embodiment to measure soil water. The sensors were placed at varying depths in order to sample the upper, middle, and lower portions of the active root zones. The sensors provided two different perspectives on the soil, root, and water interactions. The first provided a real-time picture of how much water was being applied to the various root zones during irrigation. After the irrigation event ended, the sensors provided a real-time view of water use and availability.

Understanding a plant's physiological response to the availability or absence of water within the plants root zone is also very important to the overall understanding of how to optimally irrigate. When sufficient water is available through the roots, the cells within the body of the plant have maximum turgor pressure, which results in stems of maximum diameter. When plants are no longer able to obtain water from the roots, water is then removed from the cells. The loss of water results in a small, but detectable reduction in the diameter of the stem. Fruit also act as reservoirs to store water for a plant and the loss of water to the plant results in a small, detectable reduction in the diameter of the fruit. Fruit diameter sensors permit the recording of both the overall size and diurnal growth dynamics of intact fruits.

Plant transpiration is primarily a function of water evaporating through the stomata located on the lower surfaces of leaves. As the water evaporates through the stomata it also has the effect of slightly lowering the temperature of the underside of the leaf. Leaf temperature sensors located on the upper and lower surfaces of a leaf provide highly accurate temperature readings with minimal influence to the thermal conditions of a leaf. As the amount of water available to a plant decreases, the smaller the temperature difference between the upper and lower surfaces of the leaf which indicates a water deficiency in the plant.

Relative-rate sap sensors apply an external heat pulse to a leaf petiole, stem or trunk, then use a sensitive thermometer placed at a fixed distance above the heat source. By measuring the length of time it takes for the heated sap inside the plant to reach the thermometer location and allows an accurate flow rate to be calculated. Since sapflow is highly correlated to water consumption this measure provides a very good indication of how much water is available to the plant from its root zone.

Water consumption by the plant increases with high temperatures, increased distance from wind barriers and low humidity. Water consumption also increases as wind speed increases. Rainfall supplements the amount of water applied to plants to irrigation, and should be taken into consideration when determining the timing and duration of irrigation events. A number of commercial weather instruments are readily available and all have the common attributes of being electronic sensors that are capable of delivery the digital signal to the computerized system.

The primary sensor components of this system are 1) the gauges that the measure total water applied during an irrigation event and the amount of water that leaches out from the container; 2) the scale that tracks the real-time uptake of water from the container; and 3) the sensors that measure the chemical content of the leach water. The plant physiology sensors provide critical backup systems that are capable of serving as substitutes for the scale if it ever went off-line. In addition, they also provide very useful indicators of how the plant uses water and responds to both its availability and absence.

As the system generates a history of responses for each sensor it conducts analyses that reveal other useful patterns of responses prior to the onset of water stress. As these patterns are revealed, they are developed into either independent triggers for initiating watering events, or supplemental inputs to help determine the characteristics of the watering event.

The major disadvantage for the complete array of sensors is that cost increases dramatically.

Sensors were also positioned in order to quantify the amount of water and/or nutrients that the plant consumed. The sensors were used to measure: 1) the amount of water delivered to the plant; 2) the volume of excess water exiting from the plant; 3) the chemical content of the excess water from the plant; and 4) the total amount of water continuously available to the plant.

To measure the amount of water delivered to the plant, a sensor (for example, TB4-L Hydrological Services 8" Tipping Bucket Rain Gauge), as shown in FIG. 1, part 2 and FIG. 4, part 28, was stationed under a single set of drip emitters that deliver water to a single plant container. Alternatively, an in-line flow sensor could also be employed. The drip emitter is a device that is used on an irrigation line to transfer water to the area to be irrigated, as shown in FIG. 4, part 26, next to the plant container in FIG. 4 part 29. Netafim integrated drippers, pressure compensated on-line drippers or arrow drippers were used depending on the crop type grown. The sensor collected and measured the amount of water distributed from the drip emitter during watering events that provide water and/or nutrients to the neighboring plant.

Drip emitters were situated along the irrigation line which is a pipe, hose or conduit which delivers water and/or nutrient from the fertigation system to the base of plants under cultivation, as shown in FIG. 1, part 1 and FIG. 4, part 27. Preferably a drip emitter was located at the base of a plant and to each side of the plant. For example, for use with fruit trees, a drip emitter was placed at the base of the tree and to either side of the container in which the tree is planted. Alternatively, several drip emitters may surround the plant at various locations over the plant container. The drip emitter may simply be a small hole in the conduit through which liquid may slowly escape or a small tube running from the conduit and into the container.

Once it was determined how much water was being delivered to the plant, it was then determined how much water was actually being used by the plant. This was done by measuring the excess water or outflow of water from a plant container. The excess water, as shown in FIG. 5, part 30 was measured using a sensor, as shown in FIG. 1, part 3 and FIG. 5, part 31 that was placed under the container, FIG. 5, part 32. The sensor continuously collected water that was being emitted from the plant container.

Next, the real-time measurement of the amount of water that was available to the plant was measured. To obtain the real-time measurement of water available to the plant, a scale (Rice Lake IQ 355 Digital Weight Indicator with a 4-20 mA analog output), as shown in FIG. 1, part 4, and FIG. 6, part 33 was placed under a plant container, FIG. 6, part 34. The scale provided the real-time mass of the water available to the plant by first weighing the container, the plant and water system together. The scale was recorded just prior to the next watering event and served as a basis of comparison for subsequent readings. From that point forward, the sensor calculated weight readings of the water continuously available or uninterrupted, and not the plant container system.

In order to accurately determine the amount of nutrients required by a plant, the amount of nutrients distributed in the irrigation water that were not taken up by the plant needed to be determined. To measure the nutrients another container, a collection container for receiving excess water from the plant container, was placed under a plant container, as can be seen in FIG. 7, part 35. The collection container, FIG. 1, part 5 under the plant container, FIG. 7, part 36 from the plant which allowed sensors, FIG. 7, part 37, to be placed in the collected water to measure the chemical content of the excess water. These sensors included including 31 Series or 35 Series—sealed polycarbonate pH electrode, 02 Series—epoxy body conductivity electrode, or 35 Series—ion selective electrodes (Analytical Sensors and Instruments, LTD) which measure levels of ammonium, calcium, cupric, nitrate, nitrite, potassium, sulphide. Alternatively, the chemical content could also be determined through standard laboratory test procedures and entered into a computer manually.

Once the data from sensors 1, 2, 3 and 4 were collected, as shown in FIG. 1, the data was then transferred to the computer fertigation controller, as shown in FIG. 1, part 6. Transferring the data from the sensors to the computer fertigation controller can be accomplished in a number of ways, either wireless or hard wired. Although SCADALink 900-MB Wireless RTU/Radiomodem (Bentek Systems) was used in this instance, any type of telemetry system that allows for the delivery of sensor-derived information from the field to a central computer or by way of fixed wires or optical cables is acceptable.

The computer fertigation controller, as shown in FIG. 1, part 7, was used to: 1) stop and start irrigation events, 2) adjust the injection rates of the various nutritional components that were added to the water, 3) test the physical and nutritional characteristics of the water being sent to the irrigation system, and 4) keep a digital record of all the information and parameters. Although the software that was used to manage this process was Wonderware (Invensys), any human-machine interaction software could be used in this process.

Once the data was sent to the computer fertigation controller, the computer fertigation controller software analyzed the data from the sensor that collected irrigation water from the drip emitter, as can be seen in FIG. 2, step 9 and the data from the sensor that collected excess water from the bottom of the container holding the plant, as shown in FIG. 3, step 10 by subtracting the excess water data from the irrigation water, as shown in FIG. 2, step 11. The result was the volume of water that was consumed by the plant, as shown in FIG. 2, step 12. The amount of water that was necessary to flush or leach out excess salts from the plant's container was then added to the analysis of the total amount of water used, as shown in FIG. 2, step 13. The amount of water used to flush or leach excess salts varies from crop to crop and by the season. When the amount of water used to flush or leach was added to the total volume consumed, as shown in FIG. 2, step 14, a signal was then sent from the computer fertigation controller to finalize the length of the next irrigation event, as shown in FIG. 2, step 15.

The data from the weighing scale measuring the amount of water that was available to the plant by measuring the real-time mass of the container, plant and water together was sent to the computer fertigation controller where the remaining water in the system was continuously measured, as shown in FIG. 3, step 20. The scale provided the real-time mass of the water available to the plant by first weighing the container, the plant and water system, as shown in FIG. 2, step 16. The scale was then reset to zero prior to the next watering event, as shown in FIG. 2, step 17. From that point forward, the continuous mass readings from the scale were therefore only the mass of the water and not the mass of the container, plant and soil together. The computer fertigation controller is triggered to initiate an irrigation event by either 1) a predetermined trigger point, as shown in FIG. 2, step 18, based on a manually set percentage of irrigation water or 2) automatically based on a set inflection point on a curve of declining water, as shown in FIG. 2, step 19.

The nutritional components that were distributed by the computer fertigation controller were determined based on one or more seasonal nutritional plans for the selected crop, as can be shown in FIG. 3, step 22, along with the number of irrigation events per day based on past historical data of local temperature, humidity and other environmental factors, as shown in FIG. 3, step 23. Data from monitoring excess fertilizer amounts from chemical content sensors, as shown in FIG. 1, step 5, in water collection containers, as shown in FIG. 3, step 24, after each irrigation event was input into the software and used, along with the seasonal nutritional plan and the daily irrigation events, to calculate future nutrient levels for irrigation events. A signal was then sent to the computer fertigation controller to set the injection rates of fertilizer components for the next irrigation event, as shown in FIG. 3, step 25.

Once the data from the water and nutrient consumption sensors was analyzed the computer fertigation controller determined the amount of nutrients to be used in the next irrigation event. When needed, fertilizers were then transferred from holding tanks to various feeder and mixing tanks using variable rate injectors. In the fertigation room, as can be seen in FIG. 1, part 8, a feed tank supplied fertilizer and nutrients to a mixing tank in which the fertilizer was mixed with water from a water supply. Water for the fertigation controller was first run through a filter to remove particulates that may clog the irrigation system.

Analysis from the computer fertigation controller was used to determine the amount of fertilizers and nutrients from various containers to be injected into open top mixing containers directly into distribution lines. The open top containers were used to allow for optional hand mixing of additional materials that were not part of the standard fertilizer configuration. The containers were in communication with the computer fertigation controller in order to receive various solutions of feed formulas. The computer fertigation controller, in conjunction with the watering control system, used variable rate injectors ((e.g. Walchem LK series metering pumps, Grundfos DME series diaphragm dosing pump, Vaccon venturi vacuum pumps, Netafim Fertijet) linked by a computer to deliver the desired levels of the additives to the water. Thus, the main water feed to the irrigation system was mixed with the calculated desired levels of fertilizers and nutrients needed by the plants. This variable rate injector was used to mix the calculated desired levels of fertilizers and nutrients as regulated by the computer fertigation controller. The use of stainless steel for components of the fertigation system is preferred but plastic components can be substituted.

In addition to adding nutritional components into the water the computer fertigation controller sent signals to cause air to be directly injected into the irrigation water. The added air has the beneficial effect of increasing the rate of chemical activity in the root zone and also making more oxygen directly available to the roots.

Drip emitters were situated along the irrigation, line which is a pipe, hose or conduit which delivers water and/or nutrient from the fertigation system to the base of plants under cultivation, as shown in FIG. 1, 1 and FIG. 4, part 27. Preferably a drip emitter was located at the base of a plant and to each side of the inside of the plant container. For example, for use with fruit trees, a drip emitter was placed at the base of the tree and to either side of the plant container in which the tree is planted. Alternatively, several drip emitters may surround the plant at various locations over the plant container. The drip emitter may simply be a small hole in the conduit through which liquid may slowly escape or a small tube running from the conduit and into the container.

While the present invention is directed to a computer controlled fertigation method, the fertigation may also be manually controlled. For instance, all of the data from the sensors may be manually recorded and then analyzed by hand. After the data from the sensors is analyzed the water and nutrients may then be mixed by hand in the open mixing tanks. The next irrigation event may then be started and stopped manually.

Example 9

Other Additional Sources of Data

While the previous examples set forth a variety of sensors that are currently being used in the present invention, there are several other sensors and types of data that could be incorporated into the present invention and used for measuring total water consumption by a plant.

For example, a stem auxanometer could be used to measure the distance between nodes on a plant stem. While in most situations it is desirable to promote the maximum growth of a plant for increased yield, the reverse is true for crops such as grapes. Great care is used to promote growth so that the canes of the grape plant do not grow too quickly, or that the distance between the nodes on the grape canes do not exceed a certain length. The stem auxanometer is a device that automatically measures the changing distances between nodes. This data is then entered into the control computer to adjust the irrigation and fertigation rates so that the growth characteristics of the grape plant do not exceed the optimal parameters defined by the farm manager.

Data from the analysis of plant sap could also be used along with the sensors for measuring total water consumption by a plant. Similar to a blood test for humans, small amounts of sap are extracted from a plant and the chemical makeup of the fluid is analyzed. Data from such tests would be input into the computer fertigation controller and used to adjust subsequent fertilizer injection rates.

Additionally, infrared (IR) and near-infrared (NIR) sensors could also be used in conjunction with the sensors for measuring total water consumption by a plant. IR and NIR sensors are used to collect information on the general health of the plant. For instance, an NDVI (normalized difference vegetation index) sensor (e.g. the GreenSeeker sensor from NTech Industries, Inc) is used to detect the presence of chlorophyll in plants, which in turn is a function of adequate nitrogen. Additional nitrogen fertilizer would be applied when a low NDVI reading is obtained. Other applications of IR and NIR sensors include detecting fruit sugar levels, plant responses to fertilization and plant water stress. IR and NIR data inputs can be used to adjust water and fertilizer levels for subsequent irrigation and fertigation events.

Additional computer inputs could also be derived from tests that are not necessarily directly linked to the computer fertigation controller. Examples of manual data inputs include fruit sugar levels (Brix), fruit acid levels, tissue analyses, calculated evapotranspiration rates (ET), chlorophyll fluorescence, and plant moisture stress as tested with a pressure bomb. All of these could provide valuable adjustments to both fertilization rates and irrigation rates and schedules.

Example 10

Use of Various Water Consumption Sensors with an Elevated Berm

In another embodiment of the current invention, soil moisture sensors, highly precise incremental sensors to monitor stem and fruit diameter, leaf temperature sensors, relative-rate flow sensors and local atmospheric data were used for measuring water and nutrient consumption in an elevated berm and to provide data for the computer fertigation controller.

The elevated berm is designed with a flat top, sloping sides and a base so that the cross-sectional profile of the berm is that of a trapezoid. The purpose of the elevated berm is to provide increased surface area to promote better solar heating of the soil in order to promote extended and improved growing seasons while reducing the risk of harmful soil pest such as nematodes.

Any soil moisture sensor can be used in this with the elevated berm but EasyAG soil moisture sensors which utilize Frequency Domain Reflectometry (FDR) are the preferred embodiment to measure soil water. The sensors were placed at varying depths in order to sample the upper, middle, and lower portions of the active root zones. The sensors provided two different perspectives on the soil, root, and water interactions. The first perspective was a real-time picture of how much water was being applied to the various root zones during irrigation. After the irrigation event ended, the second perspective was a real-time view of water use and availability.

Understanding a plant's physiological response to the availability or absence of water within the plant's root zone is also very important to the overall understanding of how to optimally irrigate. When sufficient water is available through the roots, the cells within the body of the plant have maximum turgor pressure, which results in stems of maximum diameter. When plants are no longer able to obtain water from the roots, water is then removed from the cells. The loss of water results in a small, but detectable reduction in the diameter of the stem. Fruit also act as reservoirs to store water for a plant and the loss of water to the plant results in a small, detectable reduction in the diameter of the fruit. Fruit diameter sensors permit the recording of both the overall size and diurnal growth dynamics of intact fruits.

Figure 9:
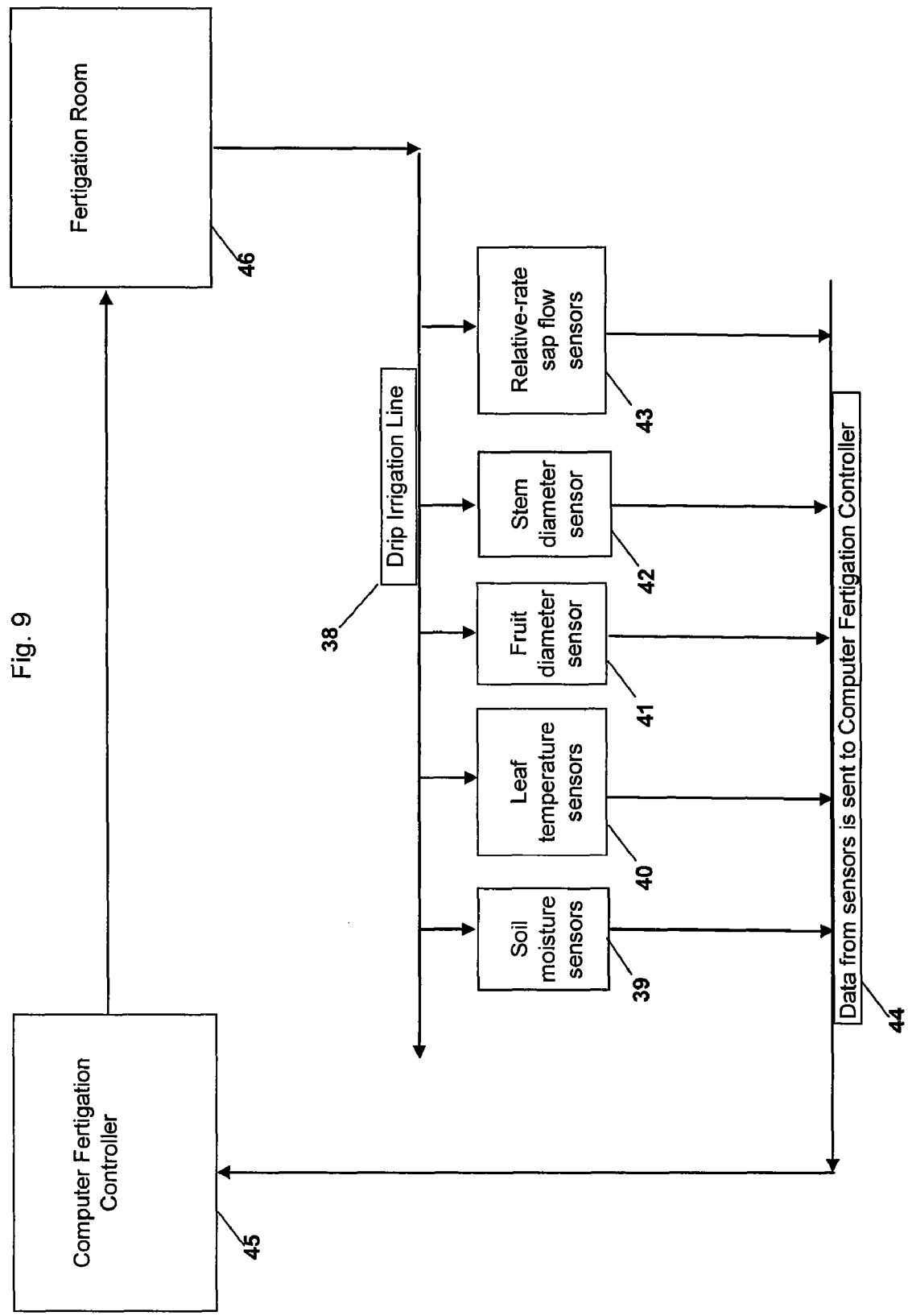
FIG. 9 shows a diagram depicting the process of measuring water consumption in the elevated berm, the analysis of the data and the determination as to how much water and/or nutrients the plant required.

Plant transpiration is primarily a function of water evaporating through the stomata located on the lower surfaces of leaves. As water evaporates through the stomata it also has the effect of slightly lowering the temperature of the underside of the leaf. Leaf temperature sensors, as shown in FIG. 9, 40 located on the upper and lower surfaces of a leaf provide highly accurate temperature readings with minimal influence to the thermal conditions of a leaf. As the amount of water available to a plant decreases, the smaller the temperature difference between the upper and lower surfaces of the leaf, which indicates a water deficiency in the plant.

Relative-rate sap sensors apply an external heat pulse to a leaf petiole, stem or trunk, then use a sensitive thermometer placed at a fixed distance above the heat source. Measuring the length of time it takes for the heated sap inside the plant to reach the thermometer location allows an accurate flow rate to be calculated. Since sapflow is highly correlated to water consumption this measure provides a very good indication of how much water is available to the plant from its root zone.

Water consumption by the plant increases with high temperatures, increased distance from wind barriers and low humidity. Water consumption also increases as wind speed increases. Rainfall supplements the amount of water applied to plants by irrigation, and should be taken into consideration when determining the timing and duration of irrigation events. A number of commercial weather instruments are readily available and all have the common attributes of being electronic sensors that are capable of delivering digital signals to the computerized system.

As the system generates a history of responses for each sensor, analyses are conducted that reveal other useful patterns of responses prior to the onset of water stress. As these patterns are revealed, they are developed into either independent triggers for initiating watering events, or supplemental inputs to help determine the characteristics of the watering event.

Once the data from sensors were collected, as shown in FIG. 9, the data was then transferred to the computer fertigation controller, as shown in FIG. 9, part 44. Transferring the data from the sensors to the computer fertigation controller can be accomplished in a number of ways, either wireless or hard wired. Although SCADALink 900-MB Wireless RTU/Radiomodem (Bentek Systems) was used in this instance, any type of telemetry system that allows for the delivery of sensor-derived information from the field to a central computer is acceptable.

The computer fertigation controller, as shown in FIG. 9, part 45, was used to: 1) stop and start irrigation events, 2) adjust the injection rates of the various nutritional components that were added to the water, 3) test the physical and nutritional characteristics of the water being sent to the irrigation system, and 4) keep a digital record of all the information and parameters. Although the software that was used to manage this process was Wonderware (Invensys), any human-machine interaction software could be used in this process.

The nutritional components that were distributed by the computer fertigation controller were determined based on one or more seasonal nutritional plans for the selected crop, as can be shown in FIG. 3, step 22, along with the number of irrigation events per day based on past historical data of local temperature, humidity and other environmental factors, as shown in FIG. 3, step 23.

Once the data from the water consumption sensors was analyzed the computer fertigation controller determined the amount of nutrients to be used in the next irrigation event. When needed, fertilizers were then transferred from holding tanks to various feeder and mixing tanks using variable rate injectors. In the fertigation room, as can be seen in FIG. 9, part 46, a feed tank supplied fertilizer and nutrients to a mixing tank in which the fertilizer was mixed with water from a water supply. Water for the fertigation controller was first run through a filter to remove particulates that may clog the irrigation system.

Analysis from the computer fertigation controller was used to determine the amount of fertilizers and nutrients from various containers to be injected into open top mixing containers directly into distribution lines. The open top containers were used to allow for optional hand mixing of additional materials that were not part of the standard fertilizer configuration. The containers were in communication with the computer fertigation controller in order to receive various solutions of feed formulas. The computer fertigation controller, in conjunction with the watering control system, used variable rate injectors ((e.g. Walchem LK series metering pumps, Grundfos DME series diaphragm dosing pump, Vaccon venturi vacuum pumps, Netafim Fertijet) linked by a computer to deliver the desired levels of the additives to the water. Thus, the main water feed to the irrigation system was mixed with the calculated desired levels of fertilizers and nutrients needed by the plants. This variable rate injector was used to mix the calculated desired levels of fertilizers and nutrients as regulated by the computer fertigation controller. The use of stainless steel for components of the fertigation system is preferred but plastic components can be substituted.

In addition to adding nutritional components into the water the computer fertigation controller sent signals to cause air to be directly injected into the irrigation water. The added air has the beneficial effect of increasing the rate of chemical activity in the root zone and also making more oxygen directly available to the roots.

Drip emitters were situated along the irrigation, line which is a pipe, hose or conduit which delivers water and/or nutrient from the fertigation system to the base of plants under cultivation, as shown in FIG. 9, 38 and FIG. 4, part 27. Preferably a drip emitter was located at the base of a plant and to each side of the inside of the plant container. For example, for use with fruit trees, a drip emitter was placed at the base of the tree and to either side of the plant container in which the tree is planted. Alternatively, several drip emitters may surround the plant at various locations over the plant container. The drip emitter may simply be a small hole in the conduit through which liquid may slowly escape or a small tube running from the conduit and into the container.

While the present invention is directed to a computer controlled fertigation method, the fertigation may also be manually controlled. For instance, all of the data from the sensors may be manually recorded and then analyzed by hand. After the data from the sensors is analyzed the water and nutrients may then be mixed by hand in the open mixing tanks. The next irrigation event may then be started and stopped manually.

Example 11

Increased Nutritional Values

By continually providing plants with optimal moisture and nutrient levels, plants that typically establish large root systems may be grown by the present invention in confined containers or an elevated berm. Unexpectedly, growing plants by using the method of the present invention, although stunting the physical size of the plant, actually allows for faster initial growth of the plant, and increased fruit or nut production in a shorter amount of time. Thus, for such plants, unexpectedly increased fruit or nut yields are produced from smaller, more easily harvested plants, in a confined space, without the larger root development.

The advantage of the computer fertigation controller method of the present invention is unexpected improved fruit quality with regard to the overall consumer values of appearance, taste and nutritional value and a reduction in the amount of variability in the crop. By continuously monitoring and updating the needs of the plant, the method of the present invention provides the plant the exact amount of water and/or nutrients that the plant requires, thus improving plant health, while producing a more nutrient rich crop with less variability.

Recent independent laboratory tests are summarized in TABLE 9 and have revealed that grapes grown under the method of the present invention not only bear fruit much sooner, but that the fruit produced is surprisingly much more nutritious. Quantitative chemical tests for vitamins in grapes grown by the method of the present invention have shown that five vitamins tested exhibited substantially elevated levels when compared to published United States Department of Agriculture standards (United States Department of Agriculture, Home and Garden Bulletin No. 72, Nutritive Value of Foods, 2002 ed.) for grapes, red or green (European type, such as Thompson seedless), raw. Column 1 of Table 9 shows the vitamin, column two shows the units of measurement used for each vitamin, column 3 shows the standard amount of each vitamin required by the USDA for raw grapes, column 4 shows the amount of vitamins available in grapes using the present invention and column 5 shows the percent difference between the USDA standard for vitamins in grapes versus the amount of vitamins available in grapes using the present invention.

TABLE 9

| Vitamin | Units | USDA vitamin standards for raw grapes (red and green) per 100 g of grapes | Amount of vitamins from raw grapes (red and green) using the present invention per 100 g of grapes | Percent difference between the USDA standard and the present invention |
| --- | --- | --- | --- | --- |
| Vitamin A | IU | 66 | 198 | +300% |
| Thiamin B1 | mg | 0.069 | 0.124 | +180% |
| Riboflavin B2 | mg | 0.07 | 0.267 | +381% |
| B-6 | mg | 0.086 | 0.218 | +253% |
| Vitamin E | IU | 0.285 | 2.28 | +800% |

Example 12

Reduced Usage of Water and Fertilizer

Another advantage of the computer fertigation controller is a reduction of the amount of water and/or nutrients necessary to maintain the plants health. The computer fertigation controller reduces stress on the plant as well as reduces the amount of water and/or nutrients that are not taken up by the plant and therefore dispersed into the environment.

As can be seen in Table 10, the amount of water used to grow citrus in the present invention is significantly less than that of conventional growing methods. Additionally, the amount of water that is used without producing fruit is also significantly less with the present invention than that of conventional growing methods. Column 1 of Table 10 shows the age of the tree in years, column 2 shows the average daily amount of water in milliliters used per tree using conventional growing methods, column 3 shows the pounds of fruit per tree produced using the conventional growing method in pounds, column 4 shows the amount of water in milliliters used per tree using the present invention and column 5 shows the pounds of fruit per tree produced using the present invention.

TABLE 10

| Year | Amount of water used per tree using convention growing methods (ml)* | Fruit produced using conventional growing methods lb/tree | Amount of water used per tree using the present invention (ml) | Fruit produced using the present invention lb/tree |
| --- | --- | --- | --- | --- |
| 1 | 17034 | 0 | 5016 | 0 |
| 2 | 17034 | 0 | 5016 | 6 |
| 3 | 17031 | 0 | 5431 | 25 |
| 4 | 34069 | 11 | 5814 | 60 |
| 5 | 34069 | 35 | 5814 | 80 |

TABLE 10-continued

| Year | Amount of water used per tree using convention growing methods (ml)* | Fruit produced using conventional growing methods lb/tree | Amount of water used per tree using the present invention (ml) | Fruit produced using the present invention lb/tree |
| --- | --- | --- | --- | --- |
| 6 | 34069 | 36 | 5814 | 120 |

*Source: University of California Cooperative Extension, Sample Costs to Establish an Orange Orchard and Produce Oranges. 2005

As can be seen in Table 11 the annual amount of nitrogen required to grow citrus using this the present invention is significantly less than conventional growing methods. Column 1 of Table 11 shows the age of the orange tree in years, column 2 shows the amount of nitrogen in pounds an orange tree received each year using conventional growing methods in pounds and column 3 shows the amount of nitrogen in pounds an orange tree receives each year using the present invention.

TABLE 11

| Year | Amount of Nitrogen applied per orange tree using conventional growing methods (lbs)* | Amount of Nitrogen applied per orange tree using the present invention (lbs) |
| --- | --- | --- |
| 1 | 0.1 | 0.15 |
| 2 | 0.2 | 0.15 |
| 3 | 0.3 | 0.15 |
| 4 | 0.4 | 0.138 |
| 5 | 0.5 | 0.138 |
| 6 | 0.6 | 0.138 |
| 7 | 0.8 | 0.138 |

*Source: University of California Cooperative Extension, Sample Costs to Establish an Orange Orchard and Produce Oranges. 2005

Another advantage of the present invention is that it reduces the amount of pesticide needed to combat pest (such as animals), insect and fungal infestations. In a grape project using the present invention, it was found unexpectedly that none of the hundreds of grape plants showed any sign of mildew, even though no artificial controls for mildew were applied. What was remarkable was that neighboring grape fields were particularly encumbered with a heavy infection rate of grape mildew in the region. Most grape farms experience substantial mildew, even after multiple applications of preventative spray. It is believed that the increased health of the plants induced by the present invention permits them to more effectively fight off or resist infestation. Citrus plants using the computer fertigation controller have also experienced similar results, exhibiting infestation rates of scale, mites, and other pests in lower amounts and in lower frequencies than those experienced in surrounding conventional citrus farms.

Example 13

Increased Harvest Yield

Another benefit of the current invention is the unexpected increase in harvest yield over conventional methods. These results are attributed to the early maturation and high density planting due to the stunting of trees grown in small containers and in the elevated berms. Alternatively, for other types of plants can achieve increased yields through enhanced vegetative growth or flowering. Using citrus as an example it is possible to stimulate early sexual maturity and have the first commercial harvest 2 years after first planting. Unexpectedly, production rates have averaged approximately 6 pounds per tree for trees of this age. This rate increases to 25 pounds and then 60 pounds per tree in years three and four.

These unexpected beneficial fruit bounties from the present invention can be contrasted with more conventional plantings techniques. As shown in Table 12, conventional citrus requires at least four years before any production is shown whereas production rates of 6 pounds per tree can be expected by year 2 using the present invention, a decrease in the time to harvest a crop by 30% to 60%.

TABLE 12

| Year | Conventional Growing Methods (150 Trees per acres) | | Present Invention (1998 trees per acre) | |
|---|---|---|---|---|
| | lb/tree | lb/acre | lb/tree | lb/acre |
| 1 | 0 | 0 | 0 | 0 |
| 2 | 0 | 0 | 6 | 11988 |
| 3 | 0 | 0 | 25 | 49950 |
| 4 | 11 | 1650 | 60 | 119880 |

The present invention has been successfully employed with a wide variety of plants, including but not limited to: citrus, table grapes, wine grapes, bananas, papaya, coffee, goji berries, figs, avocados, guava, pineapple, raspberries, blueberries, olives, pistachios, pomegranate, artichokes and almonds. The present invention is also employed with a wide variety of gymnosperm, angiosperm and pteridophyte plants, including but not limited to: 1. Vegetables such as artichokes, asparagus, bean, beets, broccoli, brussel sprouts, chinese cabbage, head cabbage, mustard cabbage, cantaloupe, carrots, cauliflower, celery, chicory, collard greens, cucumbers, daikon, eggplant, Escarole/Endive, garlic, herbs, honey dew melons, kale, lettuce (head, leaf, romaine), mustard greens, okra, onions (dry & green), parsley, peas (sugar, snow, green, black-eyed, crowder, etc.), peppers (bell, chile), pimento, pumpkin, radish, rhubarb, spinach, squash, sweet corn, tomatoes, turnips, turnip greens, watercress, and watermelons; 2. Flowering type bedding plants including, but not limited to, Ageratum, Alyssum, Begonia, Celosia, Coleus, dusty miller, Fuchsia, Gazania, Geraniums, gerbera daisy, Impatiens, Marigold, Nicotiana, pansy/Viola, Petunia, Portulaca, Salvia, Snapdragon, Verbena, Vinca, and Zinnia; 3. Vegetable type bedding plants including, but not limited to, artichokes, asparagus, bean, beets, broccoli, brussel sprouts, chinese cabbage, head cabbage, mustard cabbage, cantaloupe, carrots, cauliflower, celery, chicory, collard greens, cucumbers, Daikon, eggplant, Escarole/Endive, garlic, fresh cut herbs, honey dew melons, kale, lettuce (head, leaf, Romaine), mustard greens, okra, onions (dry & green), parsley, peas (sugar, snow, green, black-eyed, crowder, etc.), peppers (bell, chile), pimento, pumpkin, radish, rhubarb, spinach, squash, sweet corn, tomatoes, turnips, turnip greens, watercress, and melons; 4. Potted flowering plants including, but not limited to, African violet, Alstroemeria, Anthurium, Azalea, Begonia, Bromeliad, Chrysanthemum, Cineraria, Cyclamen, Daffodil/Narcissus, Exacum, Gardenia, gerbera daisy, Gloxinia, Hibiscus, Hyacinth, Hydrangea, Kalanchoe, Lily, Orchid, Poinsettia, Primula, regal pelargonium, rose, tulip, Zygocactus/Schlumbergera; 5. Foliage plants including, but not limited to, Aglaonema, Anthurium, Bromeliad, cacti and succulents, Croton, Dieffenbachia, Dracaena, Epipremnum, ferns, ficus, Hedera (Ivy), Maranta/Calathea, palms, Philodendron, Schefflera, Spathiphyllum, Syngonium; 6. Cut flowers including, but not limited to, Alstroemeria, Anthurium, Aster, bird of paradise/Strelitzia, calla lily, carnation, Chrysanthemum, Daffodil/Narcissus, daisy, Delphinium, Freesia, gerbera daisy, ginger, Gladiolus, Godetia, Gypsophila, heather, iris, Leptospermum, Liatris, lily, Limonium, Lisianthus, Orchid, Protea, Rose, Snapdragon, Statice, Stephanotis, Stock, Sunflower, Tulip, Zinnia; 7. Cut cultivated greens including, but not limited to, Asparagus, (plumosus, tree fern, boxwood, soniferous greens, Cordyline, Eucalyptus, hedera/Ivy, holly, leatherleaf ferns, Liriope/Lilyturf, Myrtle, Pittosporum, Podocarpus; 8. Deciduous shade trees including, but not limited to, ash, birch, honey locust, linden, maple, oak, poplar, sweet gum, and willow; 9. Deciduous flowering trees including, but not limited to, Amelanchier, callery pea, crabapple, crapemyrtle, dogwood, flowering cherry, flowering plum, golden rain, hawthorn, Magnolia, and redbud; 10. Broadleaf evergreens including, but not limited to, Azalea, boxwood, cotoneaster, Euonymus, holly, Magnolia, Pieris, Pittosporum, Privet, Rhododendron, and Viburnum; 11. Coniferous evergreens including, but not limited to, Arborvitae, cedar, cypress, fir, hemlock, juniper, pine, spruce, yew; 12. Deciduous shrubs and other ornamentals including, but not limited to, Buddleia, Hibiscus, Hydrangea, lilac, rose, Spirea, Viburnum, Weigela, ground cover, Bougainvillea, Clematis and other climbing vines, and landscape palms; 13. Fruit and nut plants including, but not limited to, citrus and subtropical fruit trees, Deciduous fruit and nut trees, grapevines, strawberry plants, other small fruit plants, other fruit and nut trees; 14. Greenhouse plants including, but not limited to, cucumbers, herbs, cut fresh, lettuce, peppers, strawberries, tomatoes, wildflowers, transplants for commercial production, and aquatic plants; 15. Pteridophyte plants including, but not limited to ferns.

Example 14

Pteridophytes

The present invention is also used with pteridophyte plants including, but not limited to ferns. There are numerous advantages the present invention provides when used to grow pteridophyte plants. As shown in Table 13, the use of the present invention to grow ferns shortens the time to produce a plant that is suitable for sale. The use of the sensors, such as the liquid volume sensor, the scale, the soil moisture sensor, the leaf temperature sensor, the stem diameter sensor, relative-rate sap flow sensor, and/or the atmospheric sensors, provide the computer fertigation controller with the information necessary to distribute the appropriate amount of water and nutrients to the plant at the proper time. This provides the plant with the water and nutrients necessary to maximize the plant's growth rate and allows the plant to reach a marketable size before plants grown through conventional methods.

The use of plant physiological sensors such as the leaf temperature sensor, the stem diameter sensor, and/or the relative-rate sap flow sensor to grow pteridophyte plants also indicate the presence of plant pests such as insects, animals or birds. The use of physiological sensors shows slight changes in the data from the sensor and is an indication to the grower that something may be causing the plant to go into a state of stress. The grower then is able to observe the plant in question and visually or remotely identify the source of the stress for the plant, such as a pest infestation, long before the pest is able to do substantial harm to the plant and long before a pest would be identified through conventional growing methods.

Additionally, the use of the present invention to grow pteridophytes reduces the likelihood of root rot or root pest infestations. The present invention reduces the possibility of water remaining around the roots for lengthy period of time and therefore reduces the possibility of the plant roots developing root rot. Furthermore, slight changes in the data from these sensors indicate that the plant may not be properly uptaking water and nutrients. This is an indication to the grower that there may be a problem with the plant. The grower is then able to identify the plant in question and to identify the source of the plant's stress.

TABLE 13

| Plant Type | Benefits |
| --- | --- |
| Pteridophytes - including, but not limited to, ferns. | Shortened time to market Physiological sensors - less pest infestation Potted plants - less root rot and less root pest infestation Controlled nutrition - promotes enhanced vegetative growth Precision fertigation - dramatic savings on both water and fertilizer costs Small containers - higher density planting for commercial growers |
| Gymnosperms - including but no limited to pine, spruce, fir, cedar, hemlock, yew, larch, juniper, pinion, ginkgo, cypress and Ephedra | Shortened time to market Physiological sensors - less pest infestation Potted plants - less root rot and less root pest infestation Controlled nutrition - promotes enhanced vegetative growth Precision fertigation - dramatic savings on both water and fertilizer costs Small containers - higher density planting for commercial growers |
| Angiosperms - including but not limited to ornamental annual plants, ornamental perennial plants (roses) ornamental cut flowers (including but not limited to Alstroemeria, Aster, Bells of Ireland, Delphinium, Hydrangea, lilac, Gerbera, and Monks Hood) | Shortened time to market Physiological sensors - less pest infestation Potted plants - less root rot and less root pest infestation Improved flower quality - improved nutrients for edible flowers such as dandelions and nasturtiums Controlled nutrition - promotes enhanced vegetative growth Manipulated stress levels - promotes increased bloom activity Precision fertigation - dramatic savings on both water and fertilizer costs Small containers - higher density planting for commercial growers |
| Angiosperms - vegetables and fruits including but not limited to tomatoes, peppers, squash, beans, lettuce, spinach, broccoli, cauliflower, eggplant, celery, beets, peas, melon, mustard greens, radish, citrus, table grapes, wine grapes, bananas, papaya, coffee, goji berries, figs, avocados, guava, pineapple, raspberries, blueberries, olives, pistachios, pomegranate, artichokes and almonds, | Shortened time to market Physiological sensors - less pest infestation Potted plants - less root rot and less root pest infestation Improved vegetable and fruit quality - purified nutrient content, increased nutrient content Controlled nutrition - promotes enhanced vegetative growth Manipulated stress levels - promotes increased bloom activity Precision fertigation - dramatic savings on both water and fertilizer costs Small containers - higher density planting for commercial growers |
| Angiosperms - woody species including but not limited to oak, maple, Populus, hickory, walnut, pecan, birch, beech, apple, cherry, peach, and citrus, | Shortened time to market Physiological sensors - less pest infestation Potted trees - less root rot and less root pest infestation Improved plant quality - improved nutrient quality for edible fruit of the tree Controlled nutrition - promotes enhanced vegetative growth Manipulated stress levels - promotes increased bloom activity Precision fertigation - dramatic savings on both water and fertilizer costs Small containers - higher density planting for commercial growers |
| Fungi - such as basidiomycetes (portabella, shiitake, morels, boletes), ascomycetes (truffles) and zygomycetes. | Increased control of nutrients the vegetative tissue is taking up and increased control of initiation of the fungal fruiting body. |

Example 15

Gymnosperms

The present invention is also used with gymnosperm plants including, but not limited to, pine, spruce, fir, cedar, hemlock, yew, larch, juniper, pinion, ginkgo, cypress and Ephedra. There are numerous advantages the present invention provides when used to grow gymnosperm plants. As shown in Table 13, the use of the present invention to grow gymnosperms shortens the time to produce a plant that is suitable for sale. The use of the sensors, such as the liquid volume sensor, the scale, the soil moisture sensor, the leaf temperature sensor, the stem diameter sensor, relative-rate sap flow sensor, and/or the atmospheric sensors, provide the computer fertigation controller with the information necessary to distribute the appropriate amount of water and nutrients to the plant at the proper time. This provides the plant with the water and nutrients necessary to maximize the plant's growth rate and allows the plant to reach a marketable size before plants grown through conventional methods.

The use of plant physiological sensors such as the leaf temperature sensor, the stem diameter sensor, and/or the relative-rate sap flow sensor while growing gymnosperm plants also indicates the presence of plant pests such as insects, animals or birds. The use of physiological sensors shows slight fluctuations in the data from the sensor and is an indication to the grower that something may be causing the plant to go into a state of stress. The grower then is able to observe the plant in question in person or remotely and identify the source of the stress for the plant, such as a pest infestation, long before the pest is able to do substantial harm to the plant and long before a pest would be identified through conventional growing methods.

The use of the present invention to grow gymnosperms also reduces the likelihood of root rot or root pest infestations. The present invention reduces the possibility of water remaining around the roots for a lengthy period of time and therefore reduces the possibility of the plant roots developing root rot. Furthermore, slight changes in the data from these sensors indicate that the plant may not be properly uptaking water and nutrients. This is an indication to the grower that there may be a problem with the plant. The grower is then able to identify the plant in question and to identify the source of the plant's stress.

By growing gymnosperm plants using the present invention the risk of pest infestation of the roots is also reduced. Root pests such as nematodes are generally not found in the top twelve inches of the soil layer due to the overheating of that region of the soil by the sun. By growing the plant in a container or in a raised berm the temperature of the soil can be manipulated in such a manner so that the risk of infestations from pests such as nematodes is greatly diminished.

The use of the present invention to grow gymnosperm plants also reduces the likelihood of root rot or root pest infestations by separating the plant and its roots from the surrounding in ground soil. Root pests such as nematodes are not found in the top twelve inches of soil due to the overheating of that area of the soil by the sun. By growing the plant in a container or a raised berm the temperature of the soil can be manipulated in such a manner so that the risk of infestations from pests such as nematodes is greatly diminished.

Growing gymnosperm plants using the present invention under an overcovering structure also reduces the amount of sunlight that reaches the plant. For some plants too much sunlight may cause sunburn which can cause excess transpiration and which can lead to the plant becoming dehydrated. The lack of water in the plant can cause the plant to go into a state of stress. The use of an overcovering structure can reduce the risk of sunburn and therefore reduce the risk of the plant becoming dehydrated.

The use of the present invention to grow gymnosperm plants under an overcovering structure also protects the plants from adverse weather conditions by providing a space under the overcovering structure where the environment around the plant can be more easily manipulated. For example, when the air temperature is overly hot, misters may be used to cool the air or increase the humidity around the plants. In overly cold conditions the overcovering structure may be used as insulation in order to trap heat around the plants.

Growing gymnosperm plants using the present invention under an overcovering structure also reduces the risk of pest infestations such as birds and insects.

Additionally, the use of the present invention to grow gymnosperm plants also increases the amount of nutrients found in edible fruit, nuts and plant parts. The use of the sensors, such as the liquid volume sensor, the scale, the soil moisture sensor, the leaf temperature sensor, the fruit diameter sensor, relative-rate sap flow sensor, and/or the atmospheric sensors, continuously monitor a plant's health while providing the computer fertigation controller with the information necessary to distribute the appropriate amount of water and nutrients to the plant at the proper time. By providing the plant with the proper water and nutrients while also continuously monitoring the plants health, the plant does not waste valuable nutrients in order to fight off plant pests or diseases and is therefore able to focus its energy into producing healthy fruit, nuts or plant parts. Because the plant also does not have to use valuable nutrients on fighting off diseases and pests, the plant is able to send more nutrients to be incorporated into the flowers and allows the plant to produce healthier and more nutrient-rich flowers. By not wasting nutrients to fight off pests and disease, a plant is able to produce a higher quality fruit, nuts or plant part, with nutrients, chemical and medical compounds that are purer in quality and/or with increased quantities of nutrients, chemical and medical compounds than those produced through conventional methods.

Example 16

Angiosperms (Ornamental Plants)

The present invention is also used with angiosperm ornamental plants including but not limited to ornamental annual plants, ornamental perennial plants (roses) and ornamental cut flowers (including, but not limited to, Alstroemeria, Aster, Bells of Ireland, Delphinium, Gerbera, and Monks Hood). There are numerous advantages the present invention provides when used to grow gymnosperm plants. As shown in Table 13, the use of the present invention to grow angiosperms shortens the time to produce a plant that is suitable for sale. The use of the sensors, such as the liquid volume sensor, the scale, the soil moisture sensor, and the leaf temperature sensor, the stem diameter sensor, relative-rate sap flow sensor, or the atmospheric sensors, provide the computer fertigation controller with the information necessary to distribute the appropriate amount of water and nutrients to the plant at the proper time. This provides the plant with the water and nutrients necessary to maximize the plant's growth rate and allows the plant to reach a marketable size before plants grown through conventional methods. Flowering plants grown under this method also show a marked increase in the rate of bloom.

The use of plant physiological sensors such as the leaf temperature sensor, the fruit diameter sensor, the stem diameter sensor, and/or the relative-rate sap flow sensor to grow angiosperm plants also indicate the presence of plant pests such as insects, animals or birds. The use of physiological sensors shows slight fluctuations in the data from the sensor and is an indication to the grower that something may be causing the plant to go into a state of stress. The grower then is able to physically visit the plant in question and visually identify the source of the stress for the plant, such as a pest infestation, long before the pest is able to do substantial harm to the plant and long before a pest would be identified through conventional growing methods.

The use of the present invention to grow angiosperm ornamental plants also reduces the likelihood of root rot or root pest infestations. The present invention reduces the possibility of water remaining around the roots for a lengthy period of time and therefore reduces the possibility of the plant roots developing root rot. Furthermore, slight changes in the data from these sensors indicate that the plant may not be properly uptaking water and nutrients. This is an indication to the grower that there may be a problem with the plant. The grower is then able to identify the plant in question and to identify the source of the plant's stress.

The use of the present invention to grow angiosperm ornamental plants also reduces the likelihood of root rot or root pest infestations by separating the plant and its roots from the surrounding in ground soil. Root pests such as nematodes are not found in the top twelve inches of soil due to the overheating of that area of the soil by the sun. By growing the plant in a container or a raised berm the temperature of the soil can be manipulated in such a manner so that the risk of infestations from pests such as nematodes is greatly diminished.

Growing angiosperm ornamental plants using the present invention under an overcovering structure also reduces the amount of sunlight that reaches the plant. For some plants too much sunlight may cause sunburn which can cause excess transpiration and which leads to the plant becoming dehydrated. The lack of water in the plant can cause the plant to go into a state of stress. The use of an overcovering structure can reduce the risk of sunburn and therefore reduce the risk of the plant becoming dehydrated.

The use of the present invention to grow angiosperm ornamental plants under an overcovering structure also protects the plants from adverse weather conditions by providing a space under the overcovering structure where the environment around the plant can be more easily manipulated. For example, when the air temperature is overly hot, misters may be used to cool the air or increase the humidity around the plants. In overly cold conditions the overcovering structure may be used as insulation in order to trap heat around the plants.

Growing angiosperm ornamental plants using the present invention under an overcovering structure also reduces the risk of pest infestations such as birds and insects.

Additionally, the use of the present invention to grow angiosperm ornamental plants also increases the amount of nutrients found in edible flowers such as dandelions and Nasturtiums. The use of the sensors, such as the liquid volume sensor, the scale, the soil moisture sensor, the leaf temperature sensor, the fruit diameter sensor, relative-rate sap flow sensor, and/or the atmospheric sensors, continuously monitor a plant's health while providing the computer fertigation controller with the information necessary to distribute the appropriate amount of water and nutrients to the plant at the proper time. By providing the plant with the proper water and nutrients while also continuously monitoring the plants health, the plant does not waste valuable nutrients in order to fight off plant pests or diseases and is therefore able to focus its energy into producing healthy flowers. Because the plant also does not have to use valuable nutrients on fighting off diseases and pests, the plant is able to send more nutrients to be incorporated into the flowers and allows the plant to produce healthier and more nutrient-rich flowers. By not wasting nutrients to fight off pests and disease, a plant is able to produce a higher quality flower or plant part, with nutrients, chemical and medical compounds that are purer in quality and/or with increased quantities of nutrients, chemical and medical compounds than those produced through conventional methods.

Example 17

Angiosperms (Vegetable and Fruit Plants)

The present invention is also used with angiosperm vegetable and fruit plants including but not limited to tomatoes, peppers, varieties of squash, beans, lettuce, spinach, broccoli, cauliflower, eggplant, celery, beets, peas, melon, mustard greens, radish, citrus, table grapes, wine grapes, bananas, papaya, coffee, goji berries, figs, avocados, guava, pineapple, raspberries, blueberries, olives, pistachios, pomegranate, artichokes and almonds. There are numerous advantages the present invention provides when used to grow angiosperm plants. As shown in Table 13, the use of the present invention to grow angiosperm vegetable and fruit plants shortens the time to produce a plant that is suitable for sale. The use of the sensors, such as the liquid volume sensor, the scale, the soil moisture sensor, the leaf temperature sensor, the fruit diameter sensor, the stem diameter sensor, relative-rate sap flow sensor, and/or the atmospheric sensors, provide the computer fertigation controller with the information necessary to distribute the appropriate amount of water and nutrients to the plant at the proper time. This provides the plant with the water and nutrients necessary to maximize the plant's growth rate and allows the plant to reach a marketable size before plants grown through conventional methods. Angiosperm plants grown under this method also show a marked increase in the number of fruit and vegetables.

The use of plant physiological sensors such as the leaf temperature sensor, the fruit diameter sensor, the stem diameter sensor, and/or the relative-rate sap flow sensor to grow angiosperm plants also indicates the presence of plant pests such as insects, animals or birds. The use of physiological sensors shows slight fluctuations in the data from the sensor and is an indication to the grower that something may be causing the plant to go into a state of stress. The grower then is able to physically visit the plant in question and visually identify the source of the stress for the plant, such as a pest infestation, long before the pest is able to do substantial harm to the plant and long before a pest would be identified through conventional growing methods.

The use of the present invention to grow angiosperm vegetable and fruit plants also reduces the likelihood of root rot or root pest infestations. The present invention reduces the possibility of water remaining around the roots for lengthy period of time and therefore reduces the possibility of the plant roots developing root rot. Furthermore, slight changes in the data from these sensors indicate that the plant may not be properly uptaking water and nutrients. This is an indication to the grower that there may be a problem with the plant. The grower is then able to identify the plant in question and to identify the source of the plant's stress.

The use of the present invention to grow angiosperm fruit and vegetable plants also reduces the likelihood of root rot or root pest infestations by separating the plant and its roots from the surrounding in ground soil. Root pests such as nematodes are not found in the top twelve inches of soil due to the overheating of that area of the soil by the sun. By growing the plant in a container or a raised berm the temperature of the soil can be manipulated in such a manner so that the risk of infestations from pests such as nematodes is greatly diminished.

The use of the present invention to grow angiosperm fruit and vegetable plants under an overcovering structure also reduces the amount of sunlight that reaches the plant. In some plants too much sunlight may cause sunburn which can cause excess transpiration and cause the plant to dehydrate. The lack of water in the plant can cause the plant to go into a state of stress.

The use of the present invention to grow angiosperm fruit and vegetable plants under an overcovering structure also protects the plants from adverse weather conditions by providing a space under the overcovering structure where the environment can be more easily manipulated. For example, when the air temperature is overly hot, misters may be used to cool the air or increase the humidity around the plants. In overly cold conditions the overcovering structure may be used as insulation in order to trap heat around the plants.

The use of the present invention to grow angiosperm fruit and vegetable plants under an overcovering structure also reduces the risk of pest infestations such as birds and insects.

Additionally, the use of the present invention to grow angiosperm fruit and vegetables also increases the amount of nutrients found in fruit or plant parts. The use of the sensors, such as the liquid volume sensor, the scale, the soil moisture sensor, the leaf temperature sensor, the fruit diameter sensor, relative-rate sap flow sensor, and/or the atmospheric sensors, continuously monitor a plant's health while providing the computer fertigation controller with the information necessary to distribute the appropriate amount of water and nutrients to the plant at the proper time. By providing the plant with the proper water and nutrients while also continuously monitoring the plant's health, the plant does not waste valuable nutrients in order to fight off plant pests or diseases and is therefore able to focus its energy into producing healthy fruit and vegetables. Because the plant also does not have to use valuable nutrients to fight off diseases and pests, the plant is able to send more nutrients to be incorporated into the fruit or plant part which allows the plant to produce healthier and more nutritional fruit or plant parts. This in turn produces a higher quality fruit or plant part, with nutrients, chemical and medical compounds that are purer in quality and/or with increased quantities of nutrients, chemical and medical compounds than those produced through conventional methods.

Example 18

Angiosperms (Woody Plants)

The present invention is also used with angiosperm woody plants including but not limited to oak, maple, Populus, hickory, walnut, pecan, birch, beech, apple, cherry, peach and citrus. There are numerous advantages the present invention provides when used to grow angiosperm plants. As shown in Table 13, the use of the present invention to grow angiosperm woody plants shortens the time to produce a plant that is suitable for sale. The use of the sensors, such as the liquid volume sensor, the scale, the soil moisture sensor, the leaf temperature sensor, the fruit diameter sensor, the stem diameter sensor, relative-rate sap flow sensor, and/or the atmospheric sensors, provide the computer fertigation controller with the information necessary to distribute the appropriate amount of water and nutrients to the plant at the proper time. This provides the plant with the water and nutrients necessary to maximize the plant's growth rate and allows the plant to reach a marketable size before plants grown through conventional methods. Flowering plants grown under this method also show a marked increase in the rate of bloom.

The use of plant physiological sensors with the present such as the leaf temperature sensor, the fruit diameter sensor, the stem diameter sensor, and/or the relative-rate sap flow sensor to grow angiosperm plants also indicate the presence of plant pests such as insects, animals or birds. The use of physiological sensors shows slight fluctuations in the data from the sensor and is an indication to the grower that something may be causing the plant to go into a state of stress. The grower then is able to physically visit the plant in question and visually identify the source of the stress for the plant, such as a pest infestation, long before the pest is able to do substantial harm to the plant and long before a pest would be identified through conventional growing methods.

The use of the present invention to grow angiosperm woody plants also reduces the likelihood of root rot or root pest infestations. The present invention reduces the possibility of water remaining around the roots for lengthy period of time and therefore reduces the possibility of the plant roots developing root rot. Furthermore, slight changes in the data from these sensors indicate that the plant may not be properly uptaking water and nutrients. This is an indication to the grower that there may be a problem with the plant. The grower is then able to identify the plant in question and to identify the source of the plant's stress.

The use of the present invention to grow angiosperm woody plants also reduces the likelihood of root rot or root pest infestations by separating the plant and its roots from the surrounding in ground soil. Root pests such as nematodes are not found in the top twelve inches of soil due to the overheating of that area of the soil by the sun. By growing the plant in a container or a raised berm the temperature of the soil can be manipulated in such a manner so that the risk of infestations from pests such as nematodes is greatly diminished.

The use of the present invention to grow angiosperm woody plants under an overcovering structure also reduces the amount of sunlight that reaches the plant. In some plants too much sunlight may cause sunburn which can cause excess transpiration and cause the plant to dehydrate. The lack of water in the plant can cause the plant to go into a state of stress.

The use of the present invention to grow angiosperm woody plants under an overcovering structure also protects the plants from adverse weather conditions by providing a space under the overcovering structure where the environment can be more easily manipulated. For example, when the air temperature is overly hot, misters may be used to cool the air or increase the humidity around the plants. In overly cold conditions the overcovering structure may be used as insulation in order to trap heat around the plants.

The use of the present invention to grow angiosperm woody plants under an overcovering structure also reduces the risk of pest infestations such as birds and insects.

Additionally, the use of the present invention to grow angiosperm woody plants also increases the amount of nutrients found in fruit, nuts or other plant parts. The use of the sensors, such as the liquid volume sensor, the scale, the soil moisture sensor, the leaf temperature sensor, the fruit diameter sensor, relative-rate sap flow sensor, and/or the atmospheric sensors, continuously monitor a plant's health while providing the computer fertigation controller with the information necessary to distribute the appropriate amount of water and nutrients to the plant at the proper time. By providing the plant with the proper water and nutrients while also continuously monitoring the plants health, the plant does not waste valuable nutrients in order to fight off plant pests or diseases and is therefore able focus its energy into producing healthy plants. Because the plant also does not have to use valuable nutrients on fighting off diseases and pests, the plant is able to send more nutrients to be incorporated into the fruit, nut or other plant part and allows the plant to produce healthier and more nutritional fruit, nut or other plant parts. By not wasting nutrients to fight off pests and disease, a plant is able to produce a higher quality fruit, nuts or other plant parts, with nutrients, chemical and medical compounds that are purer in quality and/or with increased quantities of nutrients, chemical and medical compounds than those produced through conventional methods.

Example 19

Fungi

The present invention is also used with fungi including but not limited to basidiomycetes such as portabella, morels and shiitake mushrooms, ascomycetes such as truffles and zygomycetes. As shown in Table 13, the use of the present invention to grow fungi shortens the time to produce a fungus that is suitable for sale. The use of the sensors, such as the liquid volume sensor, the scale, the soil moisture sensor, and/or the atmospheric sensors, provide the computer fertigation controller with the information necessary to distribute the appropriate amount of water and nutrients to the plant at the appropriate time to initiate the growth of fruiting bodies. This provides the fungus with the water and nutrients necessary to maximize fungal growth rates as well as nutrient uptake and allows the fungus to reach a marketable size before fungi grown through conventional methods.

The use of the present invention to grow fungi reduces the likelihood of fungi drying out or pest infestations. The use of sensors, such as the liquid volume sensor, the scale, the soil moisture sensor and/or the atmospheric sensors, provides the computer fertigation controller with the information necessary to distribute the appropriate amount of water and nutrients to the fungus at the proper time. This reduces the possibility of the fungal hyphea drying out.

Additionally, the use of the present invention to grow fungi also increases the amount of nutrients found in the fungal fruiting body. The use of the sensors, such as the liquid volume sensor, the scale, the soil moisture sensor, and/or the atmospheric sensors, continuously monitor the amount of water and nutrients that the fungus is using while providing the computer fertigation controller with the information necessary to distribute the appropriate amount of water and nutrients to the fungus at the proper time. By providing the fungus with the proper water and nutrients, the fungus does not waste valuable nutrients in order to fight off pests or diseases and is therefore able focus its energy into producing healthy fruiting bodies. Because the fungus also does not have to use valuable nutrients to fight off diseases and pests, the fungus is able to incorporate more nutrients into the fruiting body which produces healthier and more nutrient-rich fruiting bodies.

Example 20

Overall Benefits of the Present Invention

One of the greatest synergistic benefits experienced by the farms using the system and method of the present invention is that they are capable of producing crops many years ahead of farms planted in a conventional style. This makes them substantially more profitable and less risky than conventional farms.

For example, a consequence of growing plants in small container or on an elevated berm is that the volume of water that is available to the roots of a plant is severely limited. The walls of the containers or the elevated berm physically constrain the extent of root growth of the plants. The limited volume of roots necessitates frequent irrigation to provide water and nutrients for the plant. However, a tremendous advantage is that it is then possible to make adjustments to the nutrients delivered by way of the water and have the plant respond almost immediately to those changes in the nutritional program. In contrast, nutritional components supplied to conventional soils may linger for months or years, making it impossible to effectively alter the availability of key components As the plant grows in accordance to the present invention, it is possible to substantially influence the physical size of the plant. With proper nutritional inputs it would be equally possible to grow plants larger or smaller in size to similar plants grown under conventional methods. However, doing so does not influence the size of the fruit grown. The goal is to create an optimal bearing surface that promotes the best balance of high harvest yield and quality harvested fruit or nuts, with minimal economic inputs.

Also in accordance with the present invention, through the use of sensors which monitor both soil moisture and water transport throughout individual plants, it is possible to accurately schedule frequent irrigations so that the plant is never in a water stress situation. The computer fertigation controller is used to inject measured amounts of key nutritional components into the irrigation water so that the proper amount of nutrition is available every time the water is applied.

Further, in accordance with the present invention, the application of plant nutrition formulas may be adjusted to meet the unique needs of each plant cultivar throughout its individual growing cycles (both annually and longitudinally). Each plant grows through very distinct stages, such as flowering, cell division, and cell expansion, and each phase has specific nutritional demands. Tailoring the nutritional formulas to each stage allows the plants to more closely grow to their full genetic potential.

Plants do not need to grow in a conventional soil environment. Growing plants in a non-soil or partial soil rooting medium such as crushed rock, rock wool or peat moss presents opportunities that are not possible in conventional agriculture. All of the nutrition that a plant receives comes directly from the formula applied through the irrigation water. When compared to average soils, crushed rock has virtually no capacity to lock up or store nutritional compounds. Consequently, what is applied to the plant is either used immediately or will leach out in subsequent irrigation events. This means that the farm manager can make dramatic changes in the nutritional program and have those changes immediately reflected in the uptake of the plant. In conventional agriculture fertilizer components can remain in the soil for long periods of time, making it virtually impossible to effect dramatic changes in the nutritional program applied to the plants.

In accordance with the present invention, the dwarfed size of traditionally large plants results in dramatically reduced inputs for both plant and fruit growth. When compared with conventional growing methods, the present invention uses less than 20% of the water (on a pound of fruit basis). Fertilizer, pesticide, herbicide and energy costs using the present invention have been approximately 20-25% that of conventional methods (again comparing equal amounts of fruit). Similar reductions of inputs can also be realized when plants are manipulated to increase the size of the bearing surface.

In accordance with the present invention, the present invention produces surprising health benefits well beyond the ability to shield the plants from direct contact from soil borne nematodes and pathogens. In a grape project using this method, it was found that none of the hundreds of grape plants showed any sign of mildew, even though no artificial controls for mildew were applied. What was remarkable was that neighboring grape fields were particularly encumbered with a heavy infection rate of grape mildew in the region. Most grape farms experience substantial mildew, even after multiple applications of preventative spray. Grape plants grown using the present invention result in being so healthy that they are either able to fight off the initial infestation or repel it all together. Similar unexpected health benefits have been discovered with other non-grape plants. For instance, citrus plants grown in accordance with the present invention exhibit scale, mite, and other pest infestation rates in lower amounts and in lower frequencies than those experienced in surrounding conventional citrus farms.

Recent independent laboratory tests have revealed that grapes grown under the present invention not only bear fruit much sooner, but the fruit produced is surprisingly much more nutritious. Quantitative chemical tests for vitamins in grapes have shown five of the six vitamins exhibited unexpectedly substantially elevated levels when compared with published USDA standards for grapes (see Table 9).

By implementing the present invention, plants are given the optimal amounts of water, nutrition and stress. Consequently, it is believed that the plants are growing and functioning at their peak rate and thus fully expressing their genetic fruiting potential.

Crop yields, meaning the counts, mass or volume per acre, with this system are greatly increased over conventional methods. Using citrus as an example, it is possible to have the first commercial harvest less than 2 years after first planting. Production rates have averaged approximately 6 pounds per tree for trees of this age. Production increases to 25 pounds in year three and then 60 pounds per tree were observed for year four (see Table 10).

These unexpected benefits of the present invention are contrasted with more conventional plantings techniques. Conventional citrus requires at least 4 years before their first production (about 10-12 pounds/tree) or 30% to 60% longer than the present invention. The top production levels out at approximately 200 lbs/tree after about 8-12 years. This results in a peak production of approximately 30,000 pounds/acre, based on the industry average of about 150 trees per acre (see Table 10).

In accordance with the present invention, the growth of plants can be manipulated to achieve set standards that would increase the value of the crop both internally (e.g., sugar levels, vitamins, minerals) and externally (e.g. size, color, shape). Plants can further be manipulated to promote growth to a size that has optimal economic benefit (e.g. crop load, capacity, maintenance). Therefore, controlling the vigor of the plant has a direct relationship to the economic productivity of a farm operation.

For example, given the small size of artificially dwarfed citrus in the present invention, virtually all of a tree can be picked by hand while standing on the ground. This is in contrast to trees grown by conventional methods which require tall ladders to be employed and constantly repositioned around the tree causing damage to both the fruit and tree. In the conventional manner a picker spends a substantial portion of his time simply climbing up and down the ladder with a heavy sack. Based on several years of harvesting data it was found that picking costs for the present invention are less than 40% of those for conventionally grown orchards. Similar results have also been noted for other tree management activities, such as thinning and pruning. Growth habits can be manipulated to provide physical structures that are easier to maintain, either by hand or machine methods.

While the invention has been described with reference to specific embodiments, it will be apparent that numerous variations, modifications and alternative embodiments of the invention are possible, and accordingly all such variations, modifications and alternative embodiments are to be regarded as being within the scope and spirit of the present invention as claimed.

The invention claimed is:

1. A method of fertigation comprising the steps of growing a plant in a plant container; providing at least one sensor for measuring the total water consumption by the plant in the plant container, the plant container being separated from the underlying soil by elevating the plant container; analyzing data from said at least one sensor to determine the amount of water and nutrients to be delivered to the plant; and delivering the determined amount of water and nutrients to the plant by an irrigation device at a predetermined schedule.

2. The method of fertigation according to claim 1 further comprising at least one sensor for measuring the amount of water delivered to the plant.

3. The method of fertigation according to claim 2, wherein said sensor is a liquid volume gauge.

4. The method of fertigation according to claim 1 further comprising at least one sensor for measuring the amount of excess water from the plant container.

5. The method of fertigation according to claim 4, wherein said sensor is a liquid volume gauge.

6. The method of fertigation according to claim 1 further comprising at least one sensor for measuring the chemical content of excess water from the plant container.

7. The method of fertigation according to claim 1 further comprising at least one sensor to measure the amount of water available to the plant.

8. The method of fertigation according to claim 1 further comprising at least one sensor to measure the total amount of water delivered to the plant, at least one sensor to measure excess water, at least one sensor to measure the total amount of water available to the plant and at least one sensor for the measurement of the chemical content.

9. The method of fertigation according to claim 1, wherein data from said at least one sensor is analyzed by a central processing unit.

10. The method of fertigation according to claim 9, wherein said analysis from said central processing unit determines the timing of irrigation events.

11. The method of fertigation according to claim 9, wherein the analysis from said central processing unit determines the amount of water to be applied during an irrigation event.

12. The method of fertigation according to claim 9, wherein the analysis from said central processing unit is used in preparing the concentration of each nutritional component.

13. The method of fertigation according to claim 1, wherein said irrigation device is a drip irrigation line.

14. The method of fertigation according to claim 1, wherein the plant or a part thereof, has an average increased nutrient value greater than 5%.

15. The method of fertigation according to claim 1, wherein the plant or a part thereof, has improved quality.

16. The method of fertigation according to claim 1, wherein the plant or a part thereof, is less susceptible to pest, fungal and insect infestations.

17. A method of fertigation comprising the steps of:
selecting a plant from the group consisting of angiosperms, gymnosperms and pteridophytes; growing the plant in a plant container; providing at least one sensor for measuring the total water consumption by the plant in the plant container; analyzing data from said at least one sensor to determine the amount of water and nutrients to be delivered to the plant; and delivering the determined amount of water and nutrients to the plant by an irrigation device at a predetermined schedule.

18. A method of fertigation comprising the steps of:
growing a plant in a plant container; providing at least one sensor for measuring the total water consumption by the plant in the plant container, providing a scale for measuring the amount of water available to the plant; analyzing data from said at least one sensor to determine the amount of water and nutrients to be delivered to the plant and delivering the determined amount of water and nutrients to the plant by an irrigation device at a predetermined schedule.

19. A method of fertigation comprising the steps of;
growing a plant in a plant container; providing at least one sensor for measuring the total water consumption by the plant in the plant container; providing at least one collection container for measurement of chemical content of excess water from said plant container; analyzing data from said at least one sensor to determine the amount of water and nutrients to be delivered to the plant; and delivering the determined amount of water and nutrients to the plant by an irrigation device at a predetermined schedule.

20. The method according to claim 19 further comprising at least one sensor for measuring chemical content of said excess water.

21. A method of fertigation comprising the steps of;
growing a plant in a plant container; providing at least one sensor for measuring the total water consumption by the plant in the plant container; providing at least one additional sensor from the group consisting of a stem diameter sensor, a fruit diameter sensor, a leaf temperature sensor, a relative rate sap sensor, an infrared sensor, a near-infrared sensor and a stem auxanometer, analyzing data from said at least one sensor to determine the amount of water and nutrients to be delivered to the plant; and delivering the determined amount of water and nutrients to the plant by an irrigation device at a predetermined schedule.

22. A method of fertigation comprising the steps of;
growing a plant in a plant container; providing at least one sensor for measuring the total water consumption by the plant in the plant container; analyzing data from said at least one sensor to determine the amount of water and nutrients to be delivered to the plant; delivering the determined amount of water and nutrients to the plant by an irrigation device at a predetermined schedule; and periodically flushing the plant container.

23. A fertigation system comprising a central processing unit; at least one sensor for measuring total water consumption by a plant in a plant container; a scale for measuring the total amount of water available to the plant; a first communication device to send data from said at least one sensor to the central processing unit; at least one mixing tank containing nutrients and water; at least one injector; a second communication device to send instructions from the central processing unit to said at least one injector; an irrigation device for delivering water and nutrients to the plant; wherein the central processing unit analyzes the data from said at least one sensor and controls fertigation by determining the amount of water and nutrients to be delivered to the plant and instructing said at least one injector to deliver water and nutrients from said at least one mixing tank to the plant through the irrigation device.

24. A fertigation system comprising a central processing unit; at least one sensor for measuring total water consumption by a plant in a plant container; at least one collection container for the measurement of the chemical content of excess water from the plant container; a first communication device to send data from said at least one sensor to the central processing unit; at least one mixing tank containing nutrients and water; at least one injector; a second communication device to send instructions from the central processing unit to said at least one injector; an irrigation device for delivering water and nutrients to the plant; wherein the central processing unit analyzes the data from said at least one sensor and controls fertigation by determining the amount of water and nutrients to be delivered to the plant and instructing said at least one injector to deliver water and nutrients from said at least one mixing tank to the plant through the irrigation device.

25. The fertigation system according to claim 24 further comprising at least one sensor for measuring chemical content of said excess water.

26. A fertigation system comprising a central processing unit; at least one sensor for measuring total water consumption by a plant in a periodically flushed plant container; a first communication device to send data from said at least one sensor to the central processing unit; at least one mixing tank containing nutrients and water; at least one injector; a second communication device to send instructions from the central processing unit to said at least one injector; an irrigation device for delivering water and nutrients to the plant; wherein the central processing unit analyzes the data from said at least one sensor and controls fertigation by determining the amount of water and nutrients to be delivered to the plant and instructing said at least one injector to deliver water and nutrients from said at least one mixing tank to the plant through the irrigation device.

27. A fertigation system comprising a central processing unit; at least one sensor for measuring total water consumption by a plant in a plant container; at least one additional sensor from the group consisting of a stem diameter sensor, a fruit diameter sensor, a leaf temperature sensor, a relative-rate sap sensor, an infrared sensor, a near-infrared sensor and an auxanometer; a first communication device to send data from said at least one sensor to the central processing unit; at least one mixing tank containing nutrients and water; at least one injector; a second communication device to send instructions from the central processing unit to said at least one injector; an irrigation device for delivering water and nutrients to the plant; wherein the central processing unit analyzes the data from said at least one sensor and controls fertigation by determining the amount of water and nutrients to be delivered to the plant and instructing said at least one injector to deliver water and nutrients from said at least one mixing tank to the plant through the irrigation device.

28. A fertigation system comprising a central processing unit; at least one sensor for measuring total water consumption by a plant in a plant container, the plant container being separated from the underlying soil by elevating the plant container; a first communication device to send data from said at least one sensor to the central processing unit; at least one mixing tank containing nutrients and water; at least one injector; a second communication device to send instructions from the central processing unit to said at least one injector; an irrigation device for delivering water and nutrients to the plant; wherein the central processing unit analyzes the data from said at least one sensor and controls fertigation by determining the amount of water and nutrients to be delivered to the plant and instructing said at least one injector to deliver water and nutrients from said at least one mixing tank to the plant through the irrigation device.

29. The fertigation system according to claim 28, wherein said plant container is separated from the soil.

30. The fertigation system according to claim 28 further comprising at least one sensor for measuring the total amount of water delivered to the plant.

31. The fertigation system according to claim 30, wherein said sensor is a liquid volume gauge.

32. The fertigation system according to claim 28 further comprising at least one sensor for measuring the amount of excess water from the plant container.

33. The fertigation system according to claim 32, wherein said sensor is a liquid volume gauge.

34. The fertigation system according to claim 28 further comprising at least one sensor to measure the total amount of water available to the plant.

35. The fertigation system according to claim 28 further comprising at least one sensor for measuring the chemical content of the excess water from the plant container.

36. The fertigation system according to claim 28 further comprising at least one sensor to measure total amount of water delivered to said plant, at least one sensor to measure the total amount of excess water, at least sensor to measure the total amount of water available to the plant and at least one sensor for measurement of the chemical content.

37. The fertigation system according to claim 28, wherein data from at least one sensor is analyzed by said central processing unit.

38. The fertigation system according to claim 37, wherein the analysis from said central processing unit determines the timing of irrigation events.

39. The fertigation system according to claim 37, wherein the analysis from said central processing unit determines the amount of water to be applied during an irrigation event.

40. The fertigation system according to claim 37, wherein the analysis from said central processing unit is used in preparing the concentration of each nutritional component.

41. The fertigation system according to claim 28, wherein said irrigation device is a drip irrigation line.

* * * * *